United States Patent
Leather et al.

(10) Patent No.: US 7,307,638 B2
(45) Date of Patent: Dec. 11, 2007

(54) METHOD AND APPARATUS FOR INTERLEAVED PROCESSING OF DIRECT AND INDIRECT TEXTURE COORDINATES IN A GRAPHICS SYSTEM

(75) Inventors: Mark M. Leather, Saratoga, CA (US); Robert A. Drebin, Palo Alto, CA (US); Timothy J. Van Hook, Atherton, CA (US)

(73) Assignee: Nintendo Co., Ltd., Kyoto (JP)

( * ) Notice: Subject to any disclaimer, the term of this patent is extended or adjusted under 35 U.S.C. 154(b) by 345 days.

(21) Appl. No.: 11/152,283

(22) Filed: Jun. 15, 2005

(65) Prior Publication Data

US 2005/0237337 A1 Oct. 27, 2005

(51) Int. Cl.
*G09G 5/00* (2006.01)
*G06T 11/40* (2006.01)
*G06T 17/00* (2006.01)
*A63F 9/24* (2006.01)
*G06K 9/56* (2006.01)
*G06T 15/20* (2006.01)
*G06K 9/36* (2006.01)

(52) U.S. Cl. .......... 345/582; 345/586; 345/587; 345/619; 345/552; 463/31; 382/305

(58) Field of Classification Search ........ 345/418–428, 345/581–587, 606, 619, 629–630, 501, 545, 345/552, 563; 382/285, 305, 300; 463/30–34
See application file for complete search history.

(56) References Cited

U.S. PATENT DOCUMENTS 4,275,413 A 6/1981 Sakamoto et al.

(Continued)

FOREIGN PATENT DOCUMENTS

CA 1305802 7/1992

(Continued)

OTHER PUBLICATIONS

Neider, et al., Open GL Programming Guide, The Official Guide, The Official Guide to Learning OpenGL, Release 1, pp. 301-302 (1993).

(Continued)

*Primary Examiner*—Wesner Sajous
(74) *Attorney, Agent, or Firm*—Nixon & Vanderhye P.C.

(57) ABSTRACT

A graphics system including a custom graphics and audio processor produces exciting 2D and 3D graphics and surround sound. The system includes a graphics and audio processor including a 3D graphics pipeline and an audio digital signal processor. The graphics pipeline renders and prepares images for display at least in part in response to polygon vertex attribute data and texel color data stored as a texture images in an associated memory. An efficient texturing pipeline arrangement achieves a relatively low chip-footprint by utilizing a single texture coordinate/data processing unit that interleaves the processing of logical direct and indirect texture coordinate data and a texture lookup data feedback path for "recirculating" indirect texture lookup data retrieved from a single texture retrieval unit back to the texture coordinate/data processing unit. Versatile indirect texture referencing is achieved by using the same texture coordinate/data processing unit to transform the recirculated texture lookup data into offsets that may be added to the texture coordinates of a direct texture lookup. A generalized indirect texture API function is provided that supports defining at least four indirect texture referencing operations and allows for selectively associating one of at least eight different texture images with each indirect texture defined. Retrieved indirect texture lookup data is processed as multi-bit binary data triplets of three, four, five, or eight bits. The data triplets are multiplied by a 3×2 texture coordinate offset matrix before being optionally combined with regular non-indirect coordinate data or coordinate data from a previous cycle/stage of processing. Values of the offset matrix elements are variable and may be dynamically defined for each cycle/stage using selected constants. Two additional variable matrix configurations are also defined containing element values obtained from current direct texture coordinates. Circuitry for optionally biasing and scaling retrieved texture data is also provided.

46 Claims, 28 Drawing Sheets

U.S. PATENT DOCUMENTS

| | | |
|---|---|---|
| 4,357,624 A | 11/1982 | Greenberg |
| 4,388,620 A | 6/1983 | Sherman |
| 4,425,559 A | 1/1984 | Sherman |
| 4,463,380 A | 7/1984 | Hooks, Jr. |
| 4,491,836 A | 1/1985 | Collmeyer et al. |
| 4,570,233 A | 2/1986 | Yan et al. |
| 4,586,038 A | 4/1986 | Sims et al. |
| 4,600,919 A | 7/1986 | Stern |
| 4,601,055 A | 7/1986 | Kent |
| 4,615,013 A | 9/1986 | Yan et al. |
| 4,625,289 A | 11/1986 | Rockwood |
| 4,653,012 A | 3/1987 | Duffy et al. |
| 4,658,247 A | 4/1987 | Gharachorloo |
| 4,692,880 A | 9/1987 | Merz et al. |
| 4,695,943 A | 9/1987 | Keeley et al. |
| 4,710,876 A | 12/1987 | Cline et al. |
| 4,725,831 A | 2/1988 | Coleman |
| 4,768,148 A | 8/1988 | Keeley et al. |
| 4,785,395 A | 11/1988 | Keeley |
| 4,790,025 A | 12/1988 | Inoue et al. |
| 4,808,988 A | 2/1989 | Burke et al. |
| 4,812,988 A | 3/1989 | Duthuit et al. |
| 4,817,175 A | 3/1989 | Tenenbaum et al. |
| 4,829,295 A | 5/1989 | Hiroyuki |
| 4,829,452 A | 5/1989 | Kang et al. |
| 4,833,601 A | 5/1989 | Barlow et al. |
| 4,855,934 A | 8/1989 | Robinson |
| 4,862,392 A | 8/1989 | Steiner |
| 4,866,637 A | 9/1989 | Gonzalez-Lopez et al. |
| 4,888,712 A | 12/1989 | Barkans et al. |
| 4,897,806 A | 1/1990 | Cook et al. |
| 4,901,064 A | 2/1990 | Deering |
| 4,907,174 A | 3/1990 | Priem |
| 4,914,729 A | 4/1990 | Omori et al. |
| 4,918,625 A | 4/1990 | Yan |
| 4,935,879 A | 6/1990 | Ueda |
| 4,945,500 A | 7/1990 | Deering |
| 4,965,751 A | 10/1990 | Thayer et al. |
| 4,974,176 A | 11/1990 | Buchner et al. |
| 4,974,177 A | 11/1990 | Nishiguchi |
| 4,975,977 A | 12/1990 | Kurosu et al. |
| 4,989,138 A | 1/1991 | Radochonski |
| 5,003,496 A | 3/1991 | Hunt, Jr. et al. |
| 5,016,183 A | 5/1991 | Shyong |
| 5,018,076 A | 5/1991 | Johary et al. |
| 5,043,922 A | 8/1991 | Matsumoto |
| 5,056,044 A | 10/1991 | Frederickson et al. |
| 5,062,057 A | 10/1991 | Blacken et al. |
| 5,086,495 A | 2/1992 | Gray et al. |
| 5,091,967 A | 2/1992 | Ohsawa |
| 5,097,427 A | 3/1992 | Lathrop et al. |
| 5,136,664 A | 8/1992 | Bersack et al. |
| 5,144,291 A | 9/1992 | Nishizawa |
| 5,163,126 A | 11/1992 | Einkauf et al. |
| 5,170,468 A | 12/1992 | Shah et al. |
| 5,179,638 A | 1/1993 | Dawson et al. |
| 5,204,944 A | 4/1993 | Wolberg et al. |
| 5,224,208 A | 6/1993 | Miller, Jr. et al. |
| 5,239,624 A | 8/1993 | Cook et al. |
| 5,241,658 A | 8/1993 | Masterson et al. |
| 5,255,353 A | 10/1993 | Itoh |
| 5,268,995 A | 12/1993 | Diefendorff et al. |
| 5,268,996 A | 12/1993 | Steiner et al. |
| 5,278,948 A | 1/1994 | Luken, Jr. |
| 5,293,235 A | 3/1994 | Guede et al. |
| 5,307,450 A | 4/1994 | Grossman |
| 5,315,692 A | 5/1994 | Hansen et al. |
| 5,345,541 A | 9/1994 | Kelley et al. |
| 5,353,424 A | 10/1994 | Partovi et al. |
| 5,357,579 A | 10/1994 | Buchner et al. |
| 5,361,386 A | 11/1994 | Watkins et al. |
| 5,363,475 A | 11/1994 | Baker et al. |
| 5,377,313 A | 12/1994 | Scheibl |
| 5,392,385 A | 2/1995 | Evangelisti et al. |
| 5,392,393 A | 2/1995 | Deering |
| 5,394,516 A | 2/1995 | Winser |
| 5,402,532 A | 3/1995 | Epstein et al. |
| 5,404,445 A | 4/1995 | Matsumoto |
| 5,408,650 A | 4/1995 | Arsenault |
| 5,412,796 A | 5/1995 | Olive |
| 5,415,549 A | 5/1995 | Logg |
| 5,416,606 A | 5/1995 | Katayama et al. |
| 5,421,028 A | 5/1995 | Swanson |
| 5,422,997 A | 6/1995 | Nagashima |
| 5,432,895 A | 7/1995 | Myers |
| 5,432,900 A | 7/1995 | Rhodes et al. |
| 5,438,663 A | 8/1995 | Matsumoto et al. |
| 5,448,689 A | 9/1995 | Matsuo et al. |
| 5,457,775 A | 10/1995 | Johnson, Jr. et al. |
| 5,461,712 A | 10/1995 | Chelstowski et al. |
| 5,467,438 A | 11/1995 | Nishio et al. |
| 5,467,459 A | 11/1995 | Alexander et al. |
| 5,469,535 A | 11/1995 | Jarvis et al. |
| 5,473,736 A | 12/1995 | Young |
| 5,475,803 A | 12/1995 | Stearns et al. |
| 5,487,146 A | 1/1996 | Guttag et al. |
| 5,490,240 A | 2/1996 | Foran et al. |
| 5,495,563 A | 2/1996 | Winser |
| 5,504,499 A | 4/1996 | Horie et al. |
| 5,504,917 A | 4/1996 | Austin |
| 5,506,604 A | 4/1996 | Nally et al. |
| 5,535,288 A | 7/1996 | Chen et al. |
| 5,535,374 A | 7/1996 | Olive |
| 5,543,824 A | 8/1996 | Priem et al. |
| 5,544,292 A | 8/1996 | Winser |
| 5,548,709 A | 8/1996 | Hannah et al. |
| 5,553,228 A | 9/1996 | Erb et al. |
| 5,557,712 A | 9/1996 | Guay |
| 5,559,954 A | 9/1996 | Sakoda et al. |
| 5,561,746 A | 10/1996 | Murata et al. |
| 5,561,752 A | 10/1996 | Jevans |
| 5,563,989 A | 10/1996 | Billyard |
| 5,566,285 A | 10/1996 | Okada |
| 5,572,634 A | 11/1996 | Duluk, Jr. |
| 5,573,402 A | 11/1996 | Gray |
| 5,574,835 A | 11/1996 | Duluk, Jr. et al. |
| 5,579,456 A | 11/1996 | Cosman |
| 5,582,451 A | 12/1996 | Baumann |
| 5,586,234 A | 12/1996 | Sakuraba et al. |
| 5,593,350 A | 1/1997 | Bouton et al. |
| 5,594,854 A | 1/1997 | Baldwin et al. |
| 5,596,686 A | 1/1997 | Duluk, Jr. |
| 5,600,763 A | 2/1997 | Greene et al. |
| 5,606,650 A | 2/1997 | Kelley et al. |
| 5,607,157 A | 3/1997 | Nagashima |
| 5,608,424 A | 3/1997 | Takahashi et al. |
| 5,608,864 A | 3/1997 | Bindlish et al. |
| 5,616,031 A | 4/1997 | Logg |
| 5,621,867 A | 4/1997 | Murata et al. |
| 5,628,686 A | 5/1997 | Svancarek et al. |
| 5,638,535 A | 6/1997 | Rosenthal et al. |
| 5,644,364 A | 7/1997 | Kurtze et al. |
| 5,649,082 A | 7/1997 | Burns |
| 5,650,955 A | 7/1997 | Puar et al. |
| 5,651,104 A | 7/1997 | Cosman |
| 5,657,045 A | 8/1997 | Katsura et al. |
| 5,657,443 A | 8/1997 | Krech, Jr. |
| 5,657,478 A | 8/1997 | Recker et al. |
| 5,659,671 A | 8/1997 | Tannenbaum et al. |
| 5,659,673 A | 8/1997 | Nonoshita |
| 5,659,715 A | 8/1997 | Wu et al. |
| 5,664,162 A | 9/1997 | Dye |

| | | | | | |
|---|---|---|---|---|---|
| 5,666,439 A | 9/1997 | Ishida et al. | 5,831,625 A | 11/1998 | Rich et al. |
| 5,669,010 A | 9/1997 | Duluk, Jr. | 5,831,640 A | 11/1998 | Wang et al. |
| 5,678,037 A | 10/1997 | Osugi et al. | 5,835,096 A | 11/1998 | Baldwin |
| 5,682,522 A | 10/1997 | Huang et al. | 5,835,792 A | 11/1998 | Wise et al. |
| 5,684,941 A | 11/1997 | Dye | 5,838,334 A | 11/1998 | Dye |
| 5,687,304 A | 11/1997 | Kiss | 5,844,576 A | 12/1998 | Wilde et al. |
| 5,687,357 A | 11/1997 | Priem | 5,850,229 A | 12/1998 | Edelsbrunner et al. |
| 5,691,746 A | 11/1997 | Shyu | 5,856,829 A | 1/1999 | Gray, III et al. |
| 5,694,143 A | 12/1997 | Fielder et al. | 5,859,645 A | 1/1999 | Latham |
| 5,696,892 A | 12/1997 | Redmann et al. | 5,861,888 A | 1/1999 | Dempsey |
| 5,701,444 A | 12/1997 | Baldwin | 5,861,893 A | 1/1999 | Sturgess |
| 5,703,806 A | 12/1997 | Puar et al. | 5,867,166 A | 2/1999 | Myhrvold et al. |
| 5,706,481 A | 1/1998 | Hannah et al. | 5,870,097 A | 2/1999 | Snyder et al. |
| 5,706,482 A | 1/1998 | Matsushima et al. | 5,870,098 A | 2/1999 | Gardiner |
| 5,714,981 A | 2/1998 | Scott-Jackson et al. | 5,870,102 A * | 2/1999 | Tarolli et al. ................ 345/586 |
| 5,721,947 A | 2/1998 | Priem et al. | 5,870,109 A | 2/1999 | McCormack et al. |
| 5,724,561 A | 3/1998 | Tarolli et al. | 5,870,587 A | 2/1999 | Danforth et al. |
| 5,726,689 A | 3/1998 | Negishi et al. | 5,872,902 A | 2/1999 | Kuchkuda et al. |
| 5,726,947 A | 3/1998 | Yamazaki et al. | 5,874,969 A | 2/1999 | Storm et al. |
| 5,727,192 A | 3/1998 | Baldwin | 5,877,741 A | 3/1999 | Chee et al. |
| 5,734,386 A | 3/1998 | Cosman | 5,877,770 A | 3/1999 | Hanaoka |
| 5,739,819 A | 4/1998 | Bar-Nahum | 5,877,771 A | 3/1999 | Drebin et al. |
| 5,740,343 A | 4/1998 | Tarolli et al. | 5,880,736 A | 3/1999 | Peercy et al. |
| 5,740,383 A | 4/1998 | Nally et al. | 5,880,737 A | 3/1999 | Griffin et al. |
| 5,740,406 A | 4/1998 | Rosenthal et al. | 5,883,638 A | 3/1999 | Rouet et al. |
| 5,742,749 A | 4/1998 | Foran et al. | 5,886,701 A | 3/1999 | Chauvin et al. |
| 5,742,788 A | 4/1998 | Priem et al. | 5,886,705 A | 3/1999 | Lentz |
| 5,745,118 A | 4/1998 | Alcorn et al. | 5,887,155 A | 3/1999 | Laidig |
| 5,745,125 A | 4/1998 | Deering et al. | 5,890,190 A | 3/1999 | Rutman |
| 5,748,199 A | 5/1998 | Palm | 5,892,517 A | 4/1999 | Rich |
| 5,748,986 A | 5/1998 | Butterfield et al. | 5,892,974 A | 4/1999 | Koizumi et al. |
| 5,751,291 A | 5/1998 | Olsen et al. | 5,894,300 A | 4/1999 | Takizawa |
| 5,751,292 A | 5/1998 | Emmot | 5,900,881 A | 5/1999 | Ikedo |
| 5,751,295 A | 5/1998 | Becklund et al. | 5,903,283 A | 5/1999 | Selwan et al. |
| 5,751,930 A | 5/1998 | Katsura et al. | 5,909,218 A | 6/1999 | Naka et al. |
| 5,754,191 A | 5/1998 | Mills et al. | 5,909,225 A | 6/1999 | Schinnerer et al. |
| 5,757,382 A | 5/1998 | Lee | 5,912,675 A | 6/1999 | Laperriere |
| 5,758,182 A | 5/1998 | Rosenthal et al. | 5,912,676 A | 6/1999 | Malladi et al. |
| 5,760,783 A | 6/1998 | Migdal et al. | 5,914,721 A | 6/1999 | Lim |
| 5,764,228 A | 6/1998 | Baldwin | 5,914,725 A | 6/1999 | MacInnis et al. |
| 5,764,237 A | 6/1998 | Kaneko | 5,914,729 A | 6/1999 | Lippincott |
| 5,764,243 A | 6/1998 | Baldwin | 5,917,496 A | 6/1999 | Fujita et al. |
| 5,767,856 A | 6/1998 | Peterson et al. | 5,920,326 A | 7/1999 | Rentschler et al. |
| 5,767,858 A | 6/1998 | Kawase et al. | 5,920,876 A | 7/1999 | Ungar et al. |
| 5,768,626 A | 6/1998 | Munson et al. | 5,923,332 A | 7/1999 | Izawa |
| 5,768,629 A | 6/1998 | Wise et al. | 5,923,334 A | 7/1999 | Luken |
| 5,774,133 A | 6/1998 | Neave et al. | 5,926,182 A | 7/1999 | Menon et al. |
| 5,777,623 A | 7/1998 | Small | 5,926,647 A | 7/1999 | Adams et al. |
| 5,777,629 A | 7/1998 | Baldwin | 5,933,150 A | 8/1999 | Ngo et al. |
| 5,781,927 A | 7/1998 | Wu et al. | 5,933,154 A | 8/1999 | Howard et al. |
| 5,791,994 A | 8/1998 | Hirano et al. | 5,933,155 A | 8/1999 | Akeley |
| 5,798,770 A | 8/1998 | Baldwin | 5,933,529 A | 8/1999 | Kim |
| 5,801,706 A | 9/1998 | Fujita et al. | 5,936,641 A | 8/1999 | Jain et al. |
| 5,801,711 A | 9/1998 | Koss et al. | 5,936,683 A | 8/1999 | Lin |
| 5,801,716 A | 9/1998 | Silverbrook | 5,940,086 A | 8/1999 | Rentschler et al. |
| 5,801,720 A | 9/1998 | Norrod et al. | 5,940,089 A | 8/1999 | Dilliplane et al. |
| 5,805,175 A | 9/1998 | Priem | 5,940,538 A | 8/1999 | Spiegel et al. |
| 5,805,868 A | 9/1998 | Murphy | 5,943,058 A | 8/1999 | Nagy |
| 5,808,619 A | 9/1998 | Choi et al. | 5,943,060 A | 8/1999 | Cosman et al. |
| 5,808,630 A | 9/1998 | Pannell | 5,945,997 A | 8/1999 | Zhao et al. |
| 5,809,219 A | 9/1998 | Pearce et al. | 5,949,421 A | 9/1999 | Ogletree et al. |
| 5,809,278 A | 9/1998 | Watanabe et al. | 5,949,423 A | 9/1999 | Olsen |
| 5,815,165 A | 9/1998 | Blixt | 5,949,424 A | 9/1999 | Cabral et al. |
| 5,815,166 A | 9/1998 | Baldwin | 5,949,428 A | 9/1999 | Toelle et al. |
| 5,818,456 A | 10/1998 | Cosman et al. | 5,949,440 A | 9/1999 | Krech, Jr. et al. |
| 5,819,017 A | 10/1998 | Akeley et al. | 5,956,042 A | 9/1999 | Tucker et al. |
| 5,821,940 A | 10/1998 | Morgan et al. | 5,956,043 A | 9/1999 | Jensen |
| 5,821,949 A | 10/1998 | Deering | 5,958,020 A | 9/1999 | Evoy et al. |
| 5,822,516 A | 10/1998 | Krech, Jr. | 5,959,640 A | 9/1999 | Rudin et al. |
| 5,828,382 A | 10/1998 | Wilde | 5,963,220 A | 10/1999 | Lee et al. |
| 5,828,383 A | 10/1998 | May et al. | 5,966,134 A | 10/1999 | Arias |
| 5,828,907 A | 10/1998 | Wise et al. | 5,969,726 A | 10/1999 | Rentschler et al. |
| 5,831,624 A | 11/1998 | Tarolli et al. | 5,977,977 A | 11/1999 | Kajiya et al. |

| | | | | | | |
|---|---|---|---|---|---|---|
| 5,977,979 A | 11/1999 | Clough et al. | | 6,072,496 A | 6/2000 | Guenter et al. |
| 5,977,984 A | 11/1999 | Omori | | 6,075,543 A | 6/2000 | Akeley |
| 5,977,987 A | 11/1999 | Duluk, Jr. | | 6,075,546 A | 6/2000 | Hussain et al. |
| 5,982,376 A | 11/1999 | Abe et al. | | 6,078,311 A | 6/2000 | Pelkey |
| 5,982,390 A | 11/1999 | Stoneking et al. | | 6,078,333 A | 6/2000 | Wittig et al. |
| 5,986,659 A | 11/1999 | Gallery et al. | | 6,078,334 A | 6/2000 | Hanaoka et al. |
| 5,986,663 A | 11/1999 | Wilde | | 6,078,338 A | 6/2000 | Horan et al. |
| 5,986,677 A | 11/1999 | Jones et al. | | 6,081,274 A | 6/2000 | Shiraishi |
| 5,987,567 A | 11/1999 | Rivard et al. | | 6,088,035 A | 7/2000 | Sudarsky et al. |
| 5,990,903 A | 11/1999 | Donovan | | 6,088,042 A | 7/2000 | Handelman et al. |
| 5,995,120 A | 11/1999 | Dye | | 6,088,487 A | 7/2000 | Kurashige |
| 5,995,121 A | 11/1999 | Alcorn et al. | | 6,088,701 A | 7/2000 | Whaley et al. |
| 5,999,189 A | 12/1999 | Kajiya et al. | | 6,091,431 A | 7/2000 | Saxena et al. |
| 5,999,196 A | 12/1999 | Storm et al. | | 6,092,124 A | 7/2000 | Priem et al. |
| 5,999,198 A | 12/1999 | Horan et al. | | 6,092,158 A | 7/2000 | Harriman et al. |
| 6,002,407 A | 12/1999 | Fadden | | 6,094,200 A | 7/2000 | Olsen et al. |
| 6,002,409 A | 12/1999 | Harkin | | 6,097,435 A | 8/2000 | Stanger et al. |
| 6,002,410 A | 12/1999 | Battle | | 6,097,437 A | 8/2000 | Hwang |
| 6,005,582 A | 12/1999 | Gabriel et al. | | 6,104,415 A | 8/2000 | Gossett |
| 6,005,583 A | 12/1999 | Morrison | | 6,104,417 A | 8/2000 | Nielsen et al. |
| 6,005,584 A | 12/1999 | Kitamura et al. | | 6,105,094 A | 8/2000 | Lindeman |
| 6,007,428 A | 12/1999 | Nishiumi et al. | | 6,108,743 A | 8/2000 | Debs et al. |
| 6,008,820 A | 12/1999 | Chauvin et al. | | 6,111,582 A | 8/2000 | Jenkins |
| 6,011,562 A | 1/2000 | Gagne et al. | | 6,111,584 A | 8/2000 | Murphy |
| 6,011,565 A | 1/2000 | Kuo et al. | | 6,115,047 A | 9/2000 | Deering |
| 6,014,144 A | 1/2000 | Nelson et al. | | 6,115,049 A | 9/2000 | Winner et al. |
| 6,016,150 A | 1/2000 | Lengyel et al. | | 6,118,462 A | 9/2000 | Margulis |
| 6,016,151 A | 1/2000 | Lin | | 6,128,026 A | 10/2000 | Brothers, III |
| 6,018,350 A | 1/2000 | Lee et al. | | 6,144,365 A | 11/2000 | Young et al. |
| 6,020,931 A | 2/2000 | Bilbrey et al. | | 6,144,387 A | 11/2000 | Liu et al. |
| 6,021,417 A | 2/2000 | Massarksy | | 6,151,602 A | 11/2000 | Hejlsberg et al. |
| 6,022,274 A | 2/2000 | Takeda et al. | | 6,155,926 A | 12/2000 | Miyamoto et al. |
| 6,023,261 A | 2/2000 | Ugajin | | 6,157,387 A | 12/2000 | Kotani |
| 6,023,738 A | 2/2000 | Priem et al. | | 6,166,748 A | 12/2000 | Van Hook et al. |
| 6,025,853 A | 2/2000 | Baldwin | | 6,172,678 B1 | 1/2001 | Shiraishi |
| 6,026,182 A | 2/2000 | Lee et al. | | 6,173,367 B1 | 1/2001 | Aleksic et al. |
| 6,028,608 A | 2/2000 | Jenkins | | 6,177,944 B1 | 1/2001 | Fowler et al. |
| 6,028,611 A | 2/2000 | Anderson et al. | | 6,181,352 B1 | 1/2001 | Kirk et al. |
| 6,031,542 A | 2/2000 | Wittig | | 6,191,794 B1 | 2/2001 | Priem et al. |
| 6,035,360 A | 3/2000 | Doidge et al. | | 6,198,488 B1 | 3/2001 | Lindholm et al. |
| 6,037,948 A | 3/2000 | Liepa | | 6,200,253 B1 | 3/2001 | Nishiumi et al. |
| 6,037,949 A | 3/2000 | DeRose et al. | | 6,204,851 B1 | 3/2001 | Netschke et al. |
| 6,038,031 A | 3/2000 | Murphy | | 6,215,496 B1 | 4/2001 | Szeliski et al. |
| 6,038,348 A | 3/2000 | Carley | | 6,215,497 B1 | 4/2001 | Leung |
| 6,040,843 A | 3/2000 | Monroe et al. | | 6,226,012 B1 | 5/2001 | Priem et al. |
| 6,040,844 A | 3/2000 | Yamaguchi et al. | | 6,226,713 B1 | 5/2001 | Mehrotra |
| 6,041,010 A | 3/2000 | Puar et al. | | 6,229,553 B1 * | 5/2001 | Duluk, Jr. et al. .......... 345/506 |
| 6,043,804 A | 3/2000 | Greene | | 6,232,981 B1 | 5/2001 | Gossett |
| 6,043,821 A | 3/2000 | Sprague et al. | | 6,236,413 B1 | 5/2001 | Gossett et al. |
| 6,046,746 A | 4/2000 | Deering | | 6,239,810 B1 | 5/2001 | Van Hook et al. |
| 6,046,747 A | 4/2000 | Saunders et al. | | 6,252,608 B1 | 6/2001 | Snyder et al. |
| 6,046,752 A | 4/2000 | Kirkland et al. | | 6,252,610 B1 | 6/2001 | Hussain |
| 6,049,337 A | 4/2000 | Van Overveld | | 6,259,460 B1 | 7/2001 | Gossett et al. |
| 6,049,338 A | 4/2000 | Anderson et al. | | 6,264,558 B1 | 7/2001 | Nishiumi et al. |
| 6,052,125 A | 4/2000 | Gardiner et al. | | 6,268,861 B1 | 7/2001 | Sanz-Pastor et al. |
| 6,052,126 A | 4/2000 | Sakuraba et al. | | 6,268,875 B1 | 7/2001 | Duluk, Jr. et al. |
| 6,052,127 A | 4/2000 | Vaswani et al. | | 6,275,235 B1 | 8/2001 | Morgan, III |
| 6,052,129 A | 4/2000 | Fowler et al. | | 6,285,378 B1 | 9/2001 | Duluk, Jr. |
| 6,052,133 A | 4/2000 | Kang | | 6,285,779 B1 | 9/2001 | Lapidous et al. |
| 6,054,993 A | 4/2000 | Devic et al. | | 6,288,730 B1 | 9/2001 | Duluk, Jr. et al. |
| 6,054,999 A | 4/2000 | Strandberg | | 6,292,194 B1 | 9/2001 | Powell, III |
| 6,057,847 A | 5/2000 | Jenkins | | 6,329,997 B1 | 12/2001 | Wu et al. |
| 6,057,849 A | 5/2000 | Haubner et al. | | 6,331,856 B1 | 12/2001 | Van Hook et al. |
| 6,057,851 A | 5/2000 | Luken et al. | | 6,333,744 B1 | 12/2001 | Kirk et al. |
| 6,057,852 A | 5/2000 | Krech, Jr. | | 6,337,689 B1 * | 1/2002 | Hochmuth et al. .......... 345/522 |
| 6,057,859 A | 5/2000 | Handelman et al. | | 6,339,428 B1 | 1/2002 | Fowler et al. |
| 6,057,861 A | 5/2000 | Lee et al. | | 6,342,892 B1 | 1/2002 | Van Hook et al. |
| 6,057,862 A | 5/2000 | Margulis | | 6,353,438 B1 | 3/2002 | Van Hook |
| 6,057,863 A | 5/2000 | Olarig | | 6,356,497 B1 | 3/2002 | Puar et al. |
| 6,061,462 A | 5/2000 | Tostevin et al. | | 6,408,362 B1 | 6/2002 | Arimilli et al. |
| 6,064,392 A | 5/2000 | Rohner | | 6,417,858 B1 | 7/2002 | Bosch et al. |
| 6,067,098 A | 5/2000 | Dye | | 6,426,747 B1 | 7/2002 | Hoppe et al. |
| 6,070,204 A | 5/2000 | Poisner | | 6,437,781 B1 | 8/2002 | Tucker et al. |

| | | |
|---|---|---|
| 6,459,429 B1 | 10/2002 | Deering |
| 6,466,223 B1 * | 10/2002 | Dorbie et al. ............... 345/582 |
| 6,469,707 B1 | 10/2002 | Voorhies |
| 6,476,808 B1 | 11/2002 | Kuo et al. |
| 6,476,822 B1 | 11/2002 | Burbank |
| 6,496,187 B1 | 12/2002 | Deering et al. |
| 6,501,479 B1 | 12/2002 | Root et al. |
| 6,532,013 B1 | 3/2003 | Papakipos et al. |
| 6,593,923 B1 * | 7/2003 | Donovan et al. ........... 345/422 |
| 6,597,363 B1 * | 7/2003 | Duluk, Jr. et al. .......... 345/506 |
| 6,618,048 B1 * | 9/2003 | Leather ...................... 345/422 |
| 6,664,958 B1 * | 12/2003 | Leather et al. .............. 345/422 |
| 7,002,591 B1 * | 2/2006 | Leather et al. .............. 345/582 |
| 7,176,919 B2 | 2/2007 | Drebin et al. |
| 2006/0094500 A1 * | 5/2006 | Dyke et al. ................... 463/30 |

FOREIGN PATENT DOCUMENTS

| | | |
|---|---|---|
| CA | 2070934 | 12/1993 |
| CA | 2147846 | 3/1995 |
| CA | 2294233 | 1/1999 |
| EP | 0 637 813 A2 | 2/1995 |
| EP | 0 837 429 A | 4/1998 |
| EP | 1 074 945 | 2/2001 |
| EP | 1 075 146 | 2/2001 |
| EP | 1 081 649 | 3/2001 |
| EP | 1 189 172 A9 | 3/2002 |
| JP | 9-330230 | 12/1997 |
| JP | 11053580 | 2/1999 |
| JP | 11076614 | 3/1999 |
| JP | 11161819 | 6/1999 |
| JP | 11203500 | 7/1999 |
| JP | 11226257 | 8/1999 |
| JP | 11259671 | 9/1999 |
| JP | 11259678 | 9/1999 |
| JP | 2000-66985 | 3/2000 |
| JP | 2000-92390 | 3/2000 |
| JP | 2000-132704 | 5/2000 |
| JP | 2000-132706 | 5/2000 |
| JP | 2000-149053 | 5/2000 |
| JP | 2000-156875 | 6/2000 |
| JP | 2000-182077 | 6/2000 |
| JP | 2000-207582 | 7/2000 |
| JP | 2000-215325 | 8/2000 |
| WO | WO/93/04429 | 3/1993 |
| WO | WO 93/23816 | 11/1993 |
| WO | WO 94/10641 | 5/1994 |
| WO | WO 97/05575 | 2/1997 |
| WO | WO 97/05576 | 2/1997 |
| WO | WO 99/01846 A | 1/1999 |
| WO | WO 00/10372 | 3/2000 |
| WO | WO 00/11562 | 3/2000 |
| WO | WO 00/11602 | 3/2000 |
| WO | WO 00/11604 | 3/2000 |
| WO | WO 00/11605 | 3/2000 |
| WO | WO 00/11607 | 3/2000 |
| WO | WO 00/11613 | 3/2000 |
| WO | WO 00/11614 | 3/2000 |
| WO | WO 0011603 | 3/2000 |
| WO | WO 00/19377 | 4/2000 |

OTHER PUBLICATIONS

Whitepapers: "Texture Addressing," Sim Dietrich, Jan. 6, 2000, www.nvidia.com.
Gooch et al., "A non-Photorealistic Lighting Model for Automatic Technical Illustration," presented at "SIGGRAPH 98," Orange County Convention Center, Orlando, FL (Jul. 19-24, 1998).
Lance Williams, "Pyramidal Parametrics"; Jul. 1983; Computer Graphics, vol. 17, No. 3; Computer Graphics Laboratory, New York Institute of Technology, Old Westbury, NY; pp. 1-11.
James F. Blinn et al., "Texture and Reflection in Computer Generated Images"; Oct. 1976; Graphics and Image Processing; Association of Computing Machinery, Inc. pp. 542-547.
Ned Greene, New York Institute of Technology; "Environment Mapping and Other Applications of World Projections"; Nov. 1986; The Institute of Electrical and Electronics Engineers Inc. Computer Society; pp. 21-29.
Photograph of Sony PlayStation II System.
Photograph of Sega Dreamcast System.
Photograph of Nintendo 64 System.
Whitepaper: 3D Graphics Demystified, Nov. 11, 1999, www.nvidia.com.
Whitepaper: "Z Buffering, Interpolation and More W-Buffering", Doug Rogers, Jan. 31, 2000, www.nvidia.com.
Whitepaper: Using GL_NV_vertex_array and GL_NV_fence, posted Aug. 1, 2000, www.nvidia.com.
Whitepaper: Anisotropic Texture Filtering in OpenGL, posted Jul. 17, 2000, www.nvidia.com.
Whitepaper: Mapping Texels to Pixels in D3D, posted Apr. 5, 2000, www.nvidia.com.
Whitepaper: Guard Band Clipping, posted Jan. 31, 2000, www.nvidia.com.
Whitepaper: Cube Environment Mapping, posted Jan. 14, 2000, www.nvidia.com.
Whitepaper: Color Key in D3D, posted Jan. 11, 2000, www.nvidia.com.
Whitepaper: Vertex Blending Under DX7 for the GeForce 256, Jan. 5, 2000, www.nvidia.com.
Whitepaper: Optimizing Direct3D for the GeForce 256, Jan. 3, 2000, www.nvidia.com.
Whitepaper: Dot Product Texture Blending, Dec. 3, 1999, www.nvidia.com.
Whitepaper: Technical Brief: AGP 4X with Fast Writes, Nov. 10, 1999, www.nvidia.com.
Technical Brief: Transform and Lighting, Nov. 10, 1999, www.nvidia.com.
Technical Brief: What's New With Microsoft DirectX7, posted Nov. 10, 1999, www.nvidia.com.
Mitchell et al., "Multitexturing in DirectX6", Game Developer, Sep. 1998, www.gdmag.com.
VisionTek, "GeForce2 GS Graphics Processing Unit", © 2000 www.visiontek.com.
Jim Bushnell et al. "Advanced Multitexture Effects With Direct3D and OpenGL", Pyramid Peak Design & ATI Research, Inc., GameDevelopers Conference, © 1999.
Sony PlayStation II Instruction Manual, Sony Computer Entertainment Inc., © 2000.
Stand and Be Judged, Next Generation, May 2000.
PlayStation II: Hardware Heaven or Hell?, Next Generation, Jan. 2000.
Chris Charla, "Play Station II: The Latest News", Next Generation, Sep. 1999.
"First PlayStation II Gameplay Screens Revealed!", Next Generation, Sep. 1999.
Game Enthusiast Online Highlights, Mar. 18, 1999.
Game Enthusiast Online Highlights, Mar. 19, 1999.
Game Enthusiast Online Highlights, Mar. 17, 1999.
Game Enthusiast Online Highlights, Oct. 20, 1999.
Joel Easley, "PlayStation II Revealed", Game Week , Sep. 29, 1999.
Inside Sony's Next Generation Playstation, ©1999.
Press Releases, Mar. 18, 1999.
Chris Johnston, "PlayStation Part Deux", Press Start, © 1999.
Nikkei Shimbun, "Sony Making SME, Chemical and SPT into Wholly-Owned Subsidiaries", Mar. 9, 1999.
AM News: Japanese Developers Not All Sold on PS2, Next Generation, Mar. 16, 1999.
Sony To Turn PlayStation Maker Into Wholly Owned Unit-Nikkei, Dow Jones News Service, Mar. 8, 1999.
Yumiko Ono, Sony Antes Up Its Chips In Bet On New Game System, Dow Jones News Service, Mar. 4, 1999.
MacWeek.Com Gets Inside Story on Connectix VGS for Windows; Controversial Emulator of Sony PlayStation Games Cureently Available for Macs Only, Business Wire, Mar. 12, 1999.
"DexDrive Bridges Gap", The Tampa Tribune, Mar. 12, 1999.

A Microprocessor With a 128b CPU, 10 Floating-Point MAC's, 4 Floating-Point Dividers, and an MPEG2 Decoder, 1999 IEEE International Solid-State Circuits Conference, Feb. 16, 1999.

Dreamcast Instruction Manual, Sega Enterprises, Ltd., © 1998.

"Sega To Launch Video Camera for Dreamcast", Reuters Business News, Feb. 16, 2000.

David Pescovitz, "Dream On", Wired, Aug. 1999.

Randy Nelson, "Dreamcast 101: Everything You Ever Wanted To Know About Sega's Powerful New Console", Official Sega Dreamcast Magazine, Jun. 1999.

2D/3D Graphics Card User Manual, Guillemot ©1999.

Nintendo 64 Instruction Booklet, Nintendo of America, 1998.

Steven Levy, "Here Comes PlayStation II", Newsweek, Mar. 6, 2000.

David Sheff, "Sony Smackage: Test Driving The PlayStation II", Wired, Nov. 1999.

Introducing The Next Generation PlayStation, Sony Computer Entertainment Inc., © 1999.

Leadtek GTS, Aug. 3, 2000, www.hexus.net.

Voodoo 5 5500 Review, Jul. 26, 2000, www.hexus.net.

ATI Radeon 64 Meg DDR OEM, Aug. 19, 2000, www.hexus.net.

Microsoft Xbox—The Future of Gaming, Microsoft Xbox Performance Sheet, www.xbox.com.

Robert L. Cook, "Shade Trees", Computer Graphics, vol. 18, No. 3, Jul. 1984.

Wang et al., "Second-Depth Shadow Mapping", Department of Computer Science, Univ. N.C, Chapel Hill, N.C. pp. 1-7.

Peercy et al., "Efficient Bump Mapping Hardware", Computer Graphics Proceedings, Annual Conference Series, 1997.

Gustavo Oliveira, "Refractive Texture Mappig, Part One", www.gamasutra.com, Nov. 10, 2000.

John Schlag, Fast Embossing Effects on Raster Image Data, Graphics Gems IV, Edited by Paul S. Heckbert, Computer Science Department, Carnegie Mellon University, Academic Press, Inc., 1994,pp. 433-437.

James F. Blinn, "Simulationof Wrinkled Surfaces," Caltech/JPL, pp. 286-292, SIGGRAPH 78 (1978).

Tomas Möller and Eric Haines "Real-Time Rendering", AK Peters, Ltd., © 1999, pp. 127-142.

Technical Presentation: Vertex Buffers, posted Jun. 12, 2000, www.nvidia.com.

Technical Presentation: Hardware Transform and Lighting, www.nvidia.com, posted Jun. 12, 2000.

Technical Presentation: Hardware Bump-mapping Choices and Concepts, Jun. 7, 2000, www.nvidia.com.

Technical Presentation: How to Bump Map a Skinned Polygonal Model, Jun. 7, 2000, www.nvidia.com.

Technical Presentation: Computations for Hardware Lighting and Shading, Mar. 17, 2000, www.nvidia.com.

Technical Presentation: Practical Bump-mapping for Today's GPUs, Mar. 17 2000 www.nvidia.com.

Technical Presentation: Shadows, Transparency, & Fog, Mar. 17, 2000 www.nvidia.com.

Technical Presentation: GeForce 256 Register Combiners, Mar. 17, 2000,www.nvidia.com.

Technical Presentation: TexGen & The Texture Matrix, Mar. 15, 2000 www.nvidia.com.

Technical Presentation: Toon Shading, Mar. 15, 2000, www.nvidia.com.

Technical Presentation: D3D 7 Vertex Lighting, Mar. 15, 2000, www.nvidia.com.

Technical Presentation: Per-Pixel Lighting (by S. Dietrich) Mar. 14, 2000 www.nvidia.com.

Technical Presentation: GeForce 256 and RIVA TNT Combiners, Dec. 8, 1999, www.nvidia.com.

Technical Presentation: Vertex Cache Optimization, Nov. 12, 1999, www.nvidia.com.

Technical Presentation: Vertex Blending, Nov. 12, 1999, www.nvidia.com.

Technical Presentation: Hardware Transform and Lighting, Nov. 12, 1999, www.nvidia.com.

Technical Presentation: GeForce 256 Overview, Nov. 12, 1999, www.nvidia.com.

Technical Presentation: DirectX 7 and Texture Management, Nov. 12, 1999 www.nvidia.com.

Technical Presentation: Dot Product Lighting, Nov. 12, 1999, www.nvidia.com.

Technical Presentation: Texture Coordinate Generation, Nov. 3, 1999, www.nvidia.com.

Technical Presentation: Phong Shading and Lightmaps, Nov. 3, 1999, www.nvidia.com.

Technical Presentation: The ARB_multitexture Extension, Nov. 3, 1999 www.nvidia.com.

Technical Presentation: Multitexture Combiners, Nov. 3, 1999, www.nvidia.com.

Technical Presentation: Emboss Bump Mapping, Nov. 3, 1999, www.nvidia.com.

Technical Presentation: Hardware Accelerated Anisotropic Lighting, Nov. 3, 1999 www.nvidia.com.

Technical Presentation: Guard Band Clipping, Nov. 3, 1999, www.nvidia.com.

The RenderMan Interface, Stephan R. Keith, Version 3.1, Pixar Animation Studios, Sep. 1989.

The RenderMan Interface, Version 3.2, Pixar Animation Studios, Jul. 2000, www.pixar.com.

NVIDIA Product Overview, "GeForce2Ultra", NVIDIA Corporation, Aug. 21, 2000, www.nvidia.com.

Duke, "Dreamcast Technical Specs", Sega Dreamcast Review, Sega, Feb. 1999, www.game-revolution.com.

Marlin Rowley, "GeForce 1 & 2 GPU Speed Tests", May 11, 2000, www.g256.com.

"Dreamcast: The Full Story", Next Generation, Sep. 1998.

DirectX 7.0 Programmer's Reference, Microsoft Corporation, 1995-1999 (as part of the DirectX 7.0 SDK on the Companion CD included with "Inside Direct3D", Microsoft Programming Series, Peter J. Kovach, Microsoft Press, 1999).

"Inside Direct3D", Microsoft Programming Series, Peter J. Kovach, Microsoft Press, 1999.

"OpenGL Programming Guide, The Official Guide to Learning OpenGL, Release 1", Jackie Nieder, Tom David, Mason Woo, Addision-Wesley Publishing Co., 1993.

"Procedural Elements for Computer Graphics," Second Edition, David F. Rogers, McGraw Hill, 1998.

"Real-Time Rendering," Tomas Molleir, Eric Haines, AK Peters, 1999.

"Computer Graphics, Principles and Practice," Second Edition, The Systems Programming Series, Foley, van Dam, Fiener, Hughes, Addison Wesley, 1990.

"Principles of Three-Dimensional Computer Animation", Revised Edition, Michael O'Rourke, W.W. Norton & Company, 1998.

GDC 2000: Advanced OpenGL Game Development, "A Practical and Robust Bump-mapping Technique for Today's GPUs," by Mark Kilgard, Jul. 5, 2000, www.nvidia.com.

Technical Presentations: "Texture Space Bump Mapping," Sim Dietrich, Nov. 10, 2000, www.nvidia.com.

White paper, Huddy, Richard, "The Efficient Use of Vertex Buffers," (Nov. 1, 2000).

White paper, Spitzer, John, et al., "Using GL_NV_array_range and GL_NV_Fence on GEForce Products and Beyond" (Aug. 1, 2000).

White paper, Rogers, Douglas H., "Optimizing Direct3D for the GeForce 256" (Jan. 3, 2000).

Hook, Brian, "Incomplete Guide to Programming DirectDraw and Direct3D Immediate Mode (Release 0.46)," printed from web site: www.wksoftware.com, 42 pages.

Thompson, Tom, "Must-See 3-D Engines," Byte Magazine, printed from web site www.byte.com, 10 pages (Jun. 1996).

Thompson, Nigel, "Rendering with Immediate Mode," Microsoft Interactive Developer Column: Fun and Games, printed from web site msdn.microsoft.com, 8 pages (Mar. 97).

"HOWTO: Animate Textures in Direct3D Immediate Mode," printed from web site support.microsoft.com, 3 pages (last reviewed Dec. 15, 2000).

INFO: Rendering a Triangle Using an Execute Buffer, printed from web site support.microsoft.com, 6 pages (last reviewed Oct. 20, 2000).

U.S. Appl. No. 09/337,293, filed Jun. 21, 1999, Multi-Format Vertex Data Processing Apparatus and Method [issued as U.S. Patent No. 6,501,479 B1 on Dec. 31, 2002].

Datasheet, SGS-Thomson Microelectronics, nVIDIA™, RIVA 128™ 128-Bit 3D Multimedia Accelerator (Oct. 1997).

Product Presentation, "RIVA128™ Leadership 3D Acceleration," 2 pages.

ZDNet Reviews, from PC Magazine, "Other Enhancements," Jan. 15, 1999, wysiwyg://16/http://www4.zdnet.com . . . ies/reviews/0,4161,2188286,00.html.

ZDNet Reviews, from PC Magazine, "Screen Shot of Alpha-channel Transparency," Jan. 15, 1999, wysiwyg://16/http://www4.zdnet.com . . . ies/reviews/0,4161,2188286,00.html.

Alpha (transparency) Effects, Future Technology Research Index, http://www.futuretech.vuurwerk.n1/alpha.html.

Blythe, David, 5.6 Transparency Mapping and Trimming with Alpha, http://toolbox.sgi.com/TasteOfDT/d . . . penGL/advanced98/notes/node41.html, Jun. 11, 1998.

10.2 Alpha Blending, http://www.sgi.com/software/opengl/advanced98/notes/node146.html.

10.3 Sorting, http://www.sgi.com/software/opengl/advanced98/notes/node147.html.

10.4 Using the Alpha Function, http://www.sgi.com/software/opengl/advanced98/notes/node148.html.

Winner, Stephanie, et al., "Hardware Accelerated Rendering Of Antialiasing Using A Modified A-buffer Algorithm," Computer Graphics Proceedings, Annual Conference Series, 1997, pp. 307-316.

Debevec, Paul, et al., "Efficient View-Dependent Image-Based Rendering with Projective Texture-Mapping," University of California at Berkeley.

Gibson, Simon, et al., "Interactive Rendering with Real-World Illumination," Rendering Techniques 2000; 11th Eurographics Workshop on Rendering, pp. 365-376 (Jun. 2000).

Segal, Mark, et al., "Fast Shadows and Lighting Effects Using Texture Mapping," Computer Graphics, 26, 2, pp. 249-252 (Jul. 1992).

White paper, Kilgard, Mark J., "Improving Shadows and Reflections via the Stencil Buffer" (Nov. 3, 1999).

"OpenGL Projected Textures," from web site:HTTP:// reality.sgi.com, 5 pages.

"5.13.1 How to Project a Texture," from web site: www.sgi.com, 2 pages.

Arkin, Alan, email, subject: "Texture distortion problem," from web site: HTTP://reality.sgi.com (Jul. 1997).

Moller, Tomas et al., "Real-Time Rendering," pp. 179-183 (AK Peters Ltd., 1999).

Williams, Lance, "Casting Curved Shadows on Curved Surfaces," Computer Graphics (SIGGRAPH '78 Proceedings), vol. 12, No. 3, pp. 270-274 (Aug. 1978).

Woo et al., "A Survey of Shadow Algorithms," IEEE Computer Graphics and Applications, vol. 10, No. 6, pp. 13-32 (Nov. 1990).

Heidrich et al., "Applications of Pixel Textures in Visualization and Realistic Image Synthesis," Proceedings 1999 Symposium On Interactive 3D Graphics, pp. 127-134 (Apr. 1999).

Hourcade et al, "Algorithms for Antialiased Cast Shadows", Computers and Graphics, vol. 9, No. 3, pp. 260-265 (1985).

Michael McCool, "Shadow Volume Reconstruction from Depth Maps", ACM Transactions on Graphics, vol. 19, No. 1, Jan. 2000, pp. 1-26.

RenderMan Artist Tools, PhotoRealistic RenderMan 3.8 User's Manual, Pixar (Aug. 1998).

RenderMan Interface Version 3.2 (Jul. 2000).

White paper, Dietrich, Sim, "Cartoon Rendering and Advanced Texture Features of the GeForce 256 Texture Matrix, Projective Textures, Cube Maps, Texture Coordinate Generation and DOTPRODUCT3 Texture Blending" (Dec. 16, 1999).

Peter J. Kovach, Inside Direct 3D, "Alpha Testing," pp. 289-291 (1999).

Web site information, CartoonReyes, REM Infografica, http://www.digimotion.co.uk/cartoonreyes.htm.

Raskar, Ramesh et al., "Image Precision Silhouette Edges," Symposium on Interactive 3D Graphics1999, Atlanta, 7 pages (Apr. 26-29, 1999).

Schlechtweg, Stefan et al., Rendering Line-Drawings with Limited Resources, Proceedings of GRAPHICON '96, 6th International Conference and Exhibition on Computer Graphics and Visualization in Russia, (St. Petersburg, Jul. 1-5, 1996) vol. 2, pp. 131-137.

Haeberli, Paul et al., "Texture Mapping as a Fundamental Drawing Primitive," Proceedings of the Fourth Eurographics Workshop on Rendering, 11pages, Paris, France (Jun. 1993).

Schlechtweg, Stefan et al., "Emphasising in Line-drawings," Norsk samarbeid innen grafisk databehandling: NORSIGD Info, medlemsblad for NORSIGD, Nr Jan. 1995, pp. 9-10.

Markosian, Lee et al., "Real-Time Nonphotorealistic Rendering," Brown University site of the NSF Science and Technology Center for Computer Graphics and Scientific Visualization, Providence, RI, 5 pages (undated).

Feth, Bill, "Non-Photorealistic Rendering," wif3@cornell.edu, CS490—Bruce Land, 5 pages (Spring 1998).

Elber, Gershon, "Line Art Illustrations of Parametric and Implicit Forms," IEEE Transactions on Visualization and Computer Graphics, vol. 4, No. 1, Jan.-Mar. 1998.

Zeleznik, Robert et al."SKETCH: An Interface for Sketching 3D Scenes," Computer Graphics Proceedings, Annual Conference Series 1996, pp. 163-170.

Computer Graphics World, Dec. 1997.

Reynolds, Craig, "Stylized Depiction in Computer Graphics, Non-Photorealistic, Painterly and 'Toon Rendering," an annotated survey of online resources, 13 pages, last update May 30, 2000, http://www.red.com/cwr/painterly.html.

Render Man Artist Tools, Using Arbitrary Output Variables in Photorealistic Renderman (With Applications), PhotoRealistic Renderman Application Note #24, 8 pages, Jun. 1998, http://www.pixar.com/products/renderman/toolkit/Toolkit/AppNotes/appnote.24.html.

Decaudin, Philippe, "Cartoon-Looking Rendering of 3D Scenes," Syntim Project Inria, 6 pages , http://www-syntim.inria.fr/syntim/recherche/decaudin/cartoon-eng.html.

Hachigian, Jennifer, "Super Cel Shader 1.00 Tips and Tricks," 2 pages, wysiwyg://thePage.13/http://members.xoom.com/_XMCM.jarvia/3D/celshade.html.

Digimation Inc., "The Incredible Comicshop," info sheet, 2 pages, http://www.digimation.com/asp/product/asp?product_id=33.

Softimage/3D Full Support, "Toon Assistant," 1998 Avid Technology, Inc., 1 page, http;//www.softimage.com/3dsupport/techn . . . uments/3.8/features3.8/rel_notes.56.html.

Cambridge Animo—Scene III, info sheet, Cambridge Animation Systems, 2 pages, http://www.cam-ani.co.uk/casweb/products/software/SceneIII.htm.

Mulligan, Vikram, "Toon," info sheet, 2 pages, http://digitalcarversguild.com/products/toon/toon.thml.

Toony Shaders, "Dang I'm tired of photorealism," 4 pages, http://www.visi.com/~mcdonald/toony.html.

"Cartoon Shading, Using Shading Mapping," 1 page, http://www.goat.com/alias/shaders.html#toonshad.

web site information, CartoonReyes, http://www.zentertainment.com/zentropy/review/cartoonreyes.html.

VIDI Presenter 3D Repository, "Shaders." 2 pages, http://www.webnation.com/vidirep/panels/renderman/shaders/toon.phtml.

The RenderMan Interface Version 3.1, (Sep. 1989).

"Renderman Artist Tools, PhotoRealistic RenderMan Tutorial," Pixar (Jan. 1996).

Web site materials, "Renderman Artist Tools, PhotoRealistic RenderMan 3.8 User's Manual," Pixar.

NVIDIA.com, technical presentation, "AGDC Per-Pixel Shading" (Nov. 15, 2000).

NVIDIA.com, technical presentation, Introduction to DX8 Pixel Shaders (Nov. 10, 2000).

NVIDIA.com, technical presentation, "Advanced Pixel Shader Details" (Nov. 10, 2000).

"Developer's Lair, Multitexturing with the ATI Range Pro," (7 pages) from ati.com web site (2000).

Slide Presentation, Sébastien Dominé, "nVIDIA Mesh Skinning, OpenGl".

Singh, Karan et al., "Skinning Characters using Surface-Oriented Free-Form Deformations," Toronto Canada.

"Hardware Technology," from ATI.com web site, 8 pages (2000).

"Skeletal Animation and Skinning," from ATI.com web site, 2 pages (Summer 2000).

"Developer Relations, ATI Summer 2000 Developer Newsletter," from ATI.com web site, 5 pages (Summer 2000).

Press Releases, "ATI's RADEON family of products delivers the most comprehensive support for the advance graphics features of DirectX 8.0," Canada, from ATI.com web site, 2 pages (Nov. 9, 2000).

"ATI RADEON Skinning and Tweening," from ATI.com web site, 1 page (2000).

Hart, Evan et al., "Vertex Shading with Direct3D and OpenGL," Game Developers Conference 2001, from ATI.com web site (2001).

Search Results for: skinning, from ATI.com web site, 5 pages (May 24, 2001).

Hart, Evan et al., "Graphics by rage," Game Developers Conference 2000, from ATI.com web site (2000).

Efficient Command/Data Interface Protocol For Graphics, IBM TDB, vol. 36, issue 9A, Sep. 1, 1993, pp. 307-312.

Shade, Jonathan et al., "Layered Depth Images," Computer Graphics Proceedings, Annual Conference Series, pp. 231-242 (1998).

Videum Conference Pro (PCI) Specification, product of Winnov (Winnov), published Jul. 21, 1999.

Hoppe, Hugues, "Optimization of Mesh Locality for Transparent Vertex Caching," Proceedings of SIGGRAPH, pp. 269-276 (Aug. 8-13, 1999).

Whitepaper: Implementing Fog in Direct3D, Jan. 3, 2000, www.nvidia.com.

Akeley, Kurt, "Reality Engine Graphics", 1993, Silicon Graphics Computer Systems, pp. 109-116.

Peter J. Kovach, Inside DIRECT3D pp. 249-262, Microsoft Press 2000.

McCool, M.D. et al., "Texture Shaders," Proceedings 1999 Eurographics / SiggraphWorkshop On Graphics Hardware, Los Angeles, CA, Aug. 8-9, 1999, Siggraph / Eurographics Workshop On Graphics Hardware, New York, NY: ACM, US, pp. 122-125, Figure 4 (Aug. 8, 1999).

Heidrich W. et al., "Illuminating micro geometry based on precomputed visibility," Computer Graphics Proceedings, Siggraph 2000, Conference Proceedings, New Orleans, LA, USA, Jul. 27-28, 2000, pp. 455-464, New York, NY, USA, ACM.

Heidrich et al., "Illuminating Micro Geometry Based on Precomputed Visibility," Computer Graphics Proceedings, Annual Conference Series, 2000, pp. 455-464.

McCool et al., "Texture Shaders," Proceedings 1999 Eurographics Workshop, Los Angeles, CA, Aug. 8-9, 1999, pp. 117-126; 144.

* cited by examiner

Fig. 5  EXAMPLE GRAPHICS PROCESSOR FLOW

Logical Block Diagram of Indirect Texture Processing

*REGULAR TEXTURE LOOKUP*

*INDIRECT TEXTURE LOOKUP*

Physical Block Diagram of Direct and Indirect Texture Processing

REGULAR(NON-INDIRECT) TEXTURE PROCESSING

REGULAR AND INDIRECT TEXTURE PROCESSING

EXAMPLE BUMP/TEXTURE
COORDINATE PROCESSING UNIT

EXAMPLE INDIRECT-TEXTURE
LOOKUP DATA PROCESSING LOGIC $$\begin{pmatrix} s' \\ t' \end{pmatrix} = \overbrace{\begin{pmatrix} ma & mb \\ mc & md \\ me & mf \end{pmatrix}}^{M} \cdot \overbrace{\begin{pmatrix} s \\ t \\ u \end{pmatrix}}^{V}$$

Fig. 16A
*EXAMPLE TEXTURE OFFSET MATRICES*

Matrix A
$$\begin{pmatrix} s/256 & t/256 \\ 0 & 0 \\ 0 & 0 \end{pmatrix}$$

Matrix B
$$\begin{pmatrix} 0 & 0 \\ s/256 & t/256 \\ 0 & 0 \end{pmatrix}$$

Fig. 16B
*EXAMPLE TEXTURE OFFSET MATRICES*

| | | | |
|---|---|---|---|
| $MTXA_i$ | $s_i$ (1:0) | $mb_i$ (10:0) | $ma_i$ (10:0) |
| $MTXB_i$ | $s_i$ (3:2) | $md_i$ (10:0) | $mc_i$ (10:0) |
| $MTXC_i$ | $s_i$ (5:4) | $mf_i$ (10:0) | $me_i$ (10:0) |
| $CMDi$ | /// $fb_i$ /// $tw_i$ $sw_i$ | $m_i$ | /// $bias_i$ $fmt_i$ $bt_i$ |
| | ⋮ | | |
| | | | imask (7:0) |
| GEN MODE | /// | nbmp | ntev | ntex |

Fig. 17
*EXAMPLE CONTROL LOGIC REGISTERS*

METHOD AND APPARATUS FOR INTERLEAVED PROCESSING OF DIRECT AND INDIRECT TEXTURE COORDINATES IN A GRAPHICS SYSTEM

RELATED APPLICATIONS

This application claims the benefit of U.S. Provisional Application Ser. No. 60/226,891, filed Aug. 23, 2000, the entire content of which is hereby incorporated by reference.

FIELD OF THE INVENTION

The present invention relates to computer graphics, and more particularly to interactive graphics systems such as home video game platforms. Still more particularly this invention relates to direct and indirect texture mapping/processing in a graphics system.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

A problem graphics system designers confronted in the past was how to create realistic looking surface detail on a rendered object without resorting to explicit modeling of the desired details with polygons or other geometric primitives. Although surface details can be simulated, for example, using myriad small triangles with interpolated shading between vertices, as the desired detail becomes finer and more intricate, explicit modeling with triangles or other primitives places high demands on the graphics system and becomes less practical. An alternative technique pioneered by E. Catmull and refined by J. F. Blinn and M. E. Newell is to "map" an image, either digitized or synthesized, onto a surface. (See "A Subdivision Algorithm for Computer Display of Curved Surfaces" by E. Catmull, Ph.D. Thesis, Report UTEC-CSc-74-133, Computer Science Department, University of Utah, Salt Lake City, Utah, December 1994 and "Texture and Reflection in Computer Generated Images" by J. F. Blinn and M. E. Newell, CACM, 19(10), October 1976, 452-457). This approach is known as texture mapping (or pattern mapping) and the image is called a texture map (or simply referred to as a texture). Alternatively, the texture map may be defined by a procedure rather than an image.

Typically, the texture map is defined within a 2D rectangular coordinate space and parameterized using a pair of orthogonal texture coordinates such, as for example, (u, v) or (s, t). Individual elements within the texture map are often called texels. At each rendered pixel, selected texels are used either to substitute for or to scale one or more material properties of the rendered object surface. This process is often referred to as texture mapping or "texturing."

Most 3-D graphics rendering systems now include a texturing subsystem for retrieving textures from memory and mapping the textures onto a rendered object surface. Sophisticated texturing effects utilizing indirect or multiple textures are also possible such as, for example, multi-texturing, meta-textures or texture tiling, but conventional approaches typically involve complex hardware arrangements such as using multiple separate texture retrieval/mapping circuits (units) where the output of one texturing circuit provides the input to a next texturing circuit. Such duplicated circuitry is essentially idle whenever such effects are not used. In on-chip graphics processing implementations, the additional circuitry requires more chip real-estate, can reduce yield and reliability, and may significantly add to the overall production cost of the system. Consequently, a further problem confronting graphics system designers is how to efficiently implement these more sophisticated texturing effects without associated increases in texture mapping hardware complexity.

One solution is to use a single texture addressing/mapping circuit and perform multiple texturing passes. Nominally, this may require at least generating a first set of texture addressing coordinates, accessing a first texture, storing the data retrieved in a temporary storage, and then regenerating the same set of texture coordinates again for use in computing new coordinates when accessing a second texture in the next or a subsequent texturing pass. Although this approach may reduce hardware complexity somewhat, it is fairly time consuming, requires generating/providing the same set of texture coordinates multiple times, and results in inefficient processing during mode changes (e.g., switching between direct and indirect texturing operational modes). Moreover, this approach results in a very course granularity in the data processing flow through the graphics rendering system—significantly affecting polygon fill rate.

To solve this problem and to provide an enhanced repertoire of texturing capabilities for a 3-D graphics system, the present invention provides a versatile texturing pipeline arrangement achieving a relatively low chip-footprint by utilizing a single texture address coordinate/data processing unit that interleaves the processing of logical direct and indirect texture coordinate data and provides a texture lookup data feedback path for "recirculating" retrieved indirect texture lookup data from a single texture retrieval unit back to the texture address coordinate/data processing unit. The interleaved coordinate processing and recirculated/feedback data arrangement of the present invention allow efficient processing of any number of logical direct and/or indirect texture mapping stages from a smaller number of hardware texture processing units while preserving a fine granularity in the overall data processing flow.

In accordance with one aspect provided by the present invention, the recirculating/data-feedback arrangement of the texturing pipeline portion of the graphics processing enables efficient use and reuse of a single texture lookup (retrieval) unit for both logical direct and indirect texture processing without requiring multiple rendering passes and/or temporary texture storage hardware.

In accordance with another aspect provided by the invention, the texture address (coordinate) processing hardware is arranged to perform various coordinate computations based on the recirculated/feedback texture data and to process both direct and indirect coordinate data together in a substantially continuous interleaved flow (e.g., to avoid any "course granularity" in the processing flow of graphics data throughout the system). This unique interleaved processing/data-recirculating texture pipeline arrangement enables efficient and flexible texture coordinate processing and texture retrieval/mapping operations while using a minimum amount of hardware for providing an enhanced variety of possible direct and indirect texturing applications.

In accordance with another aspect provided by this invention, an effectively continuous processing of coordinate data for performing logical direct and indirect texture lookups is achieved by interleaving the processing of both direct and indirect coordinate data per pixel within a single texture coordinate processing hardware unit. For example, a selector can be used to look for "bubbles" (unused cycles) in the indirect texture coordinate stream, and to insert computed texture coordinate data in such "bubbles" for maximum utilization of the texture mapper.

In accordance with yet another aspect provided by the invention, a hardware implemented texturing pipeline includes a texture lookup data feedback path by which the same texture data retrieval unit can be used and reused to:
both lookup direct indirect textures, and
supply indirect texture lookup data.

The same texture address (coordinate) processing unit can be used and reused for processing both logical direct and indirect texture coordinate data and computing new/modified texture coordinates.

In accordance with yet another aspect provided by this invention, a set of texture mapping parameters is presented to a texture mapping unit which is controlled to perform a texture mapping operation. The results of this texture mapping operation are recirculated and used to present a further set of texture mapping parameters which are fed back to the input of the same texture mapping unit. The texture mapping unit performs a further texture mapping operation in response to these recirculated parameters to provide a further texture mapping result.

The first texture mapping operation may comprise an indirect texture mapping operation, and a second texture mapping operation may comprise a direct texture mapping operation. The processing and presentation of texture mapping parameters to a texture mapping unit for performing direct texture mapping operations may be interleaved with the processing and presentation of texture mapping parameters for performing indirect direct texture mapping operations.

In accordance with a further aspect provided by this invention, a method of indirect texture referencing uses indirect texture coordinates to generate a data triplet which is then used to derive texture coordinates. The derived texture coordinates are then used to map predetermined texture data onto a primitive. In accordance with yet a further aspect provided by the invention, the retrieved data triplet stored in texture memory is used to derive a set of modified texture coordinates which are then used to reference texture data stored in the texture memory corresponding to a predetermined texture.

In accordance with yet another aspect provided by this invention, a graphics system includes:
a texture coordinate/data processing unit for interleaved processing of logical direct and indirect coordinate data comprising an arrangement of at least one data multiplier and at least one data accumulator;
a texture data retrieval unit connected to the coordinate/data processing unit, the texture data retrieval unit retrieving texture data stored in a texture memory; and
a data feedback path from a texture data retrieval unit to the texture coordinate/data processing unit to recycle retrieved texture data through the texture coordinate/data processing unit for further processing;
wherein in response to a set of texture coordinates the retrieval unit provides retrieved texture data to the processing unit for deriving modified texture coordinates which are used in mapping a texture to a surface of a rendered image object.

In accordance with yet another aspect provided by this invention, a texture processing system for selectively mapping texture data corresponding to one or more different textures and/or texture characteristics to surfaces of rendered and displayed images includes a texture coordinate offset matrix arrangement producing a set of offset texture coordinates by multiplying indirect texture data by elements of a matrix, wherein one or more elements of the matrix are a mathematical function of one or more predetermined direct texture coordinates and one or more elements of the matrix can be selectively loaded.

In accordance with yet another aspect provided by this invention, a set of indirect texture coordinates are used to retrieve data triplets stored in texture memory, and a set of modified texture coordinates are derived based at least in part on the retrieved data triplets. The set of modified texture coordinates is then used for retrieving data stored in texture memory. These steps are reiteratively repeated for a predetermined number of data retrievals, and a set of derived texture coordinates resulting from the repetition is used to map predetermined texture data onto a primitive.

In accordance with yet another aspect provided by the invention, a set of generalized API (application program interface) indirect texture mapping functions are defined and supported by the texturing pipeline apparatus which permits specifying arguments for performing at least four indirect-texture operations (indirect lookup stages) and for selectively associating one of at least eight pre-defined textures and one of at least eight pre-defined sets of texture coordinates with each indirect texturing operation. The defined API indirect texture mapping functions also permit specifying texture scale, bias and coordinate wrap factors as well as a variety of texture coordinate offset multiplication matrix configurations and functions for computing new/modified texture lookup coordinates within the texturing pipeline.

In accordance with yet a further aspect provided by the invention, a texture address (coordinate) processing unit transforms retrieved texture color/data from an indirect texture lookup into offsets that are added to the texture coordinates of a regular (non-direct) texture lookup. The feedback path provides texture color/data output from a texture retrieval unit to a texture coordinate processing unit used to generate/provide texture coordinates to the texture retrieval unit.

In accordance with yet a further aspect provided by the invention, a single texture address processing unit comprising at least a pair of FIFO buffers is utilized for interleaving and synchronizing the processing of both "direct" (regular non-indirect) and "indirect" texture coordinates, and a single texture data retrieval unit is used for retrieving and recirculating indirect-texture lookup data back to the texture address processing unit for computing new/modified texture lookup coordinates. In an example embodiment, the retrieved indirect-texture lookup data is processed as multi-bit binary data triplets of three, four, five, or eight bits. The data triplets are multiplied by a 3×2 element texture coordinate offset matrix before being optionally combined with direct coordinate data, or with computed data from a previous cycle/stage of texture address processing, to compute modified offset texture coordinates for accessing a texture map in main memory. Values of the offset matrix elements are programmable and may be dynamically defined for successive processing cycles/stages using selected predetermined constants or values based on direct coordinates. A variety of offset matrix configurations are selectable including at least three offset matrix configurations containing elements based on programmable constants and two "variable" matrix configurations containing elements based on a values from a set of direct texture coordinates. Circuitry for optionally biasing and scaling retrieved texture data is also provided

BRIEF DESCRIPTION OF THE DRAWINGS

These and other features and advantages provided by the invention will be better and more completely understood by referring to the following detailed description of presently preferred embodiments in conjunction with the drawings. The file of this patent contains at least one drawing executed in color. Copies of this patent with color drawing(s) will be provided by the Patent and Trademark Office upon request and payment of the necessary fee. The drawings include the following figures:

FIGS. 16A and 16B show example texture offset matrices used by processing logic circuit (proc) of FIG. 15;

FIG. 17 is a block diagram illustrating example data field formats of control logic registers for controlling the operations within the processing circuitry of FIG. 15;

DETAILED DESCRIPTION OF EXAMPLE EMBODIMENTS OF THE INVENTION

Figure 1:
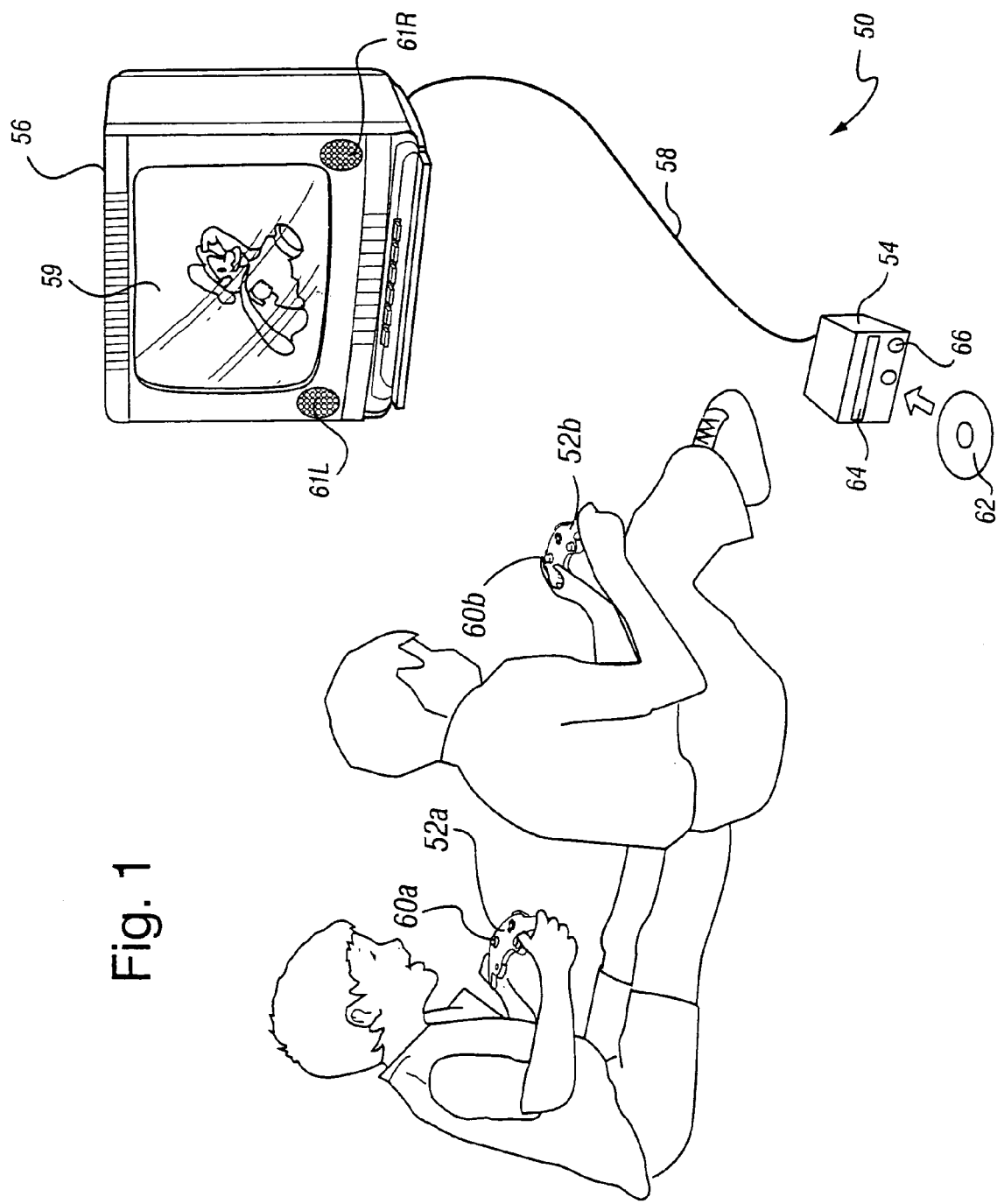
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
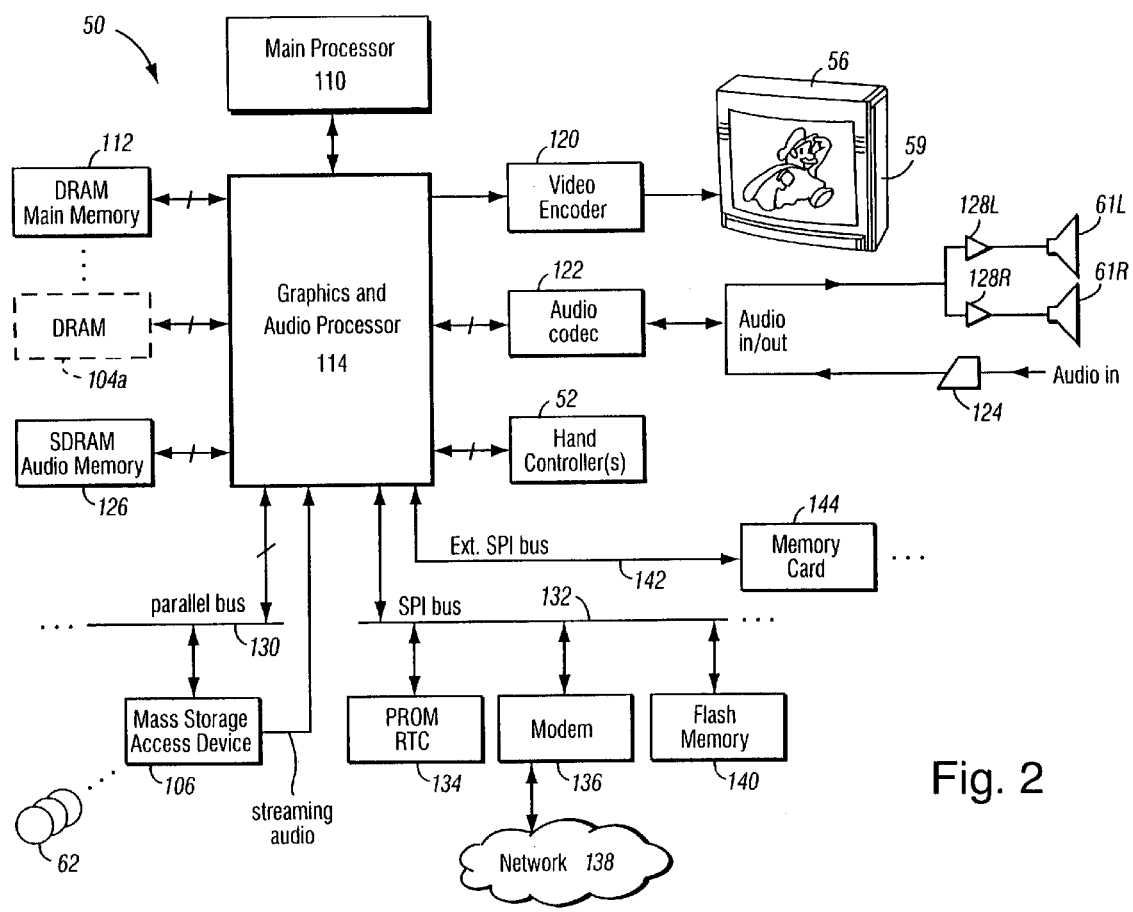
FIG. 2 is a block diagram of the FIG. 1 example computer graphics system.

FIG. 2 shows a block diagram of example components of system 50. The primary components include:

a main processor (CPU) 110,
a main memory 112, and
a graphics and audio processor 114.

In this example, main processor 110 (e.g., an enhanced IBM Power PC 750) receives inputs from handheld controllers 108 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:

a programmable read-only memory and/or real time clock 134, a modem 136 or other networking interface (which may in turn connect system 50 to a telecommunications network 138 such as the Internet or other digital network from/to which program instructions and/or data can be downloaded or uploaded), and flash memory 140.

A further external serial bus 142 may be used to communicate with additional expansion memory 144 (e.g., a memory card) or other devices. Connectors may be used to connect various devices to busses 130, 132, 142.

Example Graphics And Audio Processor

Figure 3:
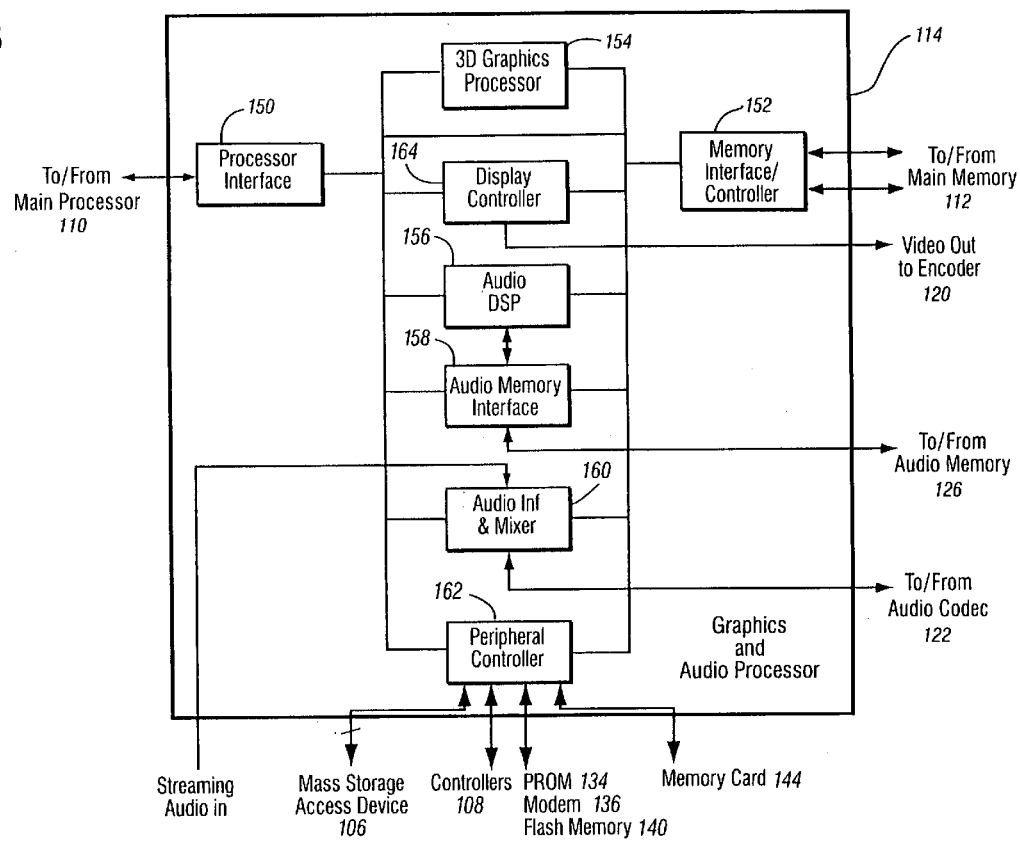
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:

a processor interface 150,
a memory interface/controller 152,
a 3D graphics processor 154,
an audio digital signal processor (DSP) 156,
an audio memory interface 158,
an audio interface and mixer 160,
a peripheral controller 162, and
a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
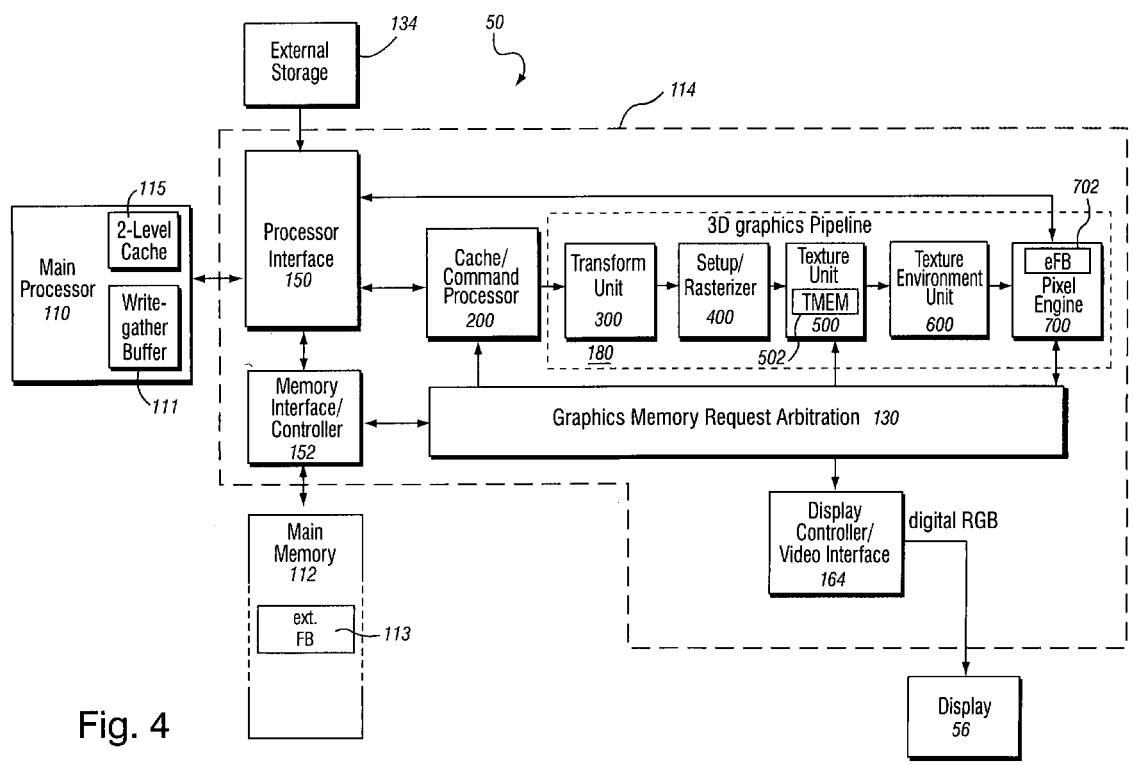
FIG. 4 is a block diagram of the example 3D graphics processor shown in FIG. 3.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 111 for non-cached data streams targeted for the graphics and audio processor 114. The write-gathering buffer 111 collects partial cache lines into full cache lines and sends the data out to the graphics and audio processor 114 one cache line at a time for maximum bus usage.

Command processor 200 parses display commands received from main processor 110—obtaining any additional data necessary to process the display commands from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56.

Figure 5:
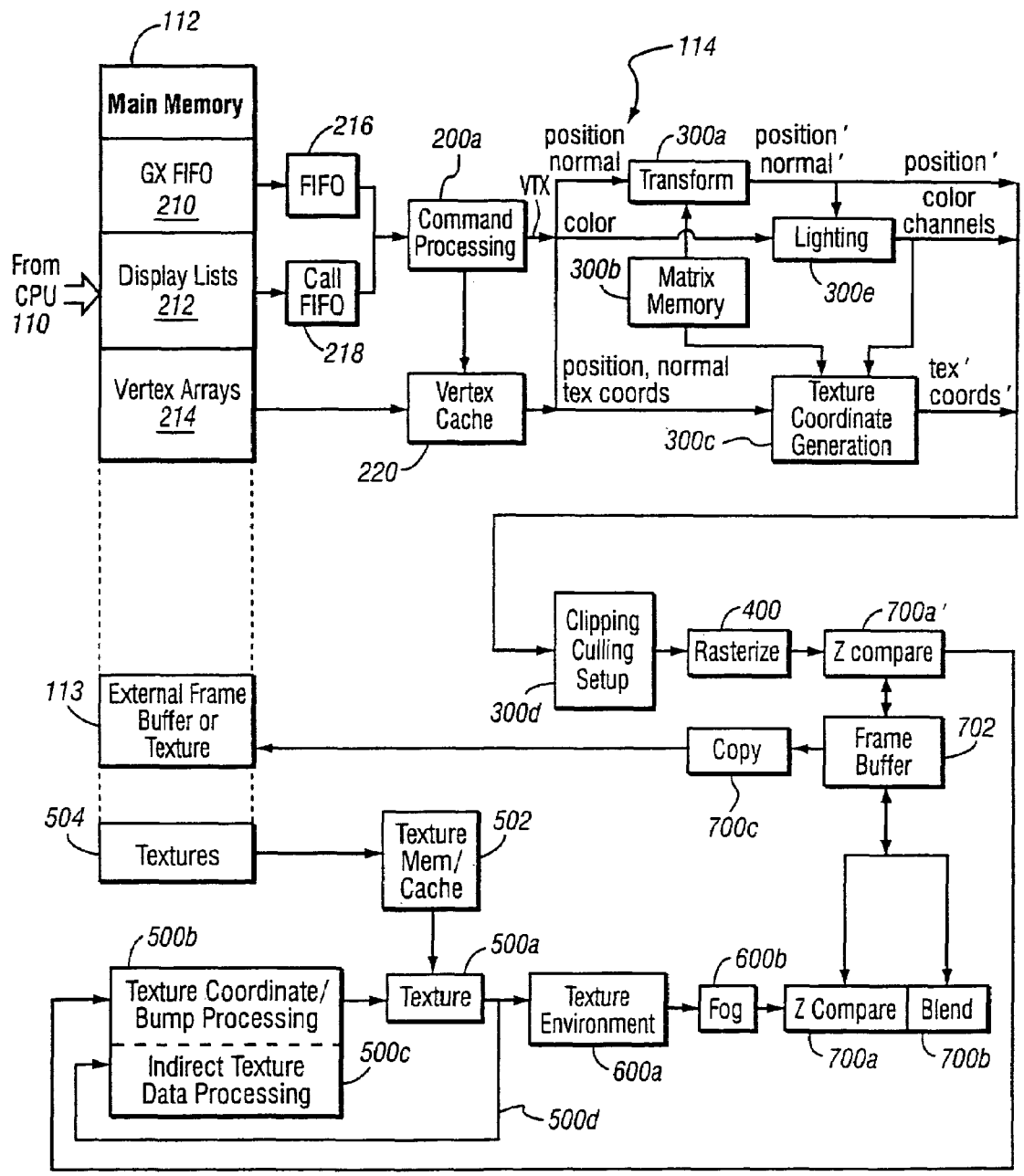
FIG. 5 is an example logical flow diagram of the FIG. 4 graphics and audio processor.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 110. The command processor 200 fetches:

command streams from main memory 112 via an on-chip FIFO memory buffer 216 that receives and buffers the graphics commands for synchronization/flow control and load balancing, display lists 212 from main memory 112 via an on-chip call FIFO memory buffer 218, and vertex attributes from the command stream and/or from vertex arrays 214 in main memory 112 via a vertex cache 220.

Command processor 200 performs command processing operations 200a that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:

a transform unit 300, a setup/rasterizer 400, a texture unit 500, a texture environment unit 600, and a pixel engine 700.

Transform unit 300 performs a variety of 2D and 3D transform and other operations 300a (see FIG. 5). Transform unit 300 may include one or more matrix memories 300b for storing matrices used in transformation processing 300a. Transform unit 300 transforms incoming geometry per vertex from object space to screen space; and transforms incoming texture coordinates and computes projective texture coordinates (300c). Transform unit 300 may also perform polygon clipping/culling 300d. Lighting processing 300e also performed by transform unit 300b provides per vertex lighting computations for up to eight independent lights in one example embodiment. Transform unit 300 can also perform texture coordinate generation (300c) for embossed type bump mapping effects, as well as polygon clipping/culling operations (300d).

Setup/rasterizer 400 includes a setup unit which receives vertex data from transform unit 300 and sends triangle setup information to one or more rasterizer units (400b) performing edge rasterization, texture coordinate rasterization and color rasterization.

Texture unit 500 (which may include an on-chip texture memory (TMEM) 502) performs various tasks related to texturing including for example:

retrieving textures 504 from main memory 112, texture processing (500a) including, for example, multi-texture handling, post-cache texture decompression, texture filtering, embossing, shadows and lighting through the use of projective textures, and BLIT with alpha transparency and depth, bump map processing for computing texture coordinate displacements for bump mapping, pseudo texture and texture tiling effects (500b), and indirect texture processing (500c).

Graphics pipeline 180 includes a versatile texturing pipeline architecture that facilitates the implementation of various direct and indirect texturing features. As shown in FIG. 5, the texturing pipeline basically comprises:

texture unit 500a for performing texture data lookup retrieval, indirect texture/bump units 500b/500c for texture coordinate/texture data processing, texture lookup data feedback path 500d and texture environment unit 600 for staged color data and alpha (transparency data) blending.

Reuse of units 500a, 500b, 500c can be used to provide a variety of interesting effects including multitexturing for example. Furthermore, the present invention supports indirect texturing through reuse/recirculation of these components. In an example hardware implementation, texture address coordinate/bump processing block 500b and indirect texture data processing block 500c are portions of a single texture coordinate/data processing unit and the texturing pipeline is configured so as to allow retrieved texture indirect lookup data from texture unit 500a to be provided back via data feedback connection 500d to texture address coordinate/bump processor 500b/500c. The texture coordinate/data processing unit transforms texture data retrieved from an indirect texture lookup into offsets that are then added to texture coordinates for another (regular/non-indirect) texture lookup.

Using the above described feedback path arrangement, retrieved texture data can effectively be "recirculated" back into the texture processing pipeline for further processing/ computation to obtain new/modified texture lookup coordinates. This recirculated/recycled texture lookup data arrangement enables efficient and flexible indirect texture mapping/processing operations providing an enhanced variety of indirect texture applications. A few of the various applications of indirect texture mapping/processing which the texturing pipeline can provide include, for example:

Texture warping

Meta-textures

Texture tile maps

Pseudo-3D textures

Environment-mapped bump mapping

Texture unit 500 outputs filtered texture values to the texture environment unit 600 for texture environment processing (600a). Texture environment unit (TEV) 600 blends polygon and texture color/alpha/depth, and can also perform texture fog processing (600b) to achieve inverse range based fog effects. Texture environment unit 600 can provide multiple stages to perform a variety of other interesting environment-related functions based for example on color/alpha modulation, embossing, detail texturing, texture swapping, clamping, and depth blending. Texture environment unit 600 can also combine (e.g., subtract) textures in hardware in one pass. For more details concerning the texture environment unit 600, see commonly assigned application Ser. No. 09/722,367, entitled "Recirculating Shade Tree Blender for a Graphics System" and its corresponding provisional application Ser. No. 60/226,888, filed Aug. 23, 2000, both of which are incorporated herein by reference.

Pixel engine 700 performs depth (z) compare (700a) and pixel blending (700b). In this example, pixel engine 700 stores data into an embedded (on-chip) frame buffer memory 702. Graphics pipeline 180 may include one or more embedded DRAM memories 702 to store frame buffer and/or texture information locally. Depth (z) compares can also be performed at an earlier stage 700a' in the graphics pipeline 180 depending on the rendering mode currently in effect (e.g., z compares can be performed earlier if alpha blending is not required). The pixel engine 700 includes a copy operation 700c that periodically writes on-chip frame buffer 702 to main memory 112 for access by display/video interface unit 164. This copy operation 700c can also be used to copy embedded frame buffer 702 contents to textures in the main memory 112 for dynamic texture synthesis effects. Anti-aliasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 102.

Example Indirect Texturing—Logical Overview

Figure 6:
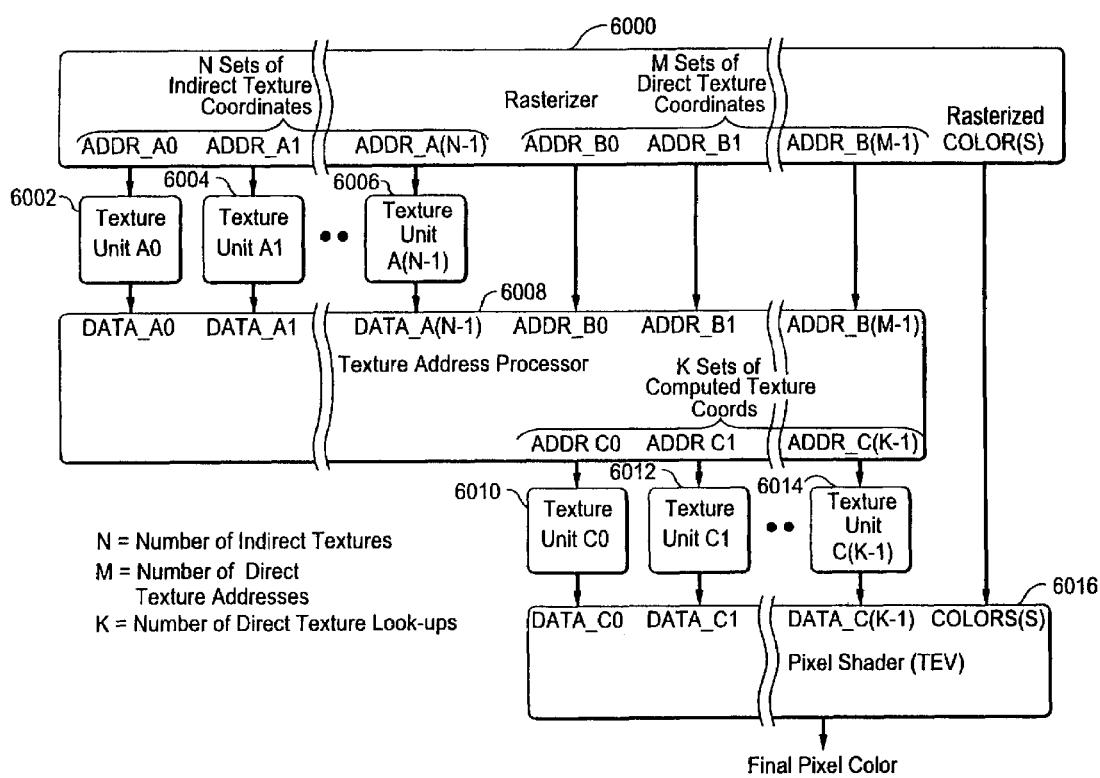
FIG. 6 is block diagram illustrating a logical overview of indirect texture processing in accordance with the present invention.

FIG. 6 shows a logical overview of indirect texturing supported by system 50. In accordance with the logical overview as illustrated by FIG. 6, a rasterizer 6000 may generate N sets of indirect texture addresses (coordinates), ADDR_A0 through ADDR_A(N-1), and M sets of direct texture addresses (coordinates), ADDR_B0 through ADDR_B(M-1). The N sets of indirect texture coordinates, ADDR_A0 through ADDR_A(N-1), are passed to N corresponding logical texture lookup units 6002, 6004, 6006 (A0 through A(N-1)). Each logical texture lookup unit (which, in one example implementation, is provided by reusing the same physical texture lookup units N times) uses the received indirect texture coordinates to look-up (retrieve) a texel value from a corresponding texture map—each of which may be a unique and different texture map. These lookup operations result in N sets of indirect texture lookup values, DATA_A0 through DATA_A(N-1), that are provided to a texture address processor (6008). Texture address processor 6008 also receives M sets of direct texture coordinate inputs, ADDR_A0 to ADDR_A(N-1).

The Texture Address Processor 6008 computes K sets of new/modified direct texture addresses (coordinates), ADDR_C0 through ADDR_C(K-1), based upon a predetermined function of the indirect texture lookup data values and the direct texture coordinates. Each of the K computed sets of direct texture coordinates (addresses), ADDR_C0 through ADDR_C(K-1), is passed to corresponding logical texture lookup units C0 (6010) and C1 (6012) through C(K-1) (6014). On one example implementation, these logical texture units C0—C(K-1) can be provided by reusing the same physical texture mapper used to provide logical texture units A0-A(N-1). Each texture lookup unit, C0 through C(K-1), uses the received coordinates to look-up a texel value in a corresponding texture map.

K sets of texture lookup values, DATA_C0 through DATA_C(K-1), resulting from the texture lookups are then provided to a pixel shader (6016). Pixel Shader 6004 receives the K sets of received texture values, along with zero, one, or more sets of rasterized (Gouraud shaded) colors. Pixel Shader 6016 then uses the received texture values, DATA_C0 to DATA_C(K-1), according to a predetermined shading function to produce color output values that may be passed, for example, to a video display frame buffer.

Figure 7A:
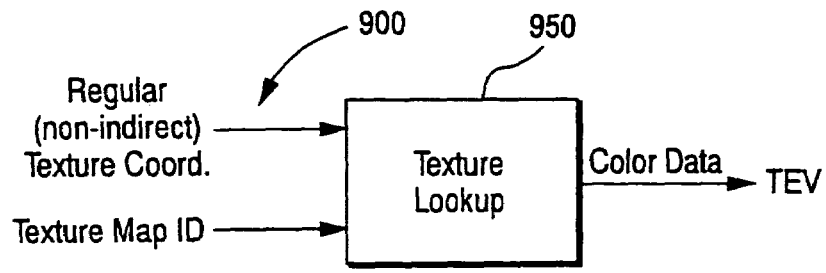
FIG. 7A is a functional block diagram illustrating a simple basic example of a regular (non-indirect) texture lookup.
Figure 7B:
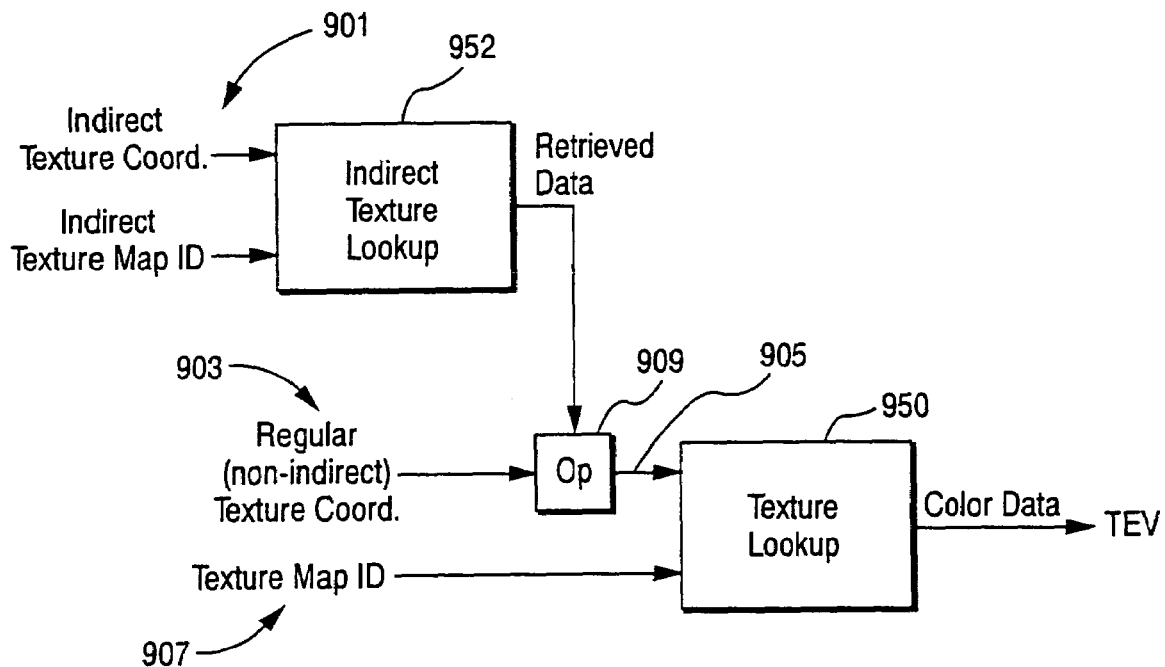
FIG. 7B is a functional block diagram illustrating a simple basic example of an indirect texture lookup in accordance with the present invention.

To aid in understanding, FIGS. 7A and 7B, respectively, illustrate simplified examples of a regular (non-indirect) texture lookup operation and an indirect texture lookup operation. As shown in FIG. 7A, a regular texture mapping lookup operation 950 may require specifying at least a set of regular (non-indirect) texture coordinates and a texture map ID as inputs. For this example, texture color data is retrieved (from the appropriate texture map) by texture unit 500a (FIG. 5) and then provided to texture environment unit (TEV) 600a for color blending.

In an example indirect texture lookup operation, as illustrated in FIG. 7B, a texture mapping occurs in multiple stages/cycles. During a first stage, a set of indirect texture coordinates are provided as inputs 901 along with a texture map ID corresponding to an indirect-texture mapping operation 952. In the next, or a subsequent stage, data retrieved from the indirect texture lookup 952 is used in conjunction with a set of regular (non-indirect) texture coordinates 903 to produce a set of new/modified coordinates 905 for another (regular) texture lookup 950 using input texture map ID 907. During each stage, various programmable operations 909 may be performed on the retrieved data and coordinates to obtain the new/modified lookup coordinates. In one example implementation, blocks 952 and 950 in the FIG. 7B example are performed by the same hardware that is reused or recycled in a staged or recirculating manner.

Example Direct and Indirect Texture Addressing

Figure 8:
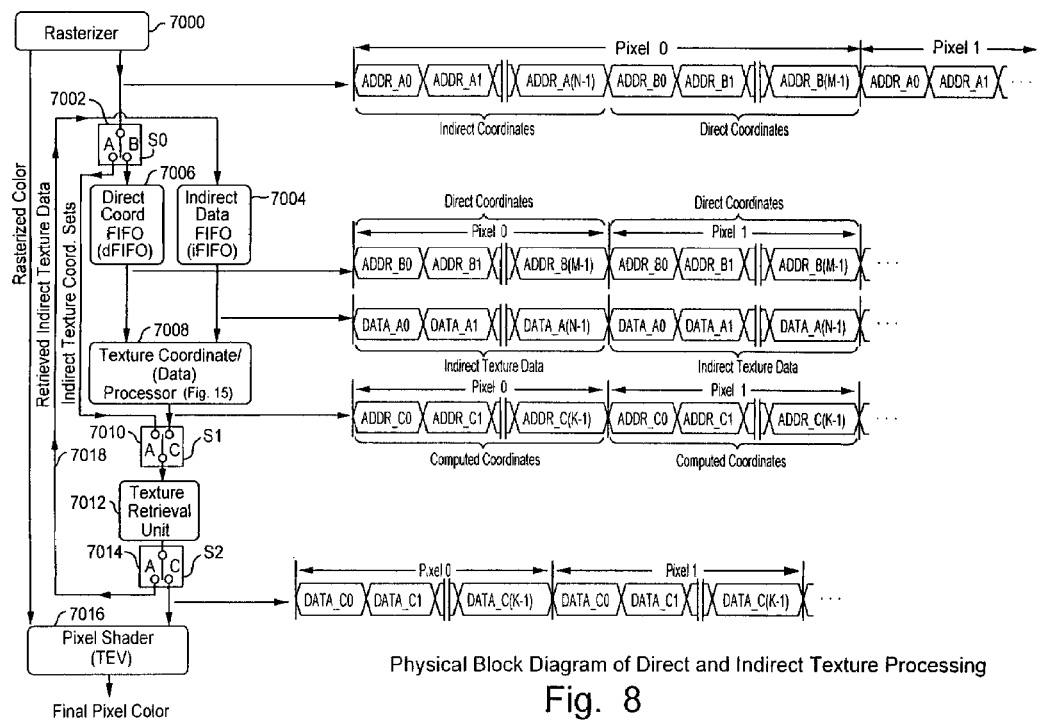
FIG. 8 is a block diagram illustrating an overview of an example physical configuration for implementing indirect texture processing in accordance with the present invention.

FIG. 8 shows an example basic physical configuration for implementing direct and indirect texturing while providing reuse of a physical texture mapping unit(s) in an interleaved fashion. Rasterizer 7000 sequentially generates all the direct and indirect texture address coordinate sets associated with each pixel. In an example implementation, rasterizer 7000 provides coordinate sets in parallel for four pixels in a pixel tile (i.e., a 2×2 or other pixel region), but other implementations are possible. In the example shown, rasterizer 7000 first generates indirect texture coordinate sets per pixel (e.g., ADDR_A0 through ADDR_A(N-1)), followed by all direct texture coordinate sets per pixel (e.g., ADDR_B0 through ADDR_B(M-1)). Each pixel may have differing amounts of direct and indirect coordinate data associated with it depending on the texturing operations being performed. For example, certain pixels may not require indirect texture addressing and will not have associated indirect coordinate data while other pixels may require one or more indirect texture addressing operations and will have one or more corresponding sets of associated direct and indirect coordinates.

In an example implementation of the texture processing circuitry of the graphics pipeline 180, texture processing is accomplished utilizing the same texture address processor and the same texture retrieval unit. To maximize efficient use of the texture processing hardware and avoid coarse granularity in the overall data processing flow through the pipeline, the processing of logical direct and indirect texture addresses (coordinates) and the lookup (retrieval) of texture data is performed in a substantially continuous and interleaved fashion. Indirect texture coordinate sets generated by rasterizer 7000 per pixel are passed directly to a single texture retrieval unit 7012 via switches S0 (7002) and S1

(7010), while non-indirect (logical direct) coordinate sets are placed in Direct Coordinate FIFO (dFIFO) 7006.

In an example implementation of the graphics pipeline, texture retrieval unit 7008 operates on at least one texture per clock and is capable of handling multiple texturing contexts simultaneously by maintaining state information and cache storage for more than one texture. Retrieved indirect texture data, DATA_A0 through DATA_A(N-1), is passed via feedback path 7018 to Indirect Data FIFO (iFIFO) 7004 via switch S2, where the retrieved indirect texture data is stored until needed. Direct texture coordinates are passed to Direct Coordinate FIFO (dFIFO) 7006 via switch S0 where they are stored until needed. In the above example discussed with respect to FIG. 6, Indirect Data FIFO 7004 would receive the N sets of indirect texture data and Direct Coordinate data FIFO 7006 would receive the M sets of direct texture coordinates. Texture Address Processor 7008 would subsequently compute K new sets of texture coordinates based on a predetermined function of the input direct texture coordinates and the retrieved indirect texture data. Since processing of logical direct and indirect coordinates is interleaved, whenever there is more than one direct texture operation intervening between successive indirect texture operations, the processing of direct coordinates may lag behind with respect to the retrieval of corresponding indirect data. Consequently, buffers (e.g., FIFOs) 7004 and 7006 are provided to allow synchronization/realignment of retrieved indirect texture lookup data with the appropriate corresponding set of direct coordinates prior to both being provided simultaneously to texture address processor 7008.

The computed K sets of texture coordinates, ADDR_C0 through ADDR_C(K-1) are output sequentially over K clocks. Switch S1 (7010) interleaves the computed texture coordinate data (sets) into the incoming indirect texture coordinate stream for providing to texture unit 7012. It does this by looking for unused or idle cycles ("bubbles") in the incoming indirect texture coordinate stream, and inserting the computed texture coordinate data (sets) during these cycles. Switch S2 (7014) routes the resulting texture lookup data, DATA_C0 to DATA_C(K-1), as well as the rasterized colors to a pixel shader 7016. Pixel shader (TEV) 7016 applies a predetermined shading function and outputs a single set of color values which may then be passed, for example, to a video display frame buffer.

In an example hardware implementation, the operation of the texture address processor may be simplified by utilizing the following two exemplary operational constraints:

1) The number of sets of computed texture coordinates, K, is equal to the number of sets of rasterized direct texture coordinates, M; and 2) The value of a computed texture coordinate set, ADDR_C[i], is a function, f(a, b, c), of a direct texture coordinate set, ADDR_B [i], and one set of indirect texture data, DATA_A[j], together (optionally) with the computed result from the previous processing stage, ADDR_C[i-1]. This operational relationship may be represented by the following equation:

$$ADDR\_C[i]=f(ADDR\_B[i],DATA\_A[j],ADDR\_C[i-1])$$

Figure 9:
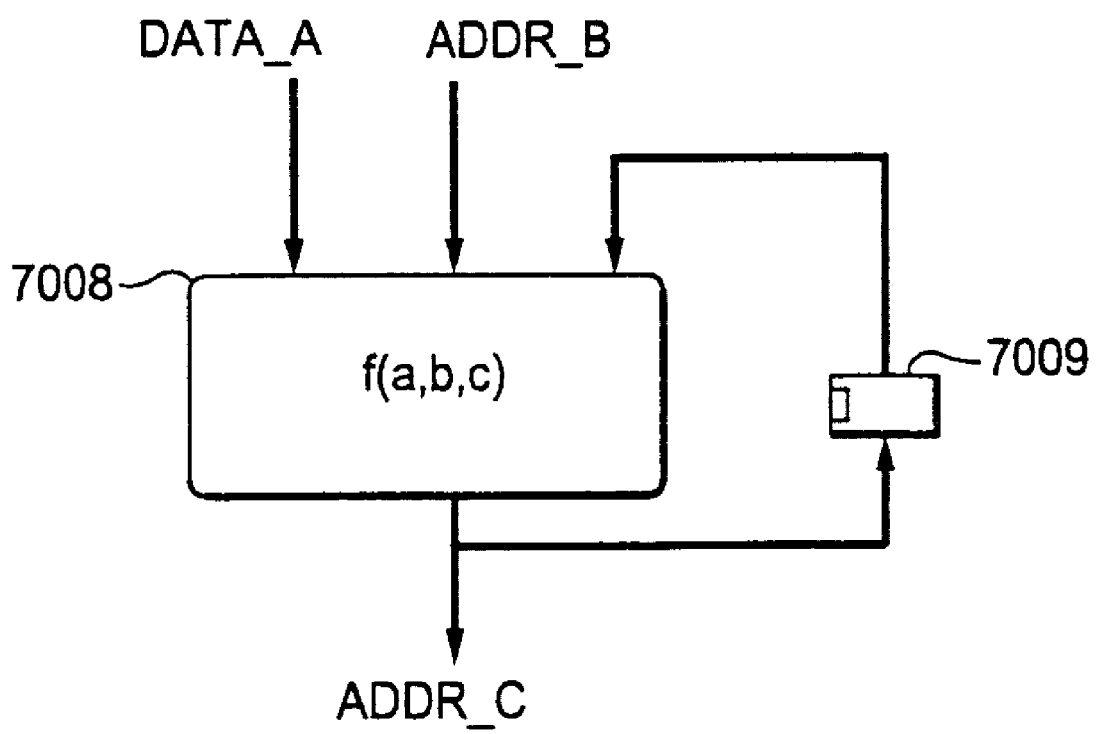
FIG. 9 is a block diagram illustrating a logical overview of the texture address (coordinate/data) processor operation.

FIG. 9 shows a logical diagram implementation of texture address (coordinate/data) processor 7008 according to the above operational relationship. Buffer 7009 stores and optionally provides a computed texture coordinate result from the previous cycle. Careful FIFO addressing ensures that the correct indirect texture DATA_A value is available at the proper processing cycle/stage.

Example Interleaved Processing In Texture Processing Pipeline

Figure 10A:
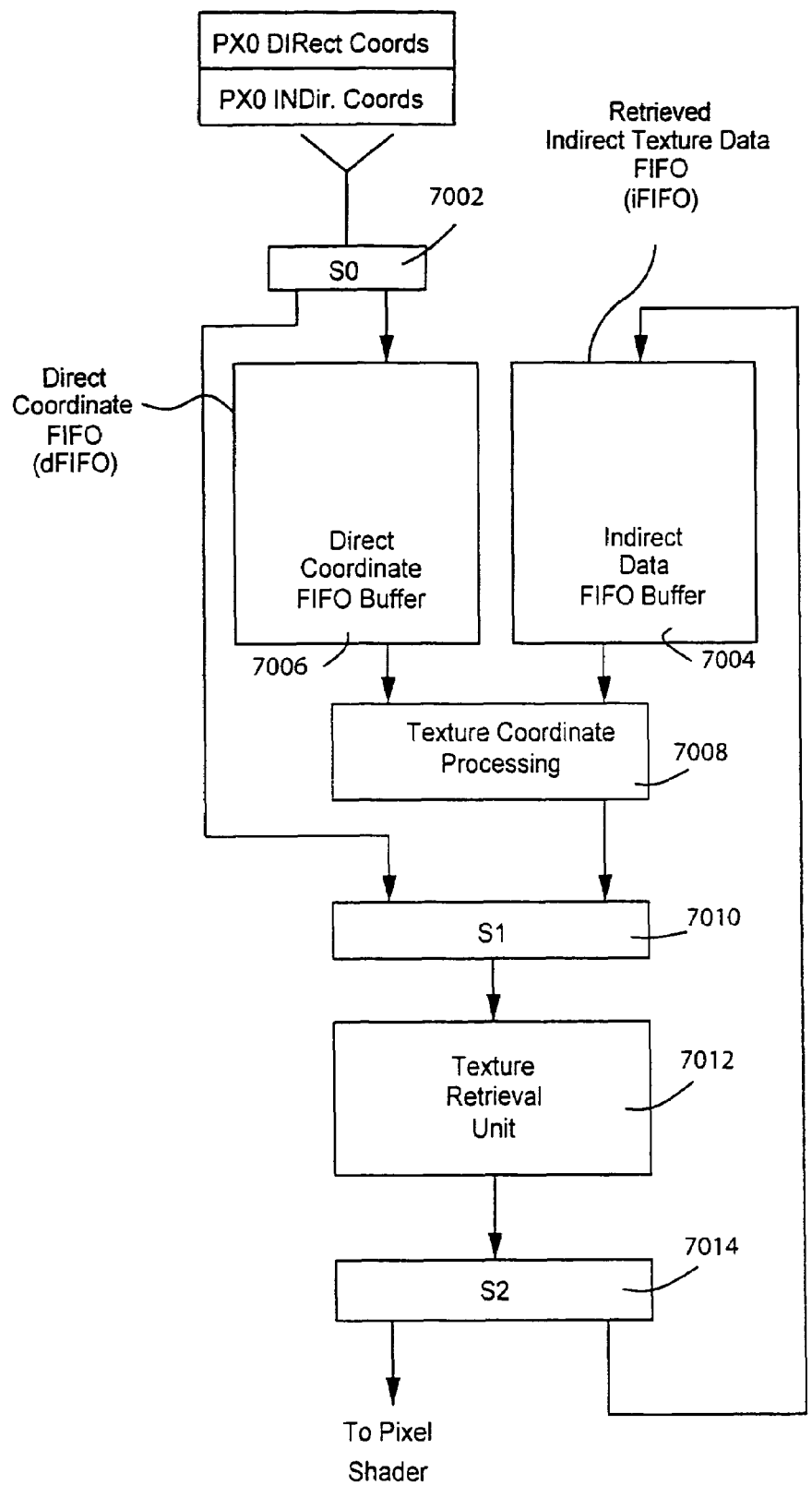
FIGS. 10A-10K are a series of block diagrams illustrating the dynamic progression of direct and indirect data in the example texturing pipeline implementation to provide interleaved direct and indirect texture processing.

FIGS. 10A-10K illustrate the dynamic, interleaved operation of the FIG. 8 arrangement. These figures show a series of block diagrams illustrating an example of the relative progression of pixel direct coordinate data and pixel indirect texture data at successive processing stages as a result of interleaved direct and indirect texture processing in the above example recirculating texturing pipeline embodiment of FIG. 8. In this example illustration, a first pixel, PX0, requires an indirect texturing operation. As shown in FIG. 10A, a set of indirect texture coordinates (PX0 IND), and a corresponding set of direct texture coordinates (PX0 DIR), associated with pixel PX0 are provided by rasterizer (400) and shown as just entering the texturing pipeline at switch S0.

Figure 10B:
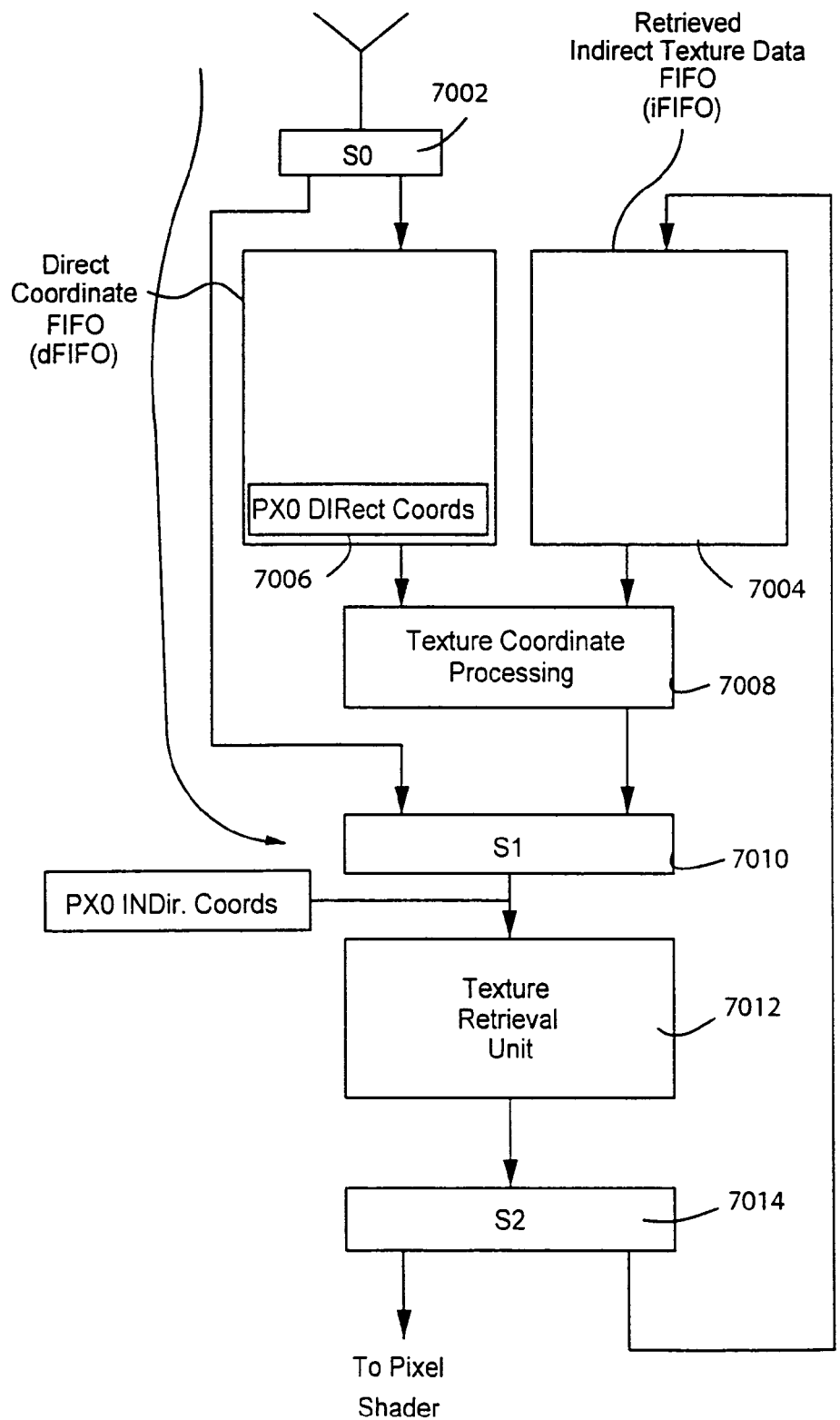
Figure 10C:
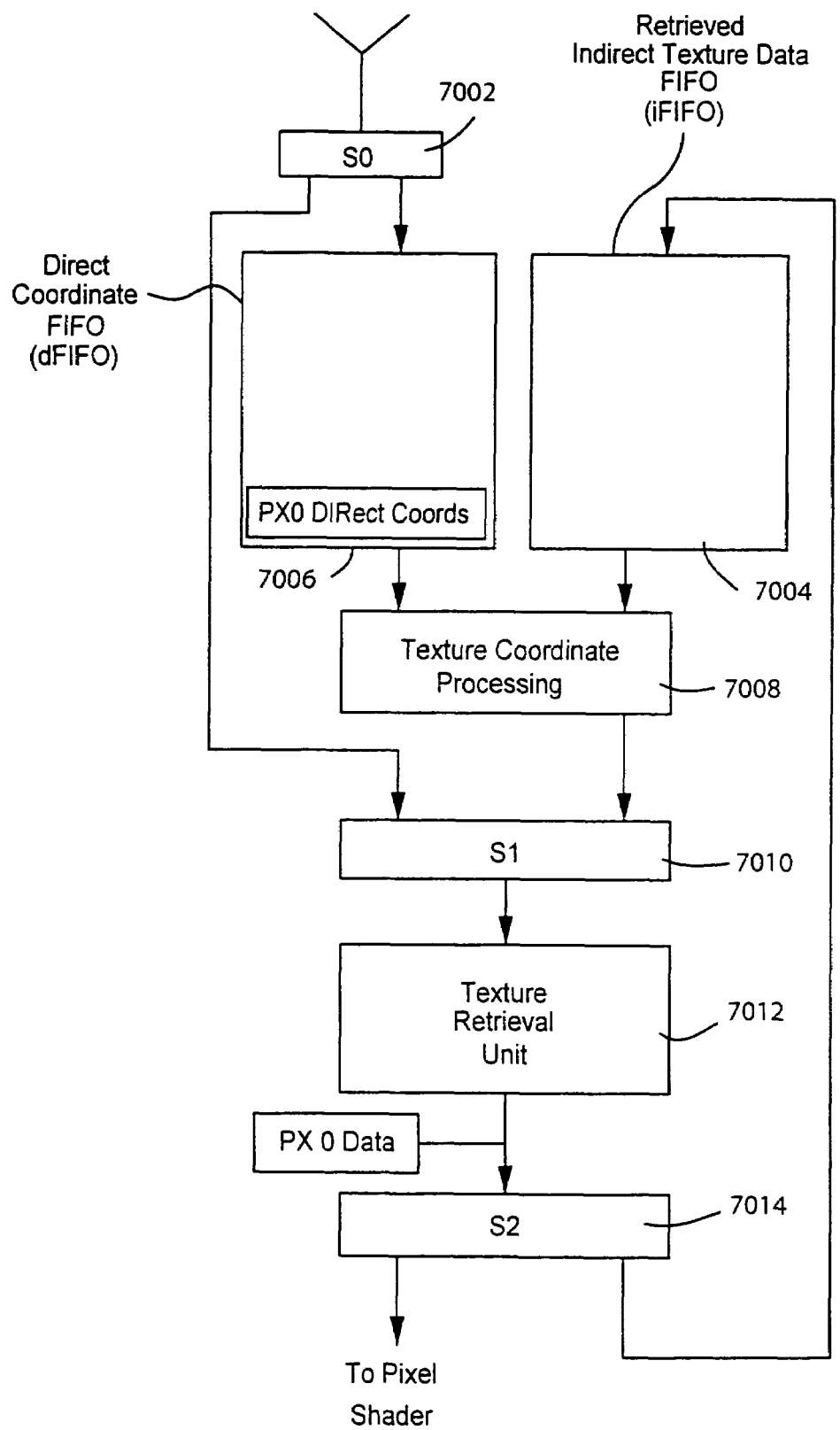
Figure 10D:
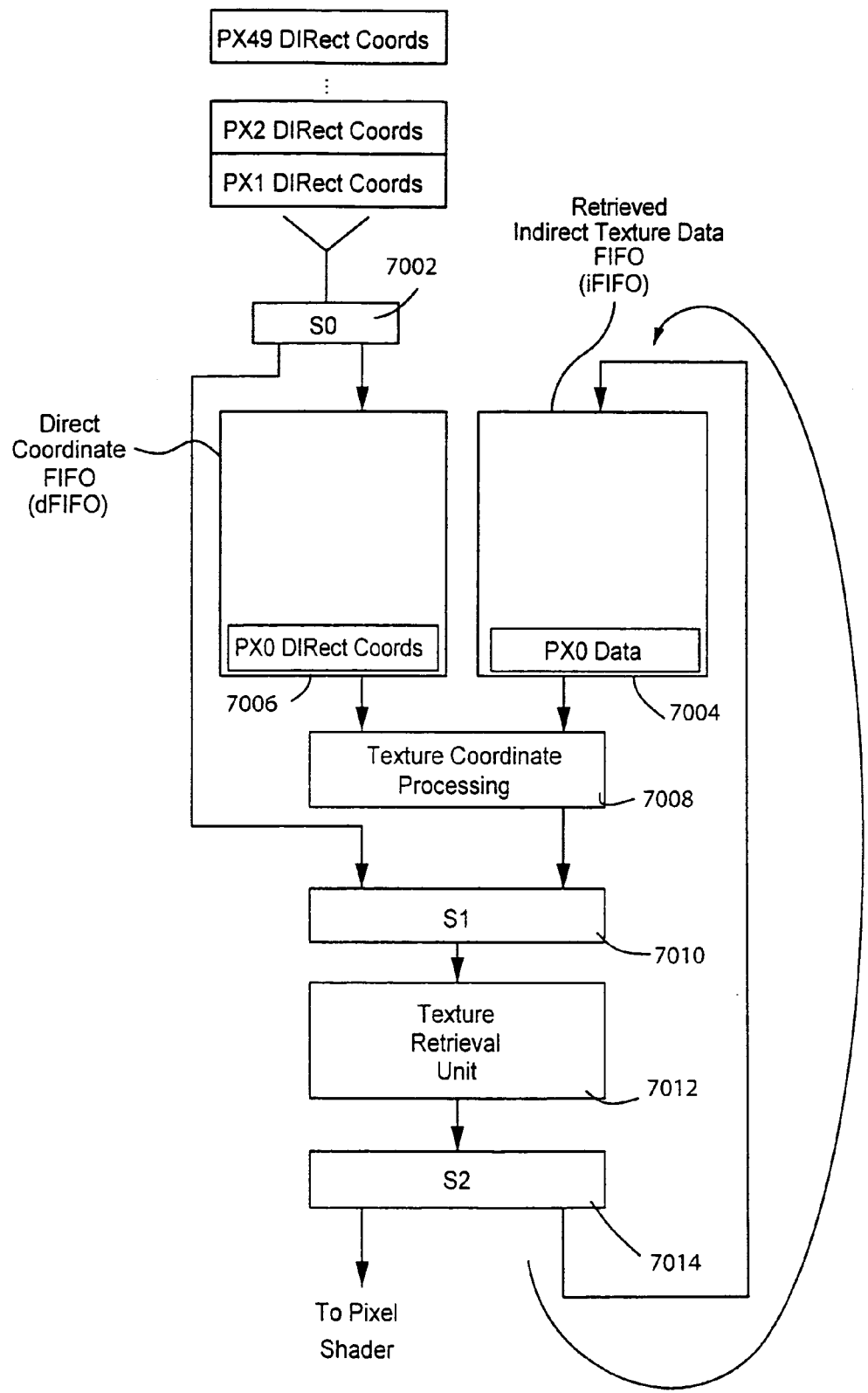

In FIG. 10B, indirect coordinates PX0 IND for pixel PX0 are provided directly to texture unit 500a via switches S0 and S1. Direct coordinates PX0 DIR for pixel PX0, which follow the direct coordinates for pixel PX0, are provided via switch S0 to Direct FIFO (dFIFO) 7004 for temporary storage while the indirect coordinates are processed. The texture unit 7012 performs an indirect texture lookup based on indirect coordinates PX0 IND for pixel PX0 to provide computed data (see FIG. 10C) and, as shown next in FIG. 10D, provides (recirculates) the retrieved indirect texture lookup data, PX0 DATA, back to the texturing pipeline input, for example, via switch S2. As shown in FIG. 10D, the recirculated indirect texture lookup data, PX0 DATA, is provided to indirect FIFO (iFIFO) where it is effectively paired (through synchronization between buffers 7004, 7006) with the associated direct texture coordinate set, PX0 DIR. The indirect texture lookup data, PX0 DATA, and the direct texture coordinate set, PX0 DIR, are ready to be processed together by the texture address processor to compute a new/modified texture address coordinate set for pixel PX0. The texturing pipeline consumes this pair of values from buffers 7004, 7006 by computing texture coordinates (see FIG. 10E) which are used to map a texture and provide color/alpha texel data to the shader (see FIG. 10F).

Figure 10E:
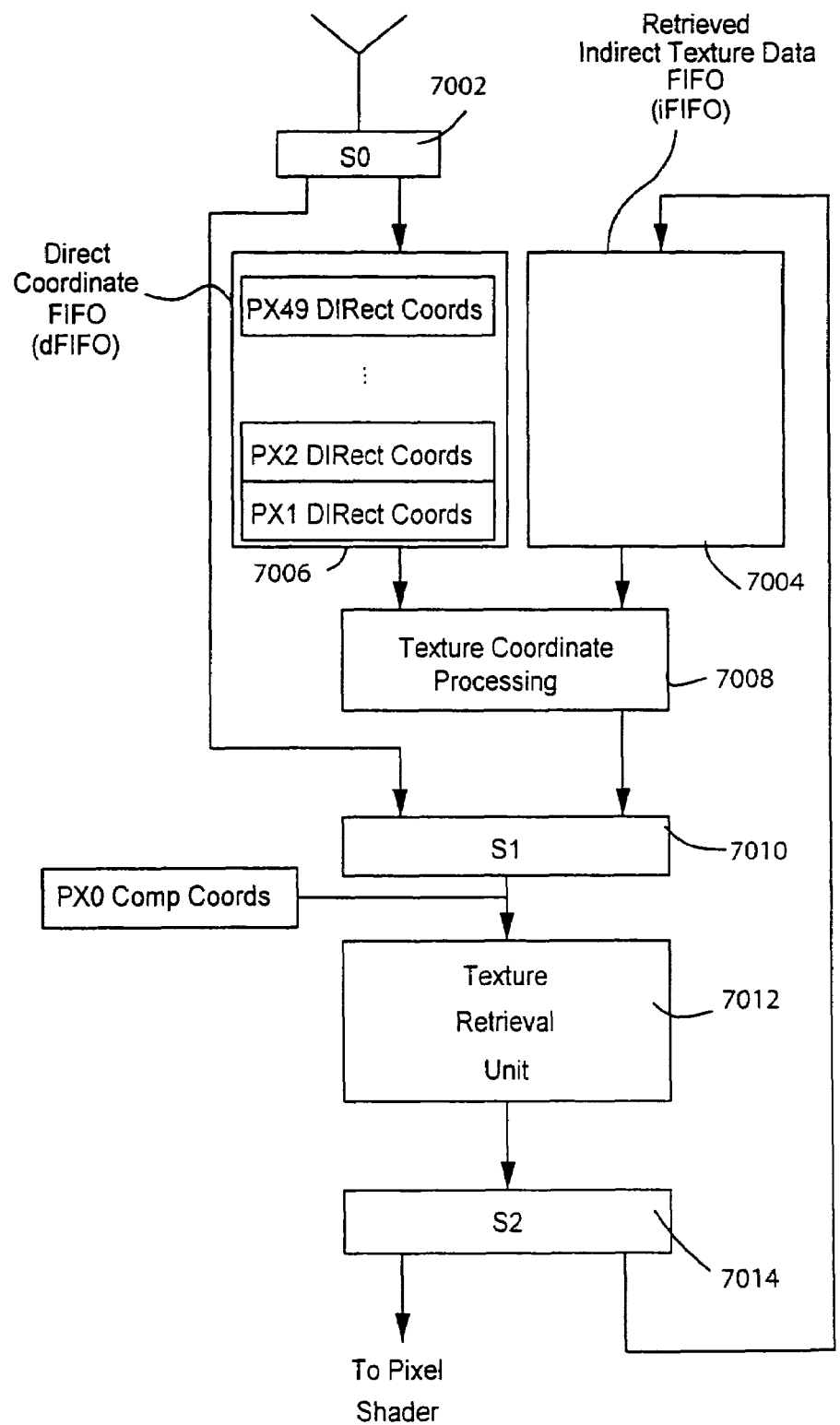

Referring back to FIG. 10D, suppose that the rasterizer continues to provide the texturing pipeline input at switch S0 with sets of texture coordinates for texturing subsequent pixels. In this illustration, a series of subsequent pixels following pixel PX0, for example PX0 through PX49, are to be textured using only direct texturing operations. The rasterizer provides the appropriate direct texture coordinate sets PX1 DIR through PX49 DIR per pixel, which are directed via switch S0 to the direct coordinate FIFO (dFIFO) as shown in FIG. 10E. Once the texture address processor has computed a new/modified texture address coordinate set for pixel PX0, it accepts direct texture coordinate set PX1 DIR (see FIG. 10F).

Figure 10F:
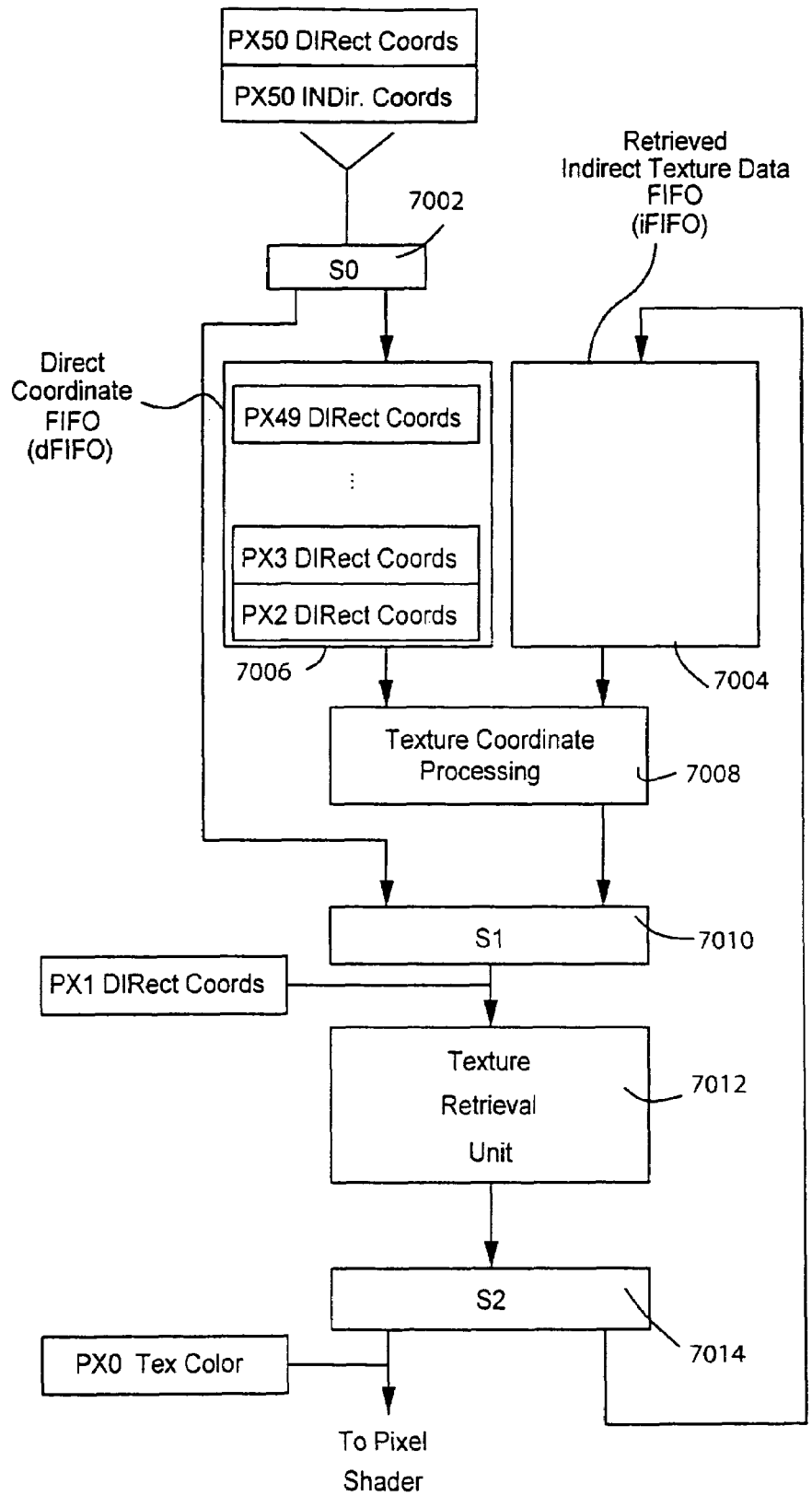
Figure 10G:
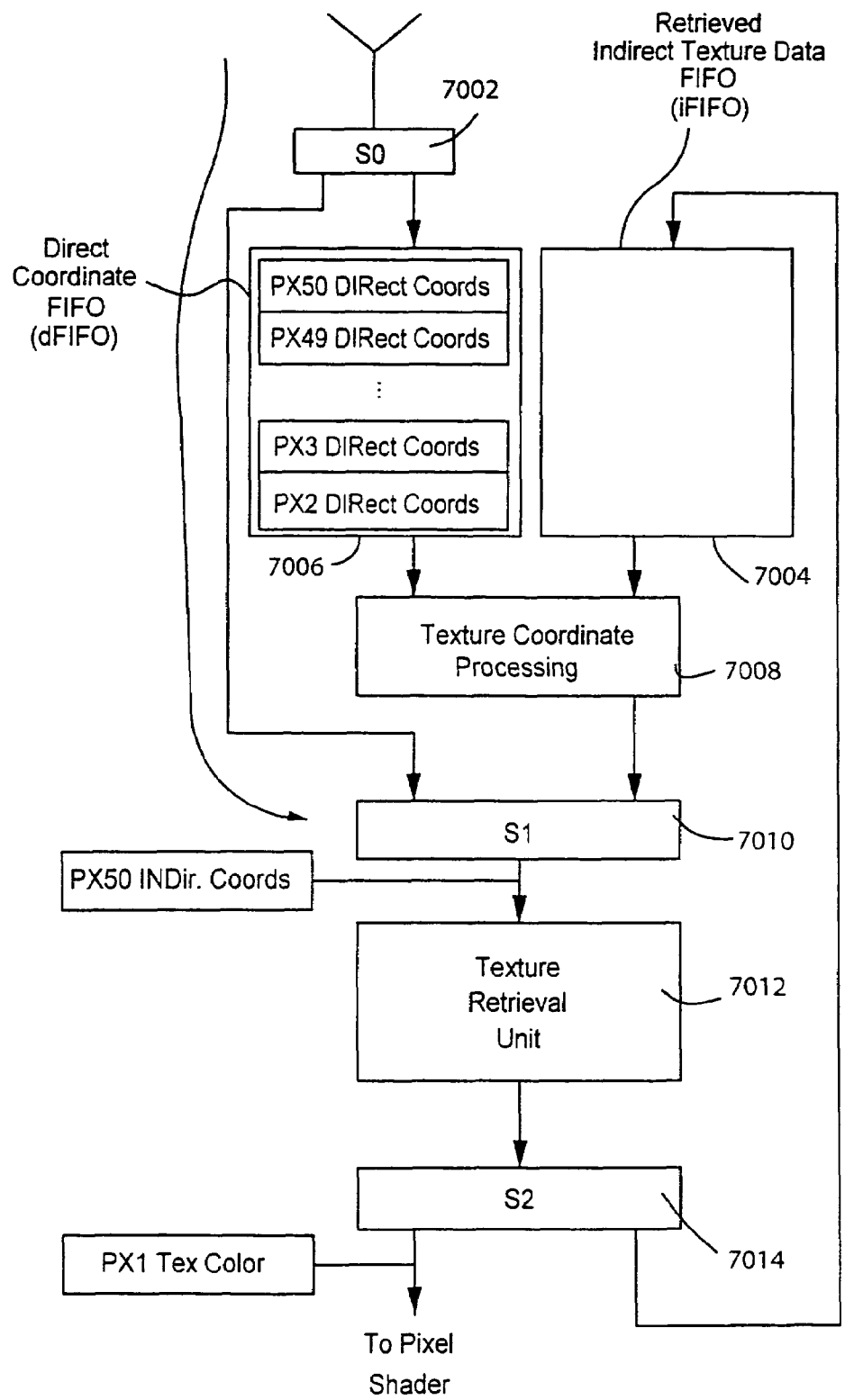

As also shown by FIG. 10F, suppose the rasterizer next provides a pixel, PX50, which follows pixel PX49, is to be textured using an indirect texturing operation. As illustrated by FIG. 10G, switch S0 provides the incoming indirect texture coordinate set, PX50 IND, for pixel PX50 directly to the texture retrieval unit 7012. Giving the indirect texture coordinates priority generally assures that the resulting indirect data from an indirect texture mapping will be present in buffer 7004 by the time it is needed (thus preventing pipeline stalling and wasted cycles). Note, however, that in this example, the indirect texture coordinates for a much later pixel in the rendering sequence (e.g., PX50) are being processed by texture retrieval unit 7012 before the retrieved unit processes an earlier pixel in the sequence (e.g., PX2). Such dynamic interleaving exhibited by the example texture processing pipeline has advantages in terms of efficiency.

As shown in FIG. 10G, the incoming direct texture coordinate set, PX50 DIR, for pixel PX50 is provided via S0 to direct coordinate FIFO (dFIFO) for buffering (as also shown in FIG. 10G, a texture color, PX1 TEX Color, for pixel PX1 corresponding to direct coordinate set PX1 DIR is output at this point by the texture retrieval unit from the texture lookup and is directed via switch S2 to the pixel shader).

Figure 10H:
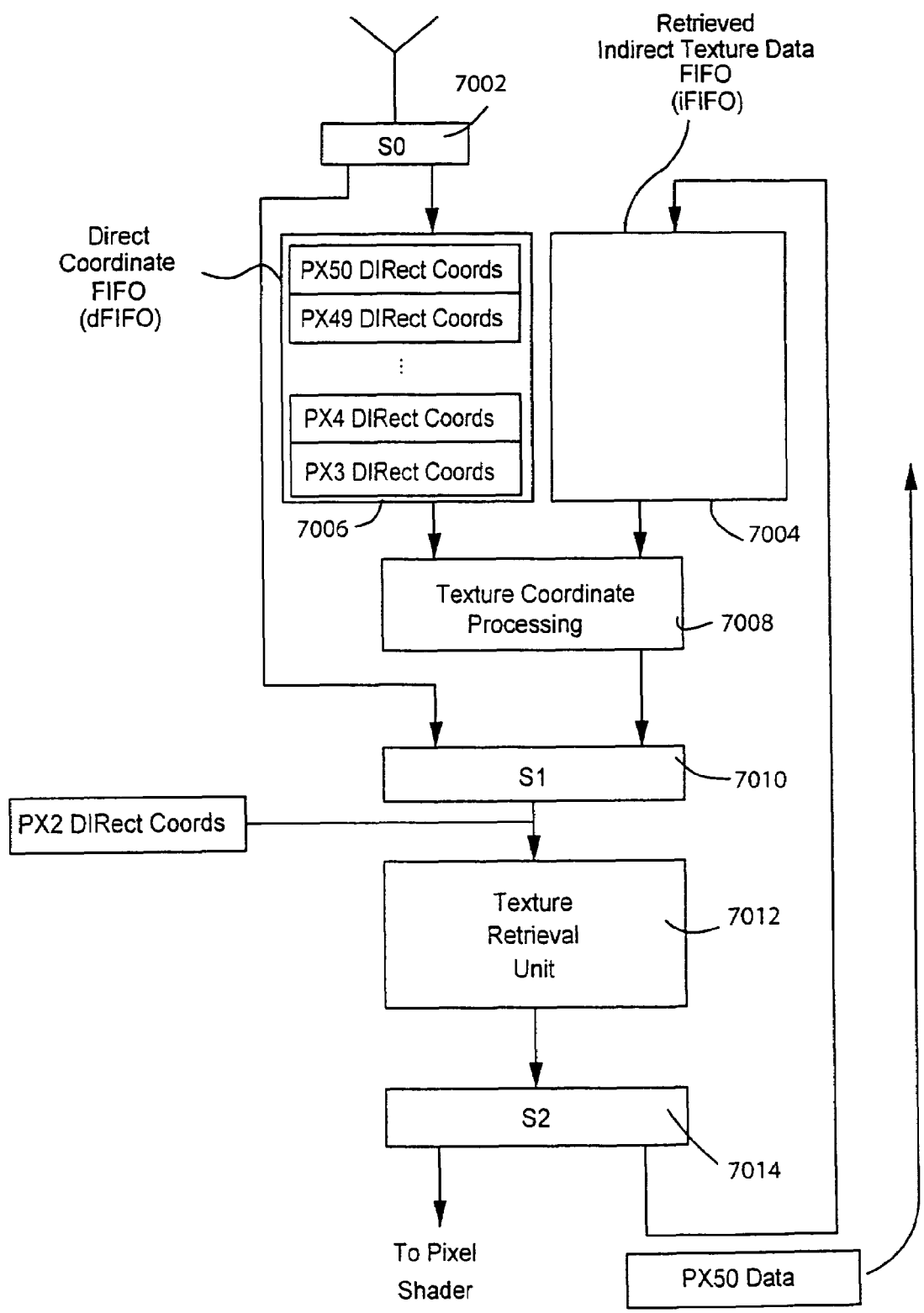

Next as shown in FIG. 10H, after the texture retrieval unit performs the texture lookup based on indirect coordinate set PX50 IND, the indirect texture lookup data, PX50, retrieved by the texture retrieval unit is recirculated via switch S2 to indirect texture data FIFO (iFIFO). FIG. 10H also shows that the next direct coordinate set, PX2 DIR, in the stream from dFIFO is processed by the texture address processor and provided via switch S1 to the texture retrieval unit.

Figure 10I:
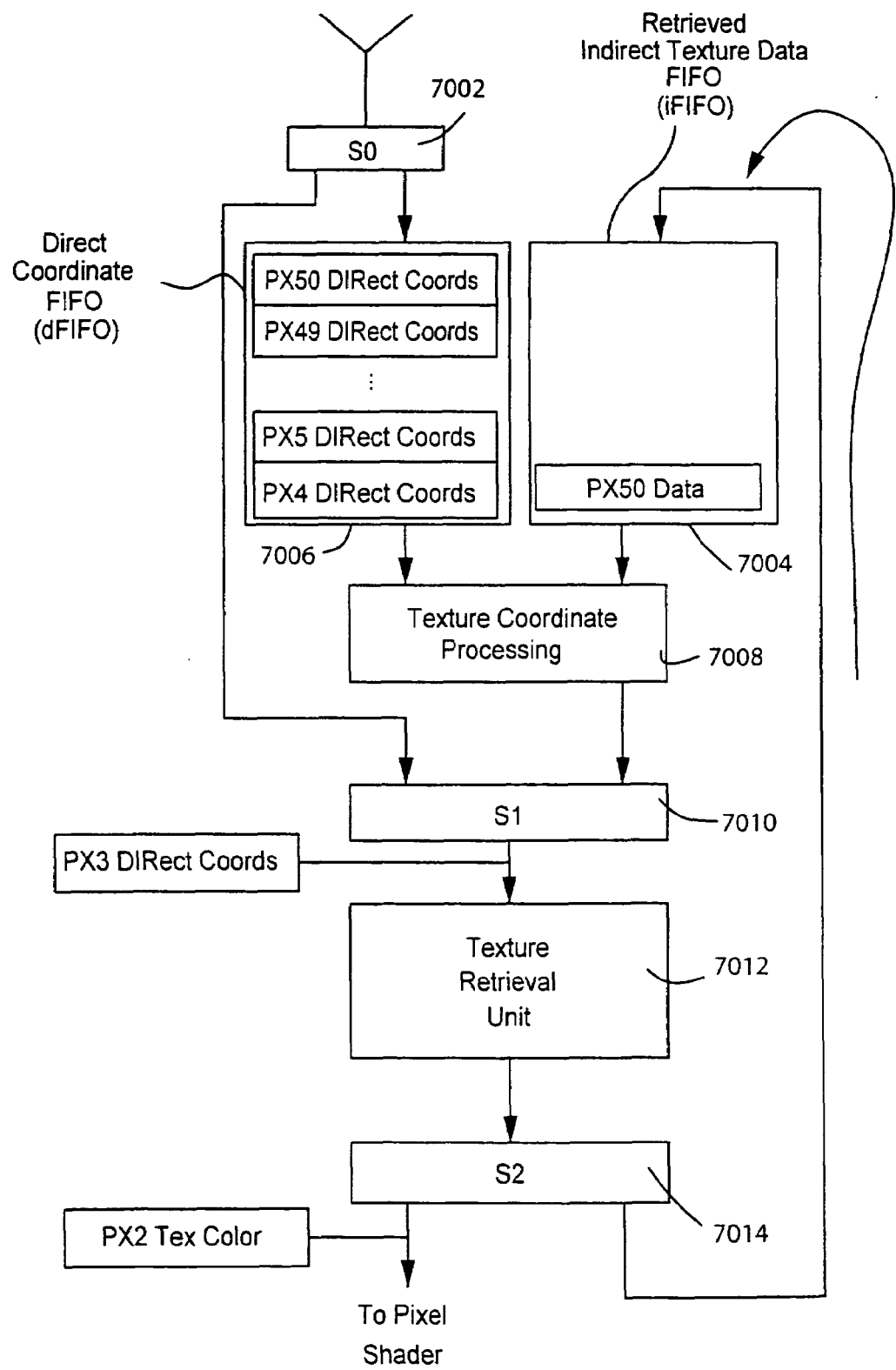

FIG. 10I shows a texture color, PX2 TEX Color, for pixel PX2 corresponding to direct coordinate set PX2 DIR being outputted from the texture retrieval unit and directed to the pixel shader via switch S2. In the same processing stage, the next direct texture coordinate set, PX3 DIR, from dFIFO is processed by the texture address processor and provided via switch S1 to the texture retrieval unit and indirect texture lookup data, PX50, is saved in iFIFO awaiting the propagation of the corresponding PX50 direct coordinate through buffer 7006.

Figure 10J:
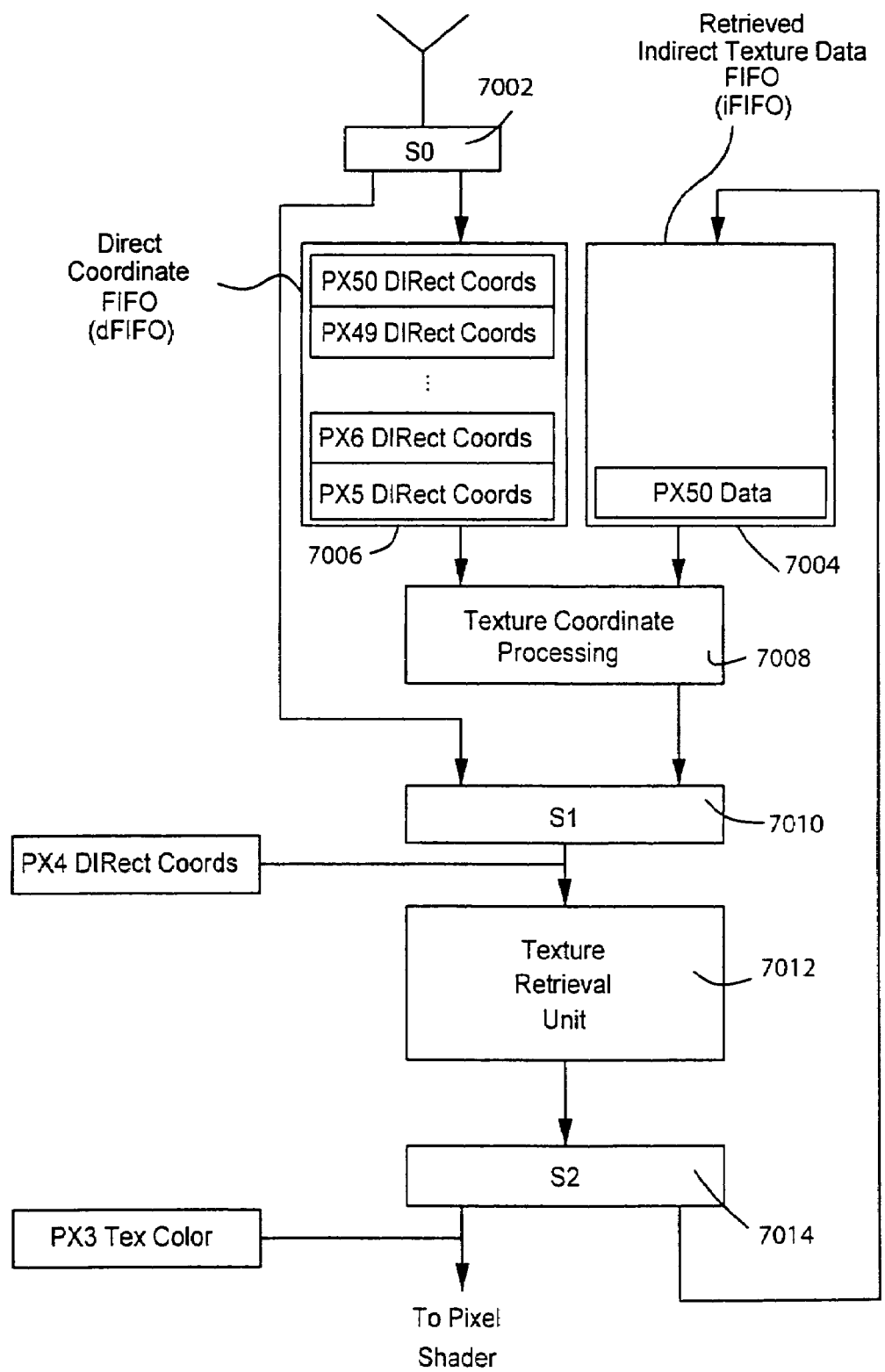
Figure 10K:
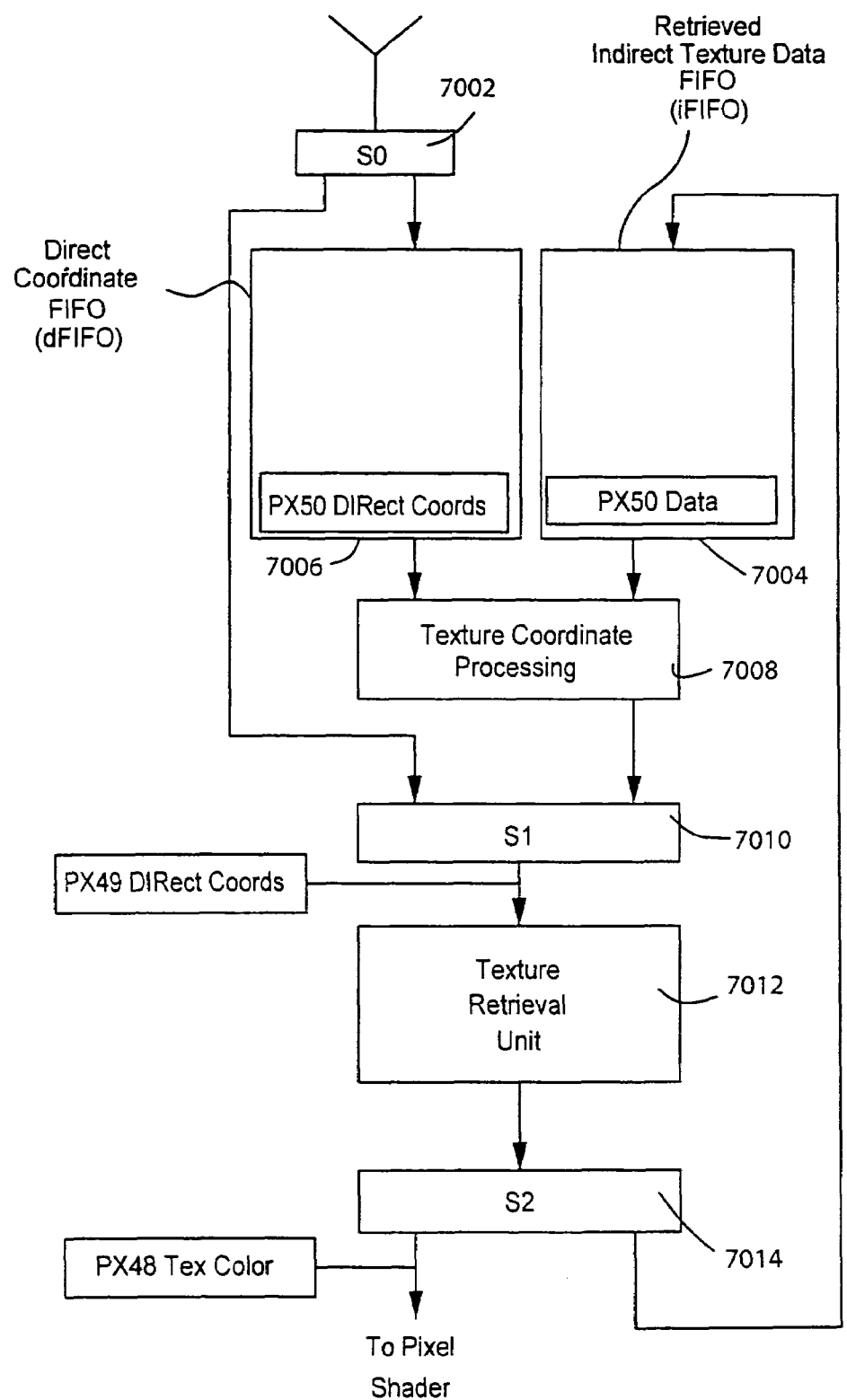

As illustrated by the example in FIG. 10J, the direct coordinate stream, PX5 DIR through PX49 DIR, in the dFIFO are processed in turn by the texture address unit and provided via switch S1 to the texture retrieval unit 7012. Each of the retrieved texture colors corresponding to direct coordinate sets PX5 DIR through PX49 DIR in the stream are then provided in turn to the pixel shader via switch S2. Indirect texture lookup data, PX50 (which is being held in iFIFO 7004 until it can be matched up with the corresponding direct coordinates, PX50 DIR, for pixel PX50 in the dFIFO) is finally ready to be released (as shown in FIG. 10K), once all the intervening direct coordinate sets, PX5 DIR through PX49 DIR, have been processed. The indirect texture data PX50 stored in the iFIFO can then be paired with its corresponding direct coordinate set PX50 DIR and provided to the texture address processor for computing a new/modified texture coordinate set for pixel 50.

Example More Detailed Implementation

Figure 11:
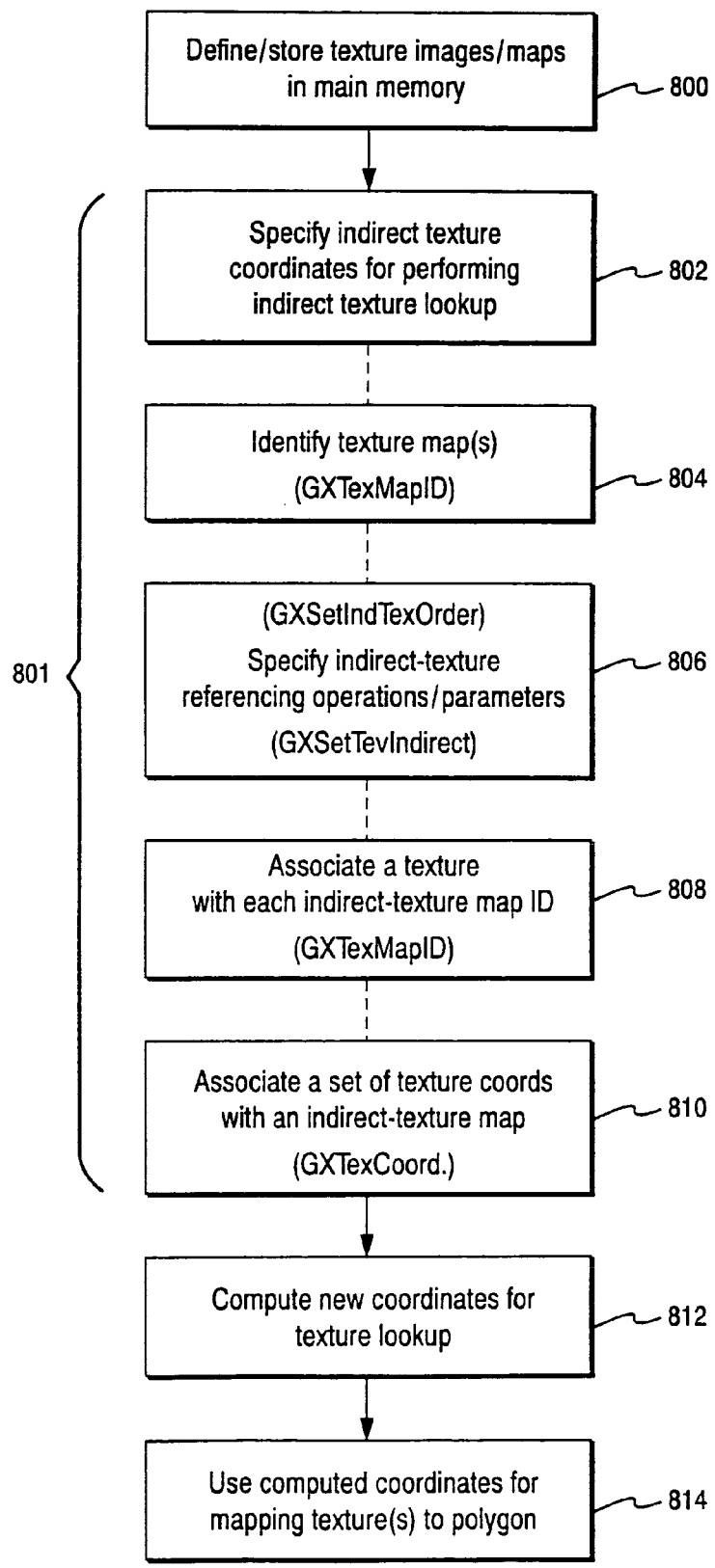
FIG. 11 is a flow chart illustrating example steps for implementing indirect texture processing in accordance with the present invention.

FIG. 11 is a flow chart showing an example set of basic processing steps used to perform indirect texture mapping for an example implementation. Most of the steps of FIG. 11 are set up by a general indirect texturing API (application program interface) function 801 that sets parameters for processing an indirect texture by texture unit 500 and texture environment unit 600.

System 50 first stores a texture image/data in texture memory 502 for use as an indirect texture (block 800). Based on one or more API command functions (blocks 802-810), commander processor 200 then provides a specified set of indirect texture coordinates to texture retrieval unit 500a (see FIG. 5) which accesses texture memory 504 and retrieves indirect texture lookup data (FIG. 7B block 952). In the example embodiment, one or more API indirect texture function(s) 801 allow a graphics application to set up associations between texture maps and texture coordinates and to specify which sets of texture maps and coordinates are to be used when performing indirect and direct texture referencing operations. For example, in a basic indirect texturing operation, one or more sets of indirect-texture coordinates are specified (block 802), one or more texture maps are identified (block 804), parameters for computing new/modified texture coordinates and the processing order and number of indirect-texture references are specified (block 806), one or more texture maps are identified as indirect textures (block 808) and a set of indirect-texture coordinates is associated with an indirect-texture map (block 810).

The data retrieved from the indirect-texture lookup operation is "recirculated" back to the same texture address (coordinate) bump/processing circuitry 500b/500c via feedback connection 500d for further processing. Texture bump/processing circuitry 500b/500c then use the retrieved indirect-texture lookup data as coordinates offset factors in computing new texture coordinates based upon a current regular (non-indirect) texture coordinate and/or pre-defined texture scaling, bias and rotation data (block 812). The new/modified coordinates are then used as regular direct (non-indirect) coordinates for mapping a texture to a polygon (block 814; FIG. 7B block 950). Alternatively, these new/modified coordinates can be re-used again for additional/subsequent coordinate operations via a further recirculation of the texture mapping hardware in a yet further texture mapping operation. In this manner, multiple levels of indirection can be staged and processed using a single texture coordinate bump/processing circuit 500b/500c and a single texture retrieval unit 500a. Ultimately, retrieved texture lookup data is provided to texture environment unit 600 for staged color blending for example, with other textures.

Example Coordination of Texture Operations with Shader Operations

In an example implementation of system 50, the indirect and direct texturing operations described above are coordinated with corresponding stages of a recirculating shader within texture environment unit 600. See commonly assigned copending application Ser. No. 60/226,888 "Recirculating Shade Tree Blender For A Graphics System".

Figure 12:
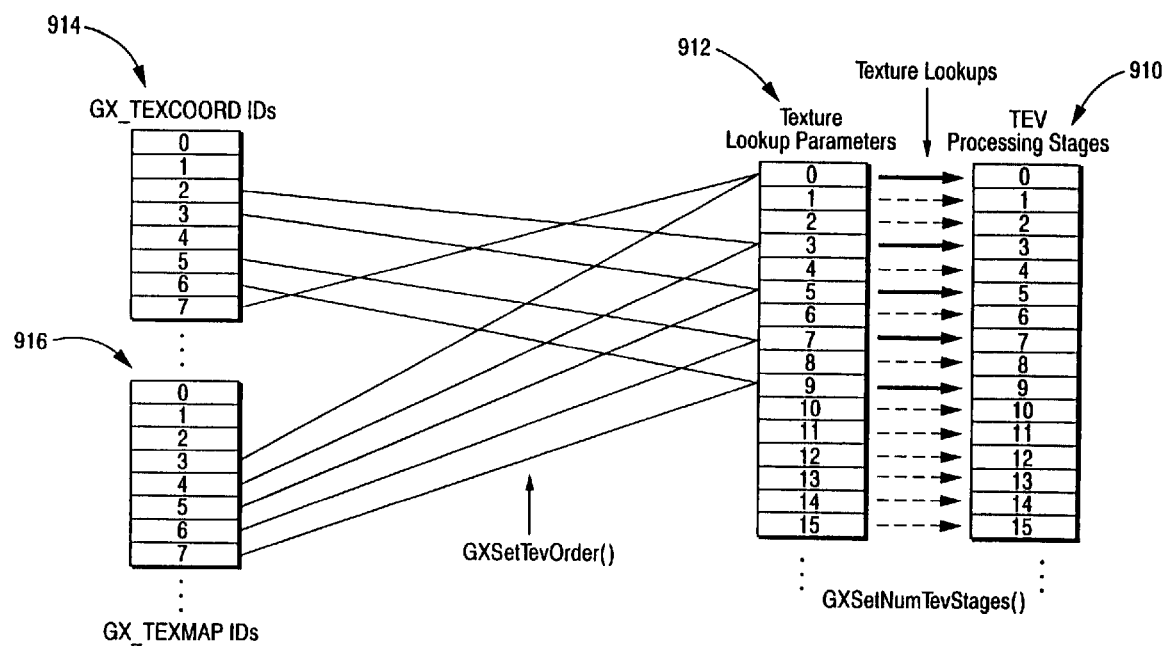
FIG. 12 is a functional operations diagram illustrating an example of regular (non-indirect) texture processing in accordance with the present invention.

FIG. 12 is a functional diagram illustrating an example of how to set up regular texture mapping to coordinate with shader stages. Texture lookup parameters specified, for example, by an API function(s), identify stored texture maps associated with sets of regular (non-indirect) texture coordinates. Texture lookups are performed using sets of texture coordinates to access the identified texture map(s) stored in memory. The retrieved texture lookup data is then passed to TEV unit 600 for color blending.

In an example embodiment of the present invention, TEV unit 600 allows programmable color data blending operations for accomplishing polygon texturing and shading during discrete processing stages. These stages are pre-defined by an appropriate API command function. In the example embodiment, up to sixteen TEV processing stages can be pre-defined. Each stage is assigned a processing order ID (number) and processed in sequence. In this example, selected TEV processing stages 910 are associated with a set of texture lookup parameters 912 specifying a regular texture lookup operation using a texture coordinate ID 914 and an associated texture map ID 916. The appropriate texture is looked up using the associated coordinates and the retrieved texture data is provided for the corresponding TEV stage blending. While FIG. 8 reflects that the example embodiment provides up to eight textures and up to sixteen TEV stages, any number can be used in alternate implementations.

The list of texture coordinate/texture map pairs are processed by recirculating texture unit 500 and texture environment unit 600 in an order specified by a GXSetTevOrder command using a number of recirculating stages as set by the GXSetNumTev stages command. In the particular example shown in FIG. 8, a set of texture coordinates designated by an API command, GX_TEXCOORD IDs no. 7 are used to perform a direct texture mapping using a texture map no. 3 designated by a GX_TEXMAP IDs API command. The results of that particular texture lookup in this example are passed to the texture environment unit 600 for processing in a TEV stage zero, as designated by a GEXSetTevOrder API command. In this example, another set of texture coordinates designated no. 2 are used in a further texture mapping process using a texture map no. 4 in a further texture mapping stage (e.g., stage no. 3), and the results of this texture lookup are further processed by the texture environment unit 600 in a TEV processing stage no. 3. FIG. 12 shows a further example texture lookup stage no. 5 using a set of texture coordinates identified by identification no. 3 and a texture map identified by identification no. 4 in a fifth texture lookup stage, and the results of this texture lookup are processed by TEV stage no. 5. Similarly, a texture coordinate set no. 5 is used to lookup a further texture map no. 6 and a seventh texture lookup and associated TEV processing stage; and a set of texture coordinates no. 6 are used to lookup a texture map no. 7 in a ninth texture lookup stage and the results of this texture lookup are processed using a ninth TEV processing stage. The GXSetTevOrder API command specifies the order in which the various texture coordinate/texture map identification pairs are processed by the texture unit 500 and the texture environment unit 600. The particular order and the particular IDs shown in FIG. 12 are by way of example only.

Figure 13:
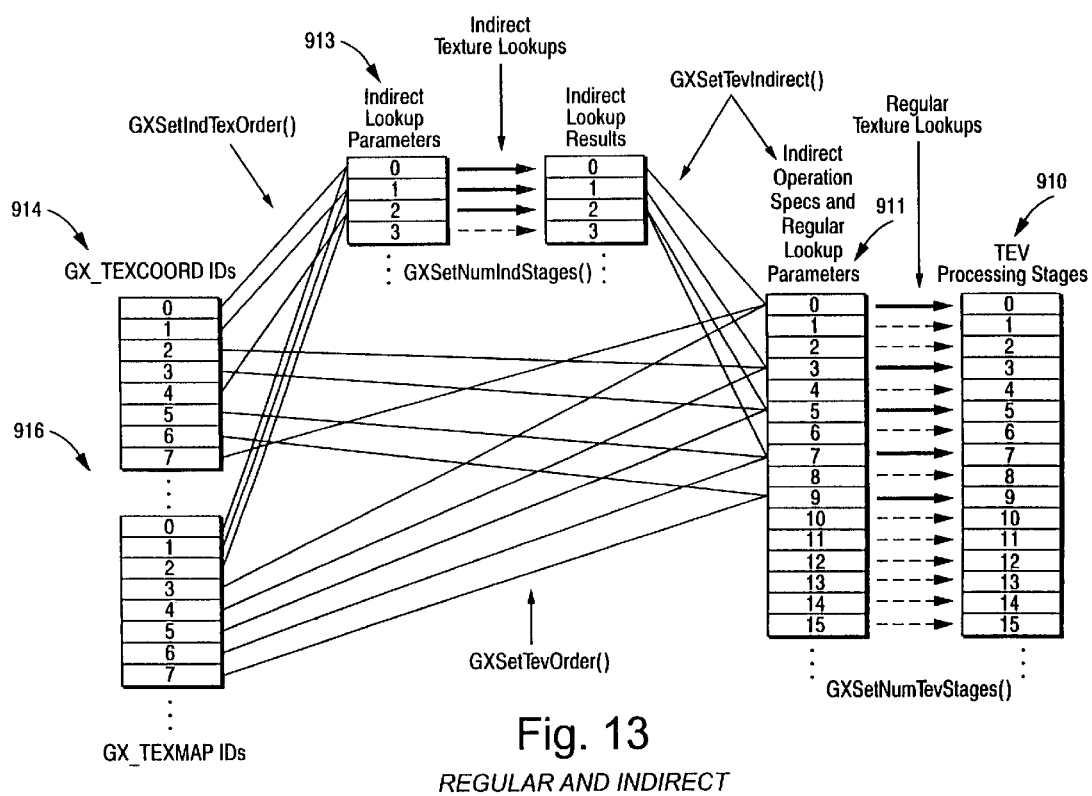
FIG. 13 is a functional operations diagram illustrating an example of interleaved regular (non-indirect) and indirect texture processing in accordance with the present invention.

FIG. 13 is a functional diagram illustrating examples of how to set up a sequence of regular and indirect texture processing to coordinate with recirculating shader stages. In this example, selected TEV processing stages are associated with a set of texture lookup parameters 911 specifying both regular and indirect texture lookup operations. For indirect mapping a set of indirect lookup parameters 913 associate an indirect-texture coordinate ID 904 with a corresponding texture map ID 916. In this case, the texture coordinate is specified as an "indirect" coordinate. An indirect-texture lookup is performed and the indirect texture lookup results are combined with a regular texture coordinate to obtain a new/modified texture coordinate. The new/modified texture coordinate is then used to access an associated texture map 916 and the resulting texture lookup data is provided for the corresponding TEV stage.

In the FIG. 13 example, additional API commands GXSetIndTexOrder, GXSetNumIndStages and GXSetTevIndirect are used to invoke the indirect texture lookup operations. In the particular example shown, texture coordinate/texture map pair no. 0 are used to perform an indirect texture lookup and the result of that indirect texture lookup is combined by operator 909 (see FIG. 7B) with the set of texture coordinates designated no. 7 to perform a direct texture lookup using texture map designated no. 3 in a recirculating processing stage 0. In a similar manner, a texture coordinate/texture map pair no. 1 are used to perform an indirect texture lookup to yield retrieved data that operator 909 combines with a texture coordinate set no. 2 to perform texture mapping on a corresponding direct texture map no. 4. In the particular FIG. 13 example shown, a further indirect texture lookup using a texture map no. 2 and a set of texture coordinates no. 4 provide indirect texture lookup results that operator 909 uses for two successive direct texture lookups using a texture coordinate no. 3/texture map no. 5 pair (in TEV processing stage no. 5) and a set of texture coordinates no. 5/texture map no. 6 pair in a seventh TEV processing stage. The particular texture coordinate ID numbers, texture map ID numbers and TEV processing stage numbers shown in FIG. 13 are by way of example only.

Example API Indirect Texture Function Commands

As shown in FIGS. 12-13, one or more graphics API functions are used to set up and initiate direct and indirect texturing operations. Example API functions for setting up indirect texture operations and parameters may be defined as follows:

GXSetIndTexOrder

This function is used to specify the texture coordinate and texture map to be used with a given indirect lookup.

Arguments:

| | |
|---|---|
| ind_stage | The indirect stage that is being affected. |
| tex_coord | The texcoord to be used for this stage. A given texcoord can be shared by an indirect and regular stage at the same time. |
| tex_map | The texture map to be used for this stage. A given texture map can only be indirect or regular, not both. |

In more detail, example arguments are:

| | | |
|---|---|---|
| u8 | NumIndtex; | // Number of indirect textures. |
| GXIndTexStageID | IndexTesId[]; | // Indirect texture stages being affected. |
| GXTexMapID | Tex_map[]; | // Indirect texture map (ID) to be used for this stage. |
| GXTexCoordID | Tex_coord[] | // Associated texture coordinate for each indirect texture map. |

The above function associates a specified texture map and a texture coordinate with an indirect texture map ID name. It is used to specify a texture coordinate and a texture map to use with a given indirect lookup. In one example embodiment, a specified texture map is used as either an indirect or a direct texture, but not both, although alternative arrangements are possible.

Example Usage:

```
void GXSetIndTexOrder(GXIndTexStageID ind_stage,
                     GXTexCoordID tex_coord,
                     GXTexMapID tex_map);
```

GXSetTevIndirect (GXSetIndirectTexture)

This is the general-purpose function used to control how the results from an indirect lookup will be used to modify a given regular TEV stage lookup.

Arguments:

| | |
|---|---|
| tev_stage | The TEV stage that is being affected. |
| ind_stage | The indirect stage results to use with this TEV stage. |

-continued

| | |
|---|---|
| format | Indicates how many bits to extract from the indirect result color to use in indirect offsets and the indirect "bump" alpha. |
| bias_sel | Indicates whether or not a bias should be applied to each component of the indirect offset. |
| matrix_sel | Indicates which indirect matrix and scale value to multiply the offsets with. |
| wrap_s | Indicates the wrapping factor to use with the S component of the regular texture coordinate. |
| wrap_t | Indicates the wrapping factor to use with the T component of the regular texture coordinate. |
| add_prev | Indicates whether the texture coordinate results from the previous TEV stage should be added in. |
| utc_lod | Indicates whether to use the unmodified (GX_TRUE) or modified (GX_FALSE) texture coordinates for mipmap LOD computation. |
| alpha_sel | Indicates which offset component will supply the indirect "bump" alpha, if any. |

In more detail, example arguments are:

| | | |
|---|---|---|
| GXTevStageID | TevStageId; | // TEV color combining stage ID name. |
| GXIndTexStageID | indStage; | // indirect tex stage used with this TEV stage. |
| GXIndTexFormat | Fmt; | // format of indirect texture offsets. |
| GXIndTexBiasSel | Bias; | // Selects which offsets (S, T) receive a bias. |
| GXIndTexAlphaSel | AlphaSel; | // Selects indirect texture alpha output. |
| GXIndMtxID | MatrixSel; | // Selects which texture offset matrix and scale. |
| GXIndTexWrap | WrapS; | // Wrap value of direct S coordinate. |
| GXIndTexWrap | WrapT; | // Wrap value of direct T coordinate |
| GXBool | IndLOD; | // Use modified texture coordinates for level of detail (LOD). |
| GXBool | AddPrev; | // Add output from previous stage to texture coordinates. |

The above function allows setting all of the various parameters for processing a given indirect texture associated with a particular TEV stage. The function associates an indirect texture map with a TEV color combining stage, specifies how the retrieved indirect-texture lookup data (color values) will be converted to texture coordinate offsets (i.e., 3, 4, 5 or 8 bit format), selects texture offset matrix and texture scaling values, specifies texture-coordinate wrap parameters and whether the computed new/modified coordinates should be used for level of detail (LOD) with mip-mapped textures. The function also allows selecting whether the computed output from the texture processing logic 512 (see below) during a previous stage is added to text coordinate in a current stage.

Example Usage:

| | |
|---|---|
| void GXSetTevIndirect | (GXTevStageID tev_stage, GXIndTexStageID ind_stage, GXIndTexFormat format, GXIndTexBiasSel bias_sel, GXIndTexMtxID matrix_sel, GXIndTexWrap wrap_s, GXIndTexWrap wrap_t, GXBool add_prev, GXBool utc_lod, GXIndTexAlphaSel alpha_sel); |

GXSetIndTexMtx

This function lets one set one of the three static indirect matrices and the associated scale factor. The indirect matrix and scale is used to process the results of an indirect lookup in order to produce offsets to use during a regular lookup. The matrix is multiplied by the [S T U] offsets that have been extracted (and optionally biased) from the indirect lookup color. In this matrix-vector multiply, the matrix is on the left and the [S T U] column vector is on the right.

The matrix values are stored in the hardware as a sign and 10 fractional bits (two's complement). Thus the smallest number that can be stored is −1 and the largest is (1-1/1024) or approximately 0.999. Since +1 cannot be stored, you may consider dividing all the matrix values by 2 (thus +1 becomes +0.5) and adding one to the scale value in order to compensate.

In more detail, example arguments are:

| | | |
|---|---|---|
| GXIndTexMtsID | MtxId; | // Texture offset matrix name. |
| F32 | Offset Matrix [3][2]; | // Matrix elements for the texture offset matrix. |
| GXIndTexFormat | Fmt; | // Exponent value for scaling (scale = $2^{ScaleExp}$). |

The above example API function sets matrix M and scale values in lookup data processing logic (proc) 512. The retrieved indirect texture lookup data (e.g. texture coordinate offsets s, t, u) is multiplied by Offset Matrix 525 (M) and the scaling factor 526. The OffsetMatrix is an API function parameter specifying the 3×2 element matrix elements used within indirect processing logic 512 (see below). In a preferred embodiment, the matrix elements are within the range (−1, 1). ScaleExp is a parameter specifying power-of-two exponent used for setting the scale factor. The preferred range of ScaleExp is (−32, 32).

Example Usage:

| | |
|---|---|
| void GXSetIndTexMtx( | GXIndTexMtxID mtx_sel, f32 offset_mtx[2][3], s8 scale_exp) |

GXSetIndTevOrder

The above function associates a regular non-indirect texture map and a texture coordinate with an indirect texture map ID name.

| | | |
|---|---|---|
| GXSetTevStageID | stage | |
| GXSetTexCoordID | coord | |
| GXChannelID | color | |

Example Usage:

| | | |
|---|---|---|
| void GXSetIndTexOrder | (GXIndTevStageID | tev_stage, |
| | GXTexCoordID | cood, |
| | GXChannelID | color); |

GXSetNumIndStages

This function is used to set how many indirect lookups will take place. The results from these indirect lookups may then be used to alter the lookups for any number of regular TEV stages.

GXSetNumIndStages u8 Stages

The above function sets the number of indirect texture lookup stages.
Example Usage:
void GXSetNumIndStages(u8 nstages);
GXSetNumTevStages This function enables a consecutive number of Texture Environment (TEV) stages. The output pixel color (before fogging and blending) is the result from the last stage. The last TEV stage must write to register GX_TEVPREV, see GXSetTevColor Op and GXSetTevAlphaOp. At least one TEV stage must be enabled. If a Z-texture is enabled, the Z texture must be looked up on the last stage, see GXSetZ-Texture.

The association of lighting colors, texture coordinates, and texture maps with a TEV stage is set using GXSetTevOrder. The number of texture coordinates available is set using GXSetNumTexGens. The number of color channels available is set using GXSetNumChans.

GXInit will set nStages to 1.
Arguments:

nStages Number of active TEV stages. Minimum value is 1, maximum value is 16. In more detail:

GXSetNumTevStages u8 Stages

The above function sets the number of TEV color blending stages. This function sets parameters associated with the amount of recirculation being performed by texture unit 500 and texture environment unit 600, as well as the sequence the recirculating stages are performed in.
Example Usage:
void GXSetNumTevStages(u8 nStages);
GXSetIndCoordTexScale This function is used when one wishes to share a texcoord between an indirect stage and a regular TEV stage. It allows one to scale down the texture coordinates for use with an indirect map that is smaller than the corresponding regular map.
Arguments:

| | |
|---|---|
| ind_stage | The indirect stage that is being affected. |
| scale_s | The scale factor for the S coordinate. |
| scale_t | The scale factor for the T coordinate. |

In more detail, example arguments are:

| | | |
|---|---|---|
| GXIndTexMapID | IndTexId; | // Indirect texture name. |
| GXIndTexScale | Scale S; | // Scale value for S coordinate. |
| GXIndTexScale | ScaleT; | // Scale value for T coordinate. |

The above function sets a value for scaling the indirect texture coordinates. The texture coordinates are scaled after a perspective divide and before addition to the regular non-direct texture coordinates.
Example Usage:

| | |
|---|---|
| void GXSetIndTexCoordScale | (GXIndTexStageID ind_stage, GXIndTexScale scale_s, GXIndTexScale scale_t); |

This function is used when one wishes to use the same texture coordinates for one TEV stage as were computed in the previous stage. This is only useful when the previous stage texture coordinates took more than one stage to compute, as is the same for GXSetTevInd-BumpST.
Example Arguments:
tev_stage The TEV stage that is being changed.
Example Usage:
void GXSetTevIndRepeat(GXTevStageID tev_stage);

GXSetTevIndBumpST

This function sets up an environment-mapped bump-mapped indirect lookup. The indirect map specifies offsets in (S, T) space. This kind of lookup requires 3 TEV stages to compute. The first two TEV stages should disable texture lookup. The third stage is where the lookup is actually performed. One may use GXSetTevIndRepeat in subsequent TEV stages to reuse the computed texture coordinates for additional lookups. The surface geometry must provide normal/binormal/tangents at each vertex.
Example Arguments:

| | |
|---|---|
| tev_stage | The TEV stage that is being affected. |
| ind_stage | The indirect stage results to use with this TEV stage. |
| matrix_sel | Indicates which indirect scale value to multiply the offsets with. |

Example Usage:

| | |
|---|---|
| void GXSetTevIndBumpST | (GXTevStageID tev_stage, GXIndTexStageID ind_stage, GXIndTexMtxID matrix_sel ); |

This function sets up an environment-mapped bump-mapped indirect lookup. The indirect map specifies offsets in object (X, Y, Z) space. This kind of lookup requires only one TEV stages to compute. The indirect matrix must be loaded with a transformation for normals from object space to eye space. The surface geometry need only provide regular normals at each vertex.

Example Arguments:

| | |
|---|---|
| tev_stage | The TEV stage that is being affected. |
| ind_stage | The indirect stage results to use with this TEV stage. |
| matrix_sel | Indicates which indirect matrix and scale value to multiply the offsets with. |

Example Usage:

| | |
|---|---|
| void GXSetTevIndBumpXYZ( | GXTevStageID tev_stage, GXIndTexStageID ind_stage, GXIndTexMtxID matrix_sel ); |

GXSetTevDirect

This function is used to turn off all indirect offsetting for the specified regular TEV stage.
Example Arguments:
tev_stage The TEV stage that is being changed.
Example Usage:
  void GXSetTevDirect(GXTevStageID tev_stage);

GXSetTevIndWarp

This function allows an indirect map to warp or distort the texture coordinates used with a regular TEV stage lookup. The indirect map should have 8-bit offsets, which may be signed or unsigned. "Signed" actually means "biased," and thus if signed_offsets is GX_TRUE, 128 is subtracted from the values looked up from the indirect map. The indirect results can either modify or completely replace the regular texture coordinates. One may use the indirect matrix and scale to modify the indirect offsets.
Arguments:

| | |
|---|---|
| tev_stage | The TEV stage that is being affected. |
| ind_stage | The indirect stage results to use with this TEV stage. |
| signed_offsets | Indicates whether the 8-bit offsets should be signed/biased (GX_TRUE) or unsigned (GX_FALSE). |
| replace_mode | Indicates whether the offsets should replace (GX_TRUE) or be added to (GX_FALSE) the regular texture coordinates. |
| matrix_sel | Indicates which indirect matrix and scale value to multiply the offsets with. |

Example Usage:

| | |
|---|---|
| void GXSetTevIndWarp( | GXTevStageID tev_stage, GXIndTexStageID ind_stage, GXBool signed_offsets, GXBool replace_mode, GXIndTexMtxID matrix_sel); |

GXSetTevIndTile

This function may be used to implemented tiled texturing using indirect textures. Note that the regular texture map only specifies tile definitions. The actual number of texels to be applied to the polygon is a function of the base tile size and the size of the indirect map. In order to set the proper texture coordinate scale, one must call GXSetTexCoordScaleManually. One can also use GXSetIndTexScale in order to use the same texcoord for the indirect stage as the regular TEV stage.
Example Arguments:

| | |
|---|---|
| tev_stage | The TEV stage that is being affected. |
| ind_stage | The indirect stage results to use with this TEV stage. |
| tilesize_s | Indicates the size of the tile in the S dimension. |
| tilesize_t | Indicates the size of the tile in the T dimension. |
| Tilespacing_s | Indicates the spacing of the tiles in the S dimension. |
| Tilespacing_t | Indicates the spacing of the tiles in the T dimension. |
| Format | Indicates which indirect texture format to use. |
| matrix_sel | Indicates which indirect matrix and scale value to multiply the offsets with. |
| bias_sel | Indicates the tile stacking direction for pseudo-3D textures. |
| alpha_sel | Indicates which offset component will supply the indirect "bump" alpha, if any (for pseudo-3D textures). |

Example Usage:

| | |
|---|---|
| void GXSetTevIndTile( | GXTevStageID tev_stage, GXIndTexStageID ind_stage, u16 tilesize_s, u16 tilesize_t, u16 tilespacing_s, u16 tilespacing_t, GXIndTexFormat format, GXIndTexMtxID matrix_sel, GXIndTexBiasSel bias_sel, GXIndTexAlphaSel alpha_sel); |

GXSetTevIndRepeat

This function is used when one wishes to use the same texture coordinates for one TEV stage as were computed in the previous stage. This is useful when texture coordinates require more than one processing cycle/stage to compute.

Example Arguments:
  Tev_stage The TEV stage that is being changed.
  Example Usage:
  void GXSetTevIndRepeat (GXTevStageID tev_stage)

GXSetAlphaCompare

This functino sets the parameters for the alpha compare function which uses the alpha output from the last active Texture Environment (TEVk) stage. The number of active TEV stages are specified using GXSetTevStages.

The output alpha can be used in the blending equation (see GXSetBlendMode) to control how source and destination (frame buffer) pixels are combined.

The alpha compare operation is:
  alpha_pass=(alpha_src (comp0) (ref0) (op) (alpha_src (comp) ref1)

where alpha_src is the alpha from the last active Tev stage. As an example, you can implement these equations:
alpha_pass=(alpha_src>ref0) AND (alpha_src<ref 1) or
alpha_pass=(alpha_src>ref0) OR (alpha_src<ref1)

The Z compare may occur either before or after texturing. In the case where Z compare is performed before texturing, the Z is written based only the Z test. The color is written if both the Z test and alpha test pass.

When Z compare is done after texturing, the color and Z are written if both the Z test and alpha test pass. When using texture to make cutout shapes (like billboard trees) that need to be correctly Z buffered, one should perform Z buffering after texturing.

Example Arguments:

| | |
|---|---|
| comp0 | Comparison subfunction 0. |
| ref0 | Reference value for subfunction 0, 8-bit. |
| op | Operation for combining subfunction 0 and subfunction 1. Accepted values are: GX_AOP_AND, GX_AOP_OR, GX_AOP_XOR, GX_AOP_XNOR. |
| comp1 | Comparison subfunction 1. |
| ref1 | Reference value for subfunction 1, 8-bit. |

Example Usage:

```
void GXSetAlphaCompare (
    GXCompare       comp0,
    u8              ref0,
    GXAlphaOp       op,
    GXCompare       comp1,
    u8              ref1 );
```

Example Hardware Implementation

In one preferred example embodiment, texture unit 500 and texture environment unit 600 have been implemented in hardware on a graphics chip, and have been designed to provide efficient recirculation of texture mapping operations as described above. In more detail, the texture address coordinate/bump processing block 500*b*/500*c* is implemented in hardware to provide a set of appropriate inputs to texture mapping block 500*a* and texture environment block 600*a*. Blocks 500*b*, 500*c* in conjunction with sequencing logic use to recirculate blocks 500*a*, 600*a* present a sequence of appropriate inputs at appropriate times with respect to various recirculating stages to efficiently reuse blocks 500*a*, 600*a* — in some cases creating a feedback loop via path 500*d* wherein the output of block 500*a* is modified and reapplied to its input in a later sequential recirculating processing stage. This results in a logical sequence of distinct texture processing stages that, in the preferred embodiment, are implemented through reuse/recirculation of the same hardware circuits over and over again. The resulting functionality provides any desired number of logical texture mapping processing stages without requiring additional hardware. Providing additional hardware for each of the various texture processing stages would increase speed performance but at the penalty of additional chip real estate and associated complexity. Using the techniques disclosed herein, any number of logical texture mapping stages can be provided using a single set of texture mapping hardware. Of course, in other implementations to improve speed performance, it would be possible to replicate the texture mapping hardware so that multiple texture mapping stages could be performed in parallel rather than in seriatim as shown in FIGS. 12 and 13. Even in such alternative implementations providing multiple sets of the same or different texture mapping hardware, providing the recirculating and indirect texture mapping techniques disclosed herein would be quite valuable in expanding functionality and flexibility of more generic hardware to provide a particular sequence of possibly involved and complicated texture mapping operations or stages specified by an application programmer to achieve particular advanced texture mapping effects.

Figure 14:
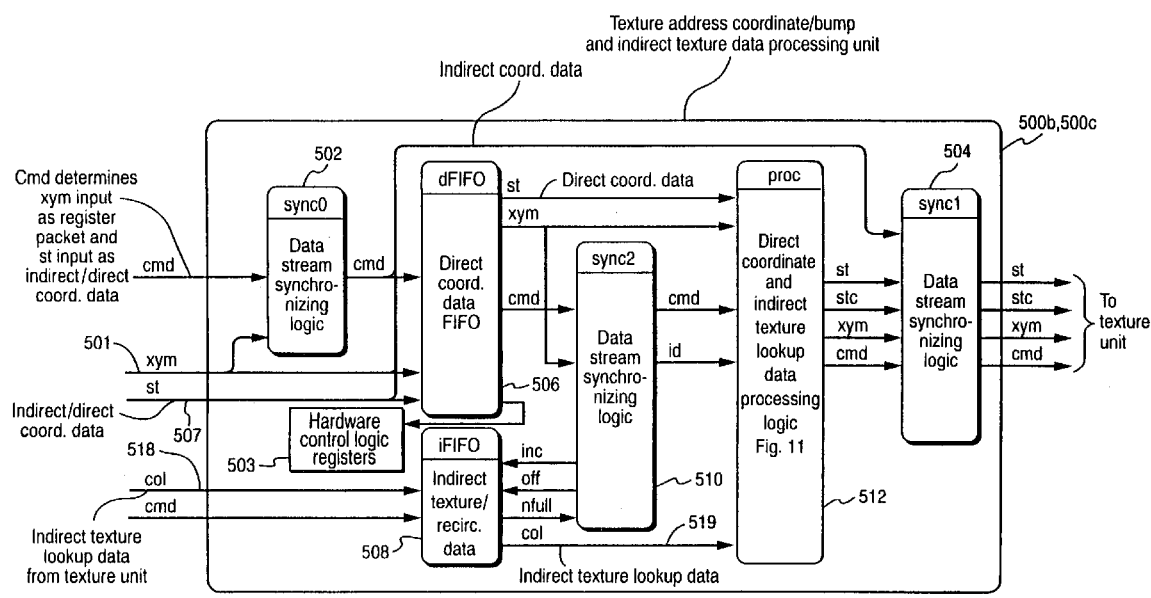
FIG. 14 is a block diagram showing a detailed example of the texture coordinate/bump processing unit shown in FIG. 5.
Figure 15:
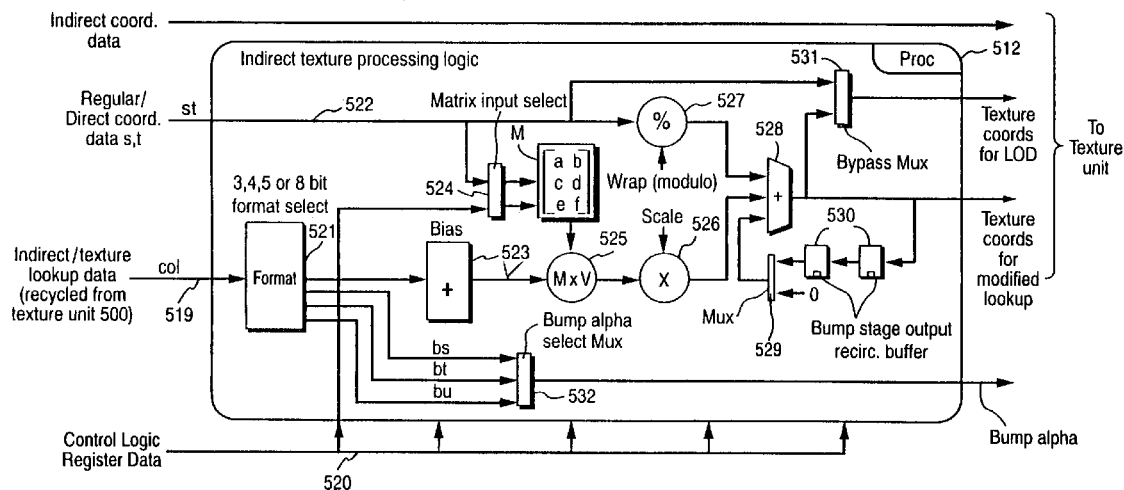
FIG. 15 is a block diagram showing a detailed example of the indirect texture lookup data/coordinate processing logic (proc) shown in FIG. 14.
Figure 18:
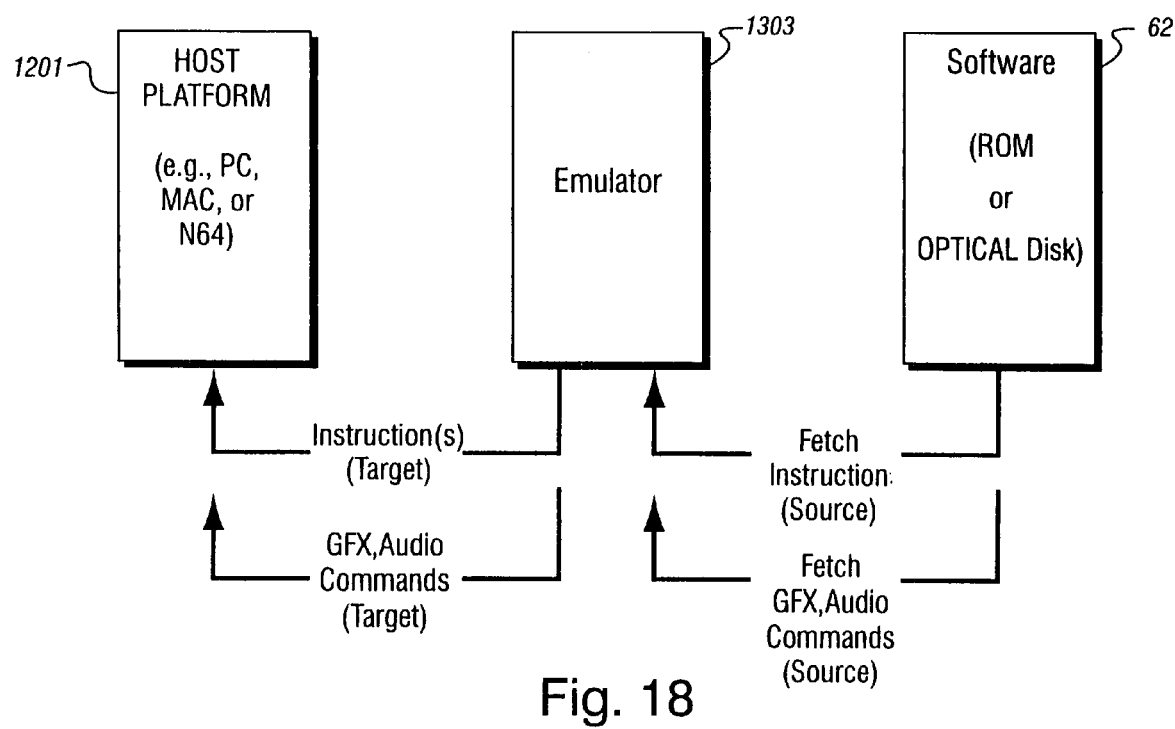
FIGS. 18 and 19 show example alternative compatible implementations.
Figure 19:
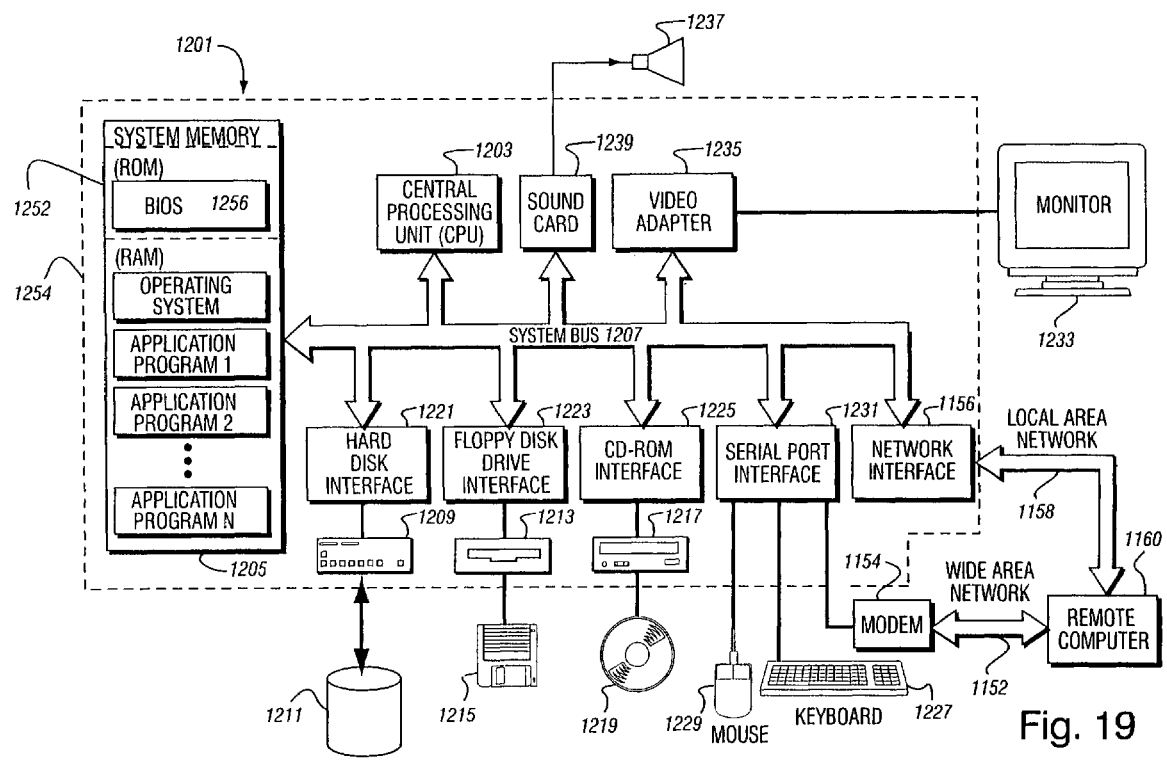

FIGS. 14 and 15 show one example implementation of particular hardware used to collect and present various parameters to texture unit 500 for logical direct and/or indirect texture mapping lookup. FIG. 14 shows a block diagram of an example hardware implementation of texture coordinate/bump processing hardware 500*b*/500*c*, and FIG. 15 shows an example processing and computation logic within the FIG. 14 example implementation. In the preferred implementation, the particular functions performed by the FIG. 14/FIG. 15 hardware are controlled by control data passes down the graphics pipeline to the hardware control logic registers 503 within coordinate/bump processing unit 500*b*/500*c*. Logical functions and computational operations occurring within each unit in graphics pipeline 180 are determined by control codes (bits) provided by command processor 200 in register data packets that are distributed throughout the graphics pipeline. The appropriate control codes/values are placed in control logic registers within each unit for controlling that input during one or more pipeline clocking cycles.

Referring to the FIG. 14 high level block diagram of an example hardware implementation of texture coordinate processing/bump block 500*b*/500*c*. Logical direct and indirect texture coordinates and hardware control register data are passed to texture coordinate processing/bump unit 500*b*/500*c* from rasterizer 400 (see FIG. 5) over graphics pipeline 180 data bus lines 501 (xym). Graphics pipeline global command data on pipeline command bus 505 (cmd) specifies whether incoming texture coordinates are "direct" or "indirect". Direct texture coordinates (i.e., regular non-indirect texture coordinates) and indirect texture coordinates are provided from a rasterizer via pipeline data bus lines 507 (st) and are processed together in a substantially continuous interleaved fashion so as to maintain a fine granularity of processing throughout the graphics pipeline. Indirect texture lookup data is retrieved from texture unit 500*a* and "recirculated" back to coordinate processing/bump unit 500*b*/500*c* via texture color/data bus 518 (col) corresponding to data feedback path 500*d* (FIG. 5).

Control register data received from command processor 200 is stored in registers 503 for controlling indirect texturing operations. Some of the stored control register data is utilized, for example, for selecting and controlling various computational operations that take place within coordinate/lookup data processing logic 512 (proc) (as indicated, for example, by register data lines 520 in FIG. 15). A command decoder and synchronizing circuit, sync0 (502), determines whether incoming data on lines 501 (xym) are a set of direct texture coordinates, indirect-texture coordinates, or control logic register packets. Incoming direct coordinates are routed to a FIFO unit 506 (dfifo) for further processing by data synchronizing circuit 510 (sync2) and processing logic unit (proc) 512. Incoming indirect coordinates are routed directly to an output data synchronizing circuit 504 (sync1) for passing on to texture unit 500*a* (FIG. 5). Synchronizing circuits sync0 (502), sync1 (504) and sync2 (510) perform data routing and synchronization to control the timing and handling of indirect and direct texture coordinate data from the rasterizer (400) and retrieved indirect texture lookup data from the texture unit. Effectively, synchronizing circuits sync0 (502), sync1 (504) and sync2 (510) perform the respective functions of switches S0, S1 and S2 in FIG. 8.

Incoming "recycled" indirect texture lookup data received via texture color/data feedback bus 518 (col) from texture unit 500a is placed in FIFO unit 508 (ififo). Direct texture coordinates are aligned at the st output of FIFO unit 506 (dfifo) with the incoming indirect texture lookup data at the col output 519 of FIFO unit 506 (dfifo). Synchronizing circuit 510 (sync2) performs further coordinate data alignment and assembles a complete set of operands to provide to processing unit 512 (proc) for indirect texture processing operations based on the control logic codes stored in registers 503. These operands include, for example, multiplication coefficients/constants for the texture offset matrix elements and lookup data formatting parameters for performing texture coordinate computations within processing unit 512 (proc). After coordinate data and retrieved indirect-texture lookup data is processed by proc unit 512, the resulting data (e.g., new/modified texture coordinates) is passed to synchronizing circuit 504 (sync1), where the data is interleaved with a stream of indirect texture coordinates from synchronization unit 502 circuit (sync0) and provided to texture retrieval unit 500a.

Referring now to the FIG. 15 example of the processing and computational logic within indirect-texture lookup data/coordinate processing unit 512 (proc), retrieved indirect-texture lookup data is in the form of data triplets having three data components (also referred to as s, t and u texture offsets). The number of data bits per component will be dependent in part upon the manner and purpose for which the particular indirect-texture map is used in an indirect texturing operation. Indirect-texture lookup data may also consist of "bump alpha data" used elsewhere in the graphics pipeline for transparency shading/blending. Retrieved indirect-texture lookup data (e.g., s, t and u offset data) on col bus 519 is first passed through Format selection block 521 which selects whether retrieved indirect texture lookup data is "bump alpha" data or is to be processed as multi-bit binary data triplets of three, four, five, or eight bits. The Format selection block provides offset data triplets to bias unit 523 and "bump alpha" data is routed to bump alpha select multiplexer 532 for use in transparency blending elsewhere in the graphics pipeline.

In a preferred example embodiment of the present invention, the Format unit logic extracts three texture offset data components of 8, 5, 4, or 3-bits from a 24-bit data triplet on the col input bus 519 and extracts 5-bit bump-alpha select values (bs, bt, and bu) for possible output on the xym bus. Bypass multiplexer 532 is provided to allow selection of one bump-alpha value, bs, bt, or bu, to be output on the pipeline xym bus. An optional bias value may be applied to the data triplets by bias unit 523. For example, if eight-bit data triplet components were selected, then a bias of −128 could be applied by bias unit 523 to allow for signed offsets. (If data triplet components of less than eight bits are used, then a bias of +1, for example, is applied).

A matrix select multiplexer 524 allows loading selected direct coordinates or constants for performing a matrix multiplication operation 525. In addition, a modulo wrap unit 527 is provided to optionally perform coordinate wrap operations on an associated regular direct texture coordinate. For example, using an API function, one may specify a wrap value of 0, 16, 32, 64, 128, or 256.

A matrix multiplication operation 525 is performed on a data triplet using matrix elements M. For example, the data triplet is loaded into a three-element vector data register V associated with matrix multiplication operation 525 and then multiplied by matrix elements M (FIG. 12A). Matrix multiplication operation 525 may be used, for example, for rotation, scaling, and re-mapping of s, t and u texture offset triplets retrieved from an indirect-texture via col bus 519. Values of matrix elements M are variable and may be dynamically defined for each texture processing cycle/stage using selected matrix configurations. In a preferred embodiment, the multiplication matrix is a 3 by 2 element matrix having a programmable configuration selected either from one of three constant matrices comprising elements defined from selected logic control register data 520 or, alternatively, selected from one of two "variable" matrices having elements derived from the current direct texture coordinates obtained via the pipeline st coordinate data bus 522. Using an appropriate API function, one may predefine up to three different static matrices or two different variable matrices and select which matrix is to be used for a given indirect texture operation.

FIG. 16A illustrates an example texture offset matrix multiplication operation using matrix programmable static constant elements ma, mb, mc, md, me and mf. Retrieved indirect-texture lookup data comprising data triplet components s, t and u provide texture offset values are used as a multiplicand column vector matrix for the operation. The resultant product values are a pair of new/modified texture coordinates s' and t'. In a preferred arrangement, elements of the matrix are represented by multi-bit binary floating point values within a range of −1 to +1. FIG. 16B illustrates two example "variable" matrices, Matrix A and Matrix B, having elements derived from current direct texture coordinates (s, t) obtained via the pipeline st coordinate data bus 522.

Referring once again to FIG. 15, a scaling logic 526 is provided for performing optional scaling operations. Scale unit 526 scales the results of the matrix multiplication. The amount of scale is a power of 2 specified by the user. For example, using an API function, one may choose a scale value by specifying an exponent of 2 in the range of −32 to +31. This scale value can be used, for example, to stretch texture offsets over the size of a regular texture map that is associated with the indirect-texturing operation.

Wrap logic 527 optionally applies a (modulo) wrap to the direct texture coordinates before the final add. The wrap size is a programmable power of 2 specified, for example, by an API function through the control logic registers.

Once the above processing operations have taken place, the computed offsets are added to the current direct texture coordinates using adder 528. The result becomes the new/modified texture coordinate that is used for further direct or indirect texture lookup. Stage output re-circulation buffer 530 is provided to allow optionally adding the computation results from a previous processing stage may be optionally added. The resulting computed new/modified coordinates are passed to the texture retrieval unit 500a.

Example Hardware Control Register Formats

FIG. 17 shows example logic control register data field formats which may be used to define and control parameters and operations within processing unit 512. For example, certain data fields may be used to pass programmable constants ffor use as static matrix elements. Other fields may define data triplet format, control bias and scaling factors, indicate the number of indirect operation stages or provide other parameters for operations within proc logic unit 512.

The following table shows non-limiting example control register descriptions and formats for controlling operations within indirect-texture/bump unit 500b/500c and processing logic 512:

| name: | format: | description: |
|---|---|---|
| $ma_i, mb_i,$ $mc_i, md_i,$ $me_i, mf_i,$ | S0.10 | Specifies parameters for one of the three texture offset matrices. All recycled texture values are passed through the matrix |
| $s_i$ | S5 | This field specifies post-scale for the matrix. The scale is done by performing a shift on the matrix outputs by an amount equal to (1 << n) for positive values, and (1 << (−n)) for negative values. |
| $bt_i$ | 2 | This field one of up to four indirect textures to use during direct texture cycle, i. |
| $fmt_i$ | 2 | This field specifies how the s, t, and u offsets, along with the 5-bit bump alpha select values bs, bt, and bu, are selected from the 24-bit recycled texture data (col). |
| $bias_i$ | 3 | This field specifies whether or not to apply bias to the s, t, and u coordinates after formatting and before matrix multiplication. The amount of the bias is −128 for the FMT_8 format, and +1 for the other three formats (see "fmt" field description above). |
| $m_i$ | 4 | This field selects a matrix and scale to use during the current direct texture cycle. In addition to the three constant matrices defined using mai..mfi (see above), two variable matrices are also defined whose values are obtained from the current direct texture coordinates<br><br>Matrix A<br>$$\begin{pmatrix} s/256 & t/256 \\ 0 & 0 \\ 0 & 0 \end{pmatrix}$$<br><br>Matrix B<br>$$\begin{pmatrix} 0 & 0 \\ s/256 & t/256 \\ 0 & 0 \end{pmatrix}$$ |
| $sw_i, tw_i$ | 3 | This field implements a wrap on the s and t direct texture coordinates prior to adding the texture offset (this is done by using a bit-mask). |
| $fb_i$ | 1 | This field specifies whether to include computation results from a previous computation stage (retained in buffer 530) in the add performed by adder 518. |
| imask | 8 | This field specifies, for each of eight sets of texture state, whether the textures associated with this state are indirect (1) or direct (0). |

In the proc logic unit, for the control registers shown in FIG. 13, registers MTXi define matrix element data for three matrices (i.e., i=0,1,2). Registers CMDi define the bump command for each of 16 TEV stages (i=0-15); registers IMASK defines the direct or indirect usage of each of up to eight textures.

Mode Changes

In an example implementation, operational mode changes within the pipeline are handled by interleaving a control register address-data pair (which contains, for example, the address of a particular hardware logic control register associated with some circuitry within the pipeline and the appropriate control data/instruction for controlling that circuitry) with rasterization data output by the rasterizer. This control register address-data pair information trickles down the graphics pipeline with the data and remains interleaved in the correct order with the data that it affects. Consequently, most operational mode changes may be effected without "flushing" (purging) the pipeline. Although mode changes may be complicated somewhat by the fact that there could be multiple paths data within the pipeline for control register data to reach its ultimate destination, more efficient operation may be obtained, for example, by adherence to the following exemplary operational constraints:

1) Hardware control register data affecting the texture address processor 500b/500c is passed through direct texture coordinate FIFO (dFIFO), (e.g., via switch S0);
2) Hardware control register data affecting direct contexts in the texture unit 500a is passed through the direct texture coordinate FIFO (dFIFO) in the texture address processor to texture unit 500a;
3) Hardware control register data affecting indirect texturing contexts in texture unit 500a are passed directly from the rasterizer 400 to texture unit 500a (e.g., via switches S0 and S1); and
4) Hardware control register data affecting the pixel shader (TEV) or frame buffer 702 are passed through the direct texture coordinate FIFO (dFIFO), the texture address processor 500b/500c, and the texture unit 500a.

In an example implementation of the present invention, the possible texturing contexts are defined as either a direct context or an indirect context. Direct contexts may handle only direct texture data, and indirect contexts may handle only indirect texture data. A change in the definition of one or more contexts between, for example, indirect to direct or direct to indirect operation, may require a partial flush of the graphics pipeline.

Example Indirect Texture Processing Results

As will now be appreciated, the recirculating direct and indirect texture processing architecture described above provides an extremely flexible and virtually unlimited functionality. An application programmer can invoke any number of logical texture mapping stages to provide any desired sequence of any number of direct or indirect texture mapping operations. This powerful capability allows the application programmer to create dynamically a number of complex and interesting texture mapping visual effects.

As one example, indirect textures can be used for texture warping effects. In this example case, the indirect texture is used to stretch or otherwise distort the surface texture. A dynamic distortion effect can be achieved by swapping indirect maps (or by modifying the indirect map or coordinates). One may apply this effect to a given surface within a scene, or one can take this one step further and apply the effect to the entire scene. In the latter case, the scene is first rendered normally and then copied to a texture map. One then draws a big rectangle that is then mapped to the screen using an indirect texture. Texture warping can be used to produce shimmering effects, special lens effects, and various psychedelic effects.

As another example, the indirect feature also allows the drawing texture tile maps. In this scenario, one texture map holds the base definition for a variety of tiles. An indirect texture map is then used to place specific tiles in specific locations over a 2D surface. With indirect textures, only one polygon needs to be drawn.

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general purpose digital computer such as a personal computer, which executes a software emulator program that simulates the hardware and/or firmware of system 50.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

FIG. 15 illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1303 fetches one or a sequence of binary-image program instructions from storage medium 62 and converts these program instructions to one or more equivalent Intel binary-image program instructions. The emulator 1303 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

In the case where particular graphics support hardware within an emulator does not include the example indirect texture referencing features and functions illustrated by FIGS. 8 through 12, the emulator designer has a choice of either:

translating the indirect-texture referencing commands into other graphics API commands the graphics support hardware understands, or implementing indirect-texture referencing in software with a potential corresponding decrease in performance depending upon the speed of the processor, or "stubbing" (i.e., ignoring) the indirect-texture referencing commands to provide a rendered image that does not include effects utilizing indirect-texture referencing.

While the FIG. 6 flowchart can be implemented entirely in software, entirely in hardware or by a combination of hardware and software, the preferred embodiment performs most of these calculations in hardware to obtain increased speed performance and other advantages. Nevertheless, in other implementations (e.g., where a very fast processor is available), some or all of the processing described herein may be implemented in software to provide similar or identical imaging results.

FIG. 16 illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

All documents referenced above are hereby incorporated by reference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

We claim:

1. In a graphics system having a memory containing texture data, a method of indirect texture referencing comprising the steps of:
   (a) using indirect texture coordinates to generate a data triplet;
   (b) deriving texture coordinates based at least in part on the generated triplet; and
   (c) using at least the derived texture coordinates to map predetermined texture data onto a primitive.

2. A method of indirect texture referencing as in claim 1 wherein the using step (a) includes referencing, in a texture memory, an array that maps the triplet via the indirect texture coordinates.

3. A method of indirect texture referencing as in claim 1 wherein the using step (a) includes fetching predetermined triplet data from a texture map stored in memory.

4. A method of indirect texture referencing as in claim 1 wherein the using step (c) includes referencing, in a texture memory, an array that maps color value data via the derived texture coordinates.

5. A method of indirect texture referencing as in claim 1 wherein the deriving step (b) performs a matrix multiplication operation wherein a first matrix comprising a plurality of predetermined constant and/or variable scalar elements is multiplied by a second matrix comprising a retrieved data triplet.

6. A method of indirect texture referencing as in claim 1 wherein a triplet comprises s, t and u texture coordinate offsets.

7. A method of indirect texture referencing as in claim 1 wherein a triplet comprises three eight-bit binary values.

8. A method of indirect texture referencing as in claim 1 wherein a triplet comprises three five-bit binary values.

9. A method of indirect texture referencing as in claim 1 wherein a triplet comprises three four-bit binary values.

10. A method of indirect texture referencing as in claim 1 wherein a triplet comprises three three-bit binary values.

11. A method of indirect texture referencing as in claim 1 wherein a quadruplet of indirect texture coordinates are processed together to produce a quadruplet of derived texture coordinates for mapping texture data to polygons.

12. A method of indirect texture referencing as in claim 5 wherein said first matrix comprises elements that are a scalar function of one or more predetermined texture coordinates.

13. A method of indirect texture referencing as in claim 5 wherein said first matrix is a 3×2 matrix comprising six predetermined scalar elements.

14. A method of indirect texture referencing as in claim 5 wherein said first matrix is arranged having elements as follows:

$$\begin{pmatrix} s/256 & t/256 \\ 0 & 0 \\ 0 & 0 \end{pmatrix}$$

wherein s and t are predetermined texture coordinates.

15. A method of indirect texture referencing as in claim 5 wherein said first matrix is arranged having elements as follows:

$$\begin{pmatrix} 0 & 0 \\ s/256 & t/256 \\ 0 & 0 \end{pmatrix}$$

wherein s and t are predetermined texture coordinates.

16. In a 3D videographics system having a memory containing texture data stored in a texture memory, the texture data accessed via either a set of direct texture coordinates or a set of indirect texture coordinates, a method of indirect texture referencing for mapping a predetermined texture onto a polygon comprising the steps of:
   (a) using a set of indirect texture-coordinates to retrieve a data triplet stored in texture memory;
   (b) deriving a set of modified texture coordinates based at least in part on the retrieved data triplet; and
   (c) using the set of modified texture coordinates to reference texture data stored in texture memory corresponding to the predetermined texture.

17. A method of indirect texture referencing as in claim 16 wherein the deriving step (b) includes performing at least one matrix multiplication operation wherein a first matrix comprising a plurality of predetermined constant and/or variable scalar elements is multiplied by a second matrix comprising a retrieved data triplet.

18. A method of indirect texture referencing as in claim 16 wherein the using step (c) includes referencing, in a texture memory, an array that maps color value data via the derived texture coordinates.

19. A method of indirect texture referencing as in claim 16 wherein a data triplet comprise at least one texture coordinate offset.

20. A method of indirect texture referencing as in claim 16 wherein a data triplet comprises s, t, and u texture coordinate offset values.

21. A method of indirect texture referencing as in claim 16 wherein a data triplet comprises three eight-bit binary values.

22. A method of indirect texture referencing as in claim 16 wherein a data triplet comprises three five-bit binary values.

23. A method of indirect texture referencing as in claim 16 wherein a data triplet comprises three four-bit binary values.

24. A method of indirect texture referencing as in claim 16 wherein a data triplet comprises three three-bit binary values.

25. A method of indirect texture referencing as in claim 17 wherein said first matrix comprises elements that are a scalar function of one or more predetermined direct texture coordinates.

26. A method of indirect texture referencing as in claim 17 wherein said first matrix is a 3×2 matrix comprising six predetermined scalar elements.

27. A method of indirect texture referencing as in claim 17 wherein said first matrix is arranged having elements as follows:

$$\begin{pmatrix} s/256 & t/256 \\ 0 & 0 \\ 0 & 0 \end{pmatrix}$$

wherein s and t are predetermined current direct texture coordinates.

28. A method of indirect texture referencing as in claim 17 wherein said first matrix is arranged having elements as follows:

$$\begin{pmatrix} 0 & 0 \\ s/256 & t/256 \\ 0 & 0 \end{pmatrix}$$

wherein s and t are predetermined current direct texture coordinates.

29. In a graphics system having a memory containing texture data, a method of indirect texture referencing comprising the steps of:
(a) using a set of indirect texture-coordinates to retrieve offset data from the memory;
(b) multiplying the offset data by predetermined values forming elements of a texture offset matrix to produce a set of texture offset coordinates; and
(c) using said set of offset texture coordinates for referencing texture data stored in the memory when mapping a predetermined texture to a rendered polygon.

30. A method of indirect texture referencing as in claim 29 wherein said offset data is a result of a predetermined texturing function and comprises at least one texture coordinate offset value.

31. A method of indirect texture referencing as in claim 29 wherein said offset data comprises a set of three values for producing said set of texture offset coordinates.

32. A method of indirect texture referencing as in claim 31 wherein said set of three values comprise s, t and u coordinate offset data.

33. A method of indirect texture referencing as in claim 29 wherein said matrix elements comprise a set of predetermined constants.

34. A method of indirect texture referencing as in claim 29 wherein said matrix elements comprise a set of constant and variable values.

35. A method of indirect texture referencing as in claim 29 wherein one or more elements of said matrix are a mathematical function of one or more predetermined texture coordinates.

36. A method of indirect texture referencing as in claim 29 wherein the matrix is a 3×2 matrix comprising six predetermined scalar elements.

37. A method of indirect texture referencing as in claim 29 wherein the matrix is arranged having elements as follows:

$$\begin{pmatrix} s/256 & t/256 \\ 0 & 0 \\ 0 & 0 \end{pmatrix}$$

wherein s and t are predetermined current direct texture coordinates.

38. A method of indirect texture referencing as in claim 29 wherein the matrix is arranged having elements as follows:

$$\begin{pmatrix} 0 & 0 \\ s/256 & t/256 \\ 0 & 0 \end{pmatrix}$$

wherein s and t are predetermined current direct texture coordinates.

39. In a graphics system including a graphics engine that renders and displays images at least in part in response to polygon vertex data and texture data stored in an associated memory, a texture processing subsystem for selectively mapping texture data corresponding to one or more different textures and/or texture characteristics to surfaces of said rendered and displayed images, said texture processing subsystem including a texture coordinate offset matrix arrangement producing a set of offset texture coordinates by multiplying indirect texture data by elements of a matrix, wherein one or more elements of the matrix are a mathematical function of one or more predetermined direct texture coordinates.

40. A texture processing subsystem as in claim 39 wherein the matrix has six elements in three rows and two columns.

41. A texture processing subsystem as in claim 39 wherein the matrix is arranged having elements as follows:

$$\begin{pmatrix} s/256 & t/256 \\ 0 & 0 \\ 0 & 0 \end{pmatrix}$$

wherein s and t are predetermined current direct texture coordinates.

42. A texture processing subsystem as in claim 39 wherein the matrix is arranged having elements as follows:

$$\begin{pmatrix} 0 & 0 \\ s/256 & t/256 \\ 0 & 0 \end{pmatrix}$$

wherein s and t are predetermined current direct texture coordinates.

43. In a graphics system including a graphics engine that renders and displays images at least in part in response to vertex data and texture data stored in an associated memory, a texture processing subsystem for selectively mapping texture data corresponding to one or more different textures and/or texture characteristics to surfaces of said rendered and displayed images, said texture processing subsystem including a texture coordinate offset matrix arrangement for producing a set of offset texture coordinates by multiplying indirect texture data by elements of a matrix, wherein one or more elements of the matrix can be selectively loaded.

44. A texture processing subsystem as in claim 43 wherein said elements are predetermined constants.

45. A texture processing subsystem as in claim 43 wherein one or more of said elements are a mathematical function of one or more predetermined direct texture coordinates.

46. A texture processing subsystem as in claim 43 wherein the matrix has six elements in three rows and two columns.

* * * * *